(12) United States Patent  (10) Patent No.:  US 12,543,871 B2
Gentile et al.  (45) Date of Patent:  *Feb. 10, 2026

(54) AUTOMATIC SENSING METHODS AND DEVICES FOR INVENTORY CONTROL

(71) Applicant: Touchcode Holdings, LLC, New York, NY (US)

(72) Inventors: John Gentile, Montclair, NJ (US); Terrance Z. Kaiserman, Loxahatchee, FL (US); Steven Martin Cohen, New York, NY (US); Daniel P. Lawrence, Ann Arbor, MI (US)

(73) Assignee: Touchcode Holdings, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,893

(22) Filed: Aug. 12, 2021

(65) Prior Publication Data

US 2022/0211193 A1  Jul. 7, 2022

Related U.S. Application Data

(63) Continuation of application No. 16/779,815, filed on Feb. 3, 2020, now abandoned, which is a continuation of application No. 14/210,309, filed on Mar. 13, 2014, now Pat. No. 10,548,418.

(60) Provisional application No. 61/861,765, filed on Aug. 2, 2013, provisional application No. 61/858,717, filed on Jul. 26, 2013, provisional application No. 61/778,629, filed on Mar. 13, 2013.

(51) Int. Cl.
| | | |
|---|---|---|
| G06K 19/07 | (2006.01) |
| A47F 5/00 | (2006.01) |
| A47F 10/00 | (2006.01) |
| G06Q 10/087 | (2023.01) |

(52) U.S. Cl.
CPC ............... *A47F 10/00* (2013.01); *A47F 5/00* (2013.01); *G06K 19/0716* (2013.01); *G06K 19/0717* (2013.01); *G06K 19/0723* (2013.01); *G06Q 10/087* (2013.01); *A47F 2010/005* (2013.01)

(58) Field of Classification Search
CPC ....... A47F 10/00; A47F 5/00; G06K 19/0716; G06K 19/0717; G06K 19/0723; G06Q 10/087
USPC ............................................. 248/87; 235/383
See application file for complete search history.

(56) References Cited

U.S. PATENT DOCUMENTS

| | | | | |
|---|---|---|---|---|
| 4,866,412 A * | 9/1989 | Rzepczynski | ....... | G06F 3/04144 338/114 |
| 9,123,018 B2 * | 9/2015 | Gentile | ................. | G01R 27/02 |
| 9,684,884 B2 * | 6/2017 | Gentile | .................... | G06K 7/08 |
| 2008/0055084 A1 * | 3/2008 | Bodin | .................. | G06Q 10/087 340/8.1 |

* cited by examiner

*Primary Examiner* — Daniel A Hess
(74) *Attorney, Agent, or Firm* — Wolf, Greenfield & Sacks, P.C.

(57) ABSTRACT

The present disclosure is generally directed to methods of tracking stocked inventory, such as products or other items stocked on a store shelf or other storage space. The disclosure is also directed to devices and systems that may be utilized to carry out such methods.

6 Claims, 26 Drawing Sheets

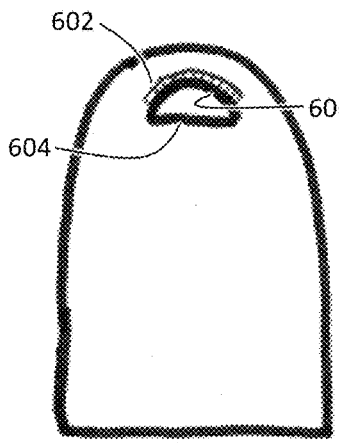
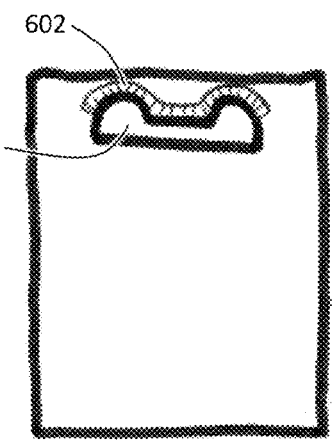
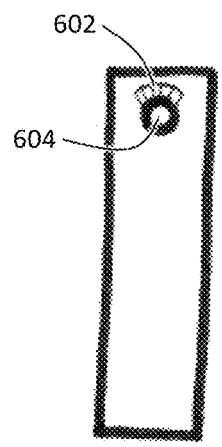
*FIG. 6A*  *FIG. 6B*  *FIG. 6C*
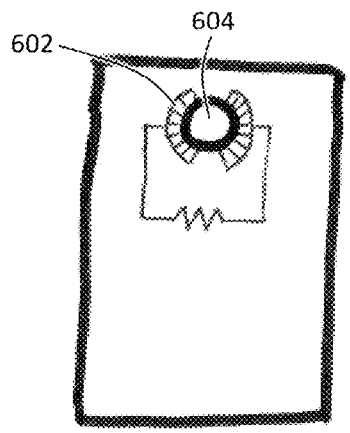
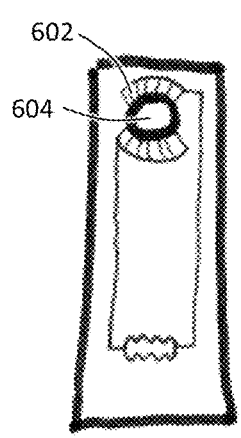
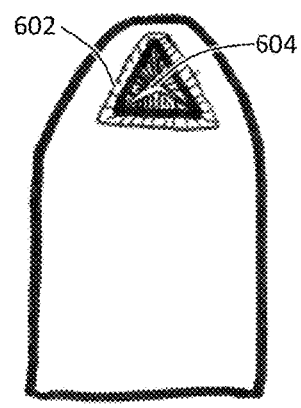
*FIG. 6D*  *FIG. 6E*  *FIG. 6F*
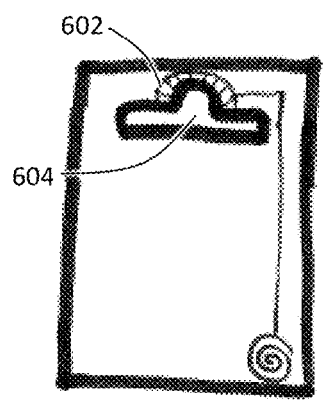
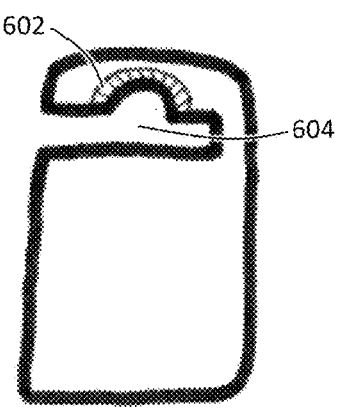
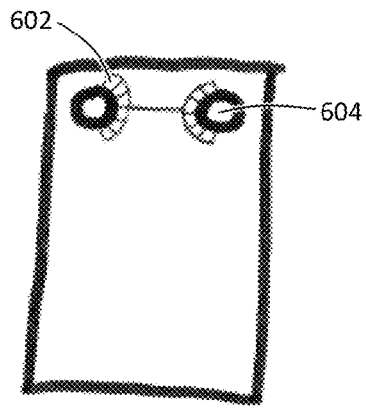
*FIG. 6G*  *FIG. 6H*  *FIG. 6I*

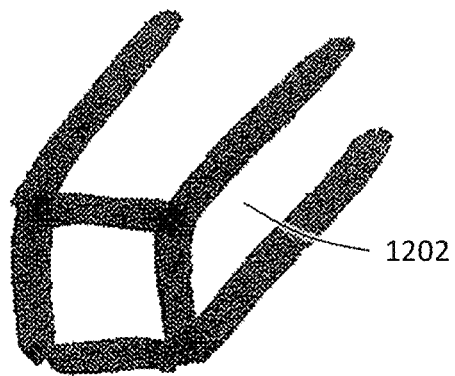
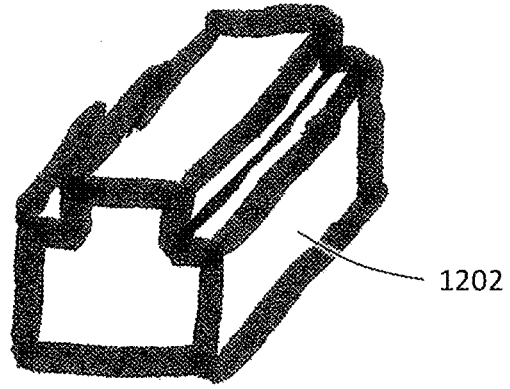
*FIG. 12A*  *FIG. 12B*

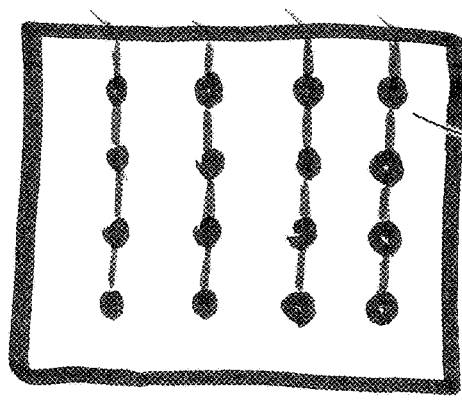 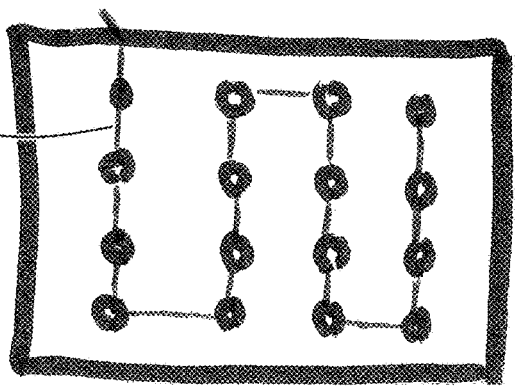
*FIG. 15A*  *FIG. 15B*

AUTOMATIC SENSING METHODS AND DEVICES FOR INVENTORY CONTROL

RELATED APPLICATIONS

This application is a continuation of U.S. application Ser. No. 16/779,815, filed Feb. 3, 2020, which is a continuation of U.S. application Ser. No. 14/210,309 (now U.S. Pat. No. 10,548,418), filed Mar. 13, 2014, which claims priority under 35 U.S.C. § 119(e) to U.S. Provisional Application Ser. No. 61/778,629, filed Mar. 13, 2013, U.S. Provisional Application Ser. No. 61/858,717, filed Jul. 26, 2013, and U.S. Provisional Application Ser. No. 61/861,765, filed Aug. 2, 2013, each of which is incorporated herein by reference in its entirety for all purposes.

TECHNICAL FIELD

Systems, methods, and devices for tracking inventory are generally described.

BACKGROUND

Conventional displays, such as point-of-purchase displays having a base pegboard and display hardware, are either shipped assembled or assembled in the field. Conventional displays contain a limited and specific functional capability, with the modifiable elements limited to the placement of shelves, racks, and corresponding pegs upon which products are placed and displayed. Such conventional point-of-purchase displays offer little, if any, functionality related to product sensing and inventory control.

SUMMARY

Systems, methods, and devices for tracking inventory are generally described. The subject matter of the present invention involves, in some cases, interrelated products, alternative solutions to a particular problem, and/or a plurality of different uses of one or more systems and/or articles.

Certain aspects relate to a system comprising a display structure and an electronic device communicatively coupled to the display structure and configured to detect at least one property of an object that is placed on the display structure, wherein the coupling between the display structure and the electronic device is made, at least in part, using conductive ink.

In some of these embodiments, the electronic device comprises a controller. In some cases, the display structure comprises a peg. In some cases, the display structure comprises a shelf. In some embodiments, the electronic device is configured to detect a resistance, a capacitance, an RC value, a weight, a weight distribution, a QR code, and/or a bar code of the object. In some embodiments, the system comprises a board comprising a plurality of holes, and the display structure is positioned within at least one hole of the board. In certain cases, the board is a pegboard. In certain embodiments, the electronic device and the display structure are electronically coupled via the board. In some of the above systems, the display structure can comprise a visual indicator configured to indicate information related to an identity of the object and/or a quantity of the object present on the display structure. In certain cases, the visual indicator comprises a light-emitting device. In certain embodiments, the display structure comprises a peg, and the light-emitting device is positioned at or near the end of the peg.

Some aspects relate to a system comprising a display structure and an object comprising a resistive element having a preselected resistance, the resistive element in electrical communication with the display structure when the object is in contact with the display structure.

In some embodiments of the above system, the display structure comprises a peg, and the resistive element is in electrical communication with the display structure when the object is hung from the peg. In some cases, the resistive element comprises a conductive ink. In certain embodiments of the above systems, the conductive ink of the resistive element forms an electrically conductive pathway from a first electrical terminal associated with the display structure to a second electrical terminal associated with the display structure. In some embodiments, the resistive element is part of the packaging of the object. In certain cases, the resistive element comprises conductive ink formed on the packaging of the object. In some embodiments, the display structure comprises a shelf on which the product may be placed. In some embodiments, the display structure is removably attached to a base display unit. In certain cases, the base display unit comprises a pegboard. In certain of the above systems, the display structure is electrically coupled to the base display unit. Some embodiments of the above systems comprise an electronic device communicatively coupled to the display structure. In certain embodiments, the electronic device comprises a controller. In certain cases, the controller is configured to control at least an electrical current flowing to and/or from the display structure.

Some aspects relate to a method comprising determining the identity of an object in contact with and in electrical communication with a display structure, via a value of electrical current flowing through the display structure, wherein the object comprises a resistive element with a preselected resistance.

In some embodiments, the determining is performed based on a change in electrical current flowing through the display structure. In some embodiments, the display structure comprises a peg. In some of the above methods, the resistive element comprises a conductive ink. In certain embodiments, the conductive ink of the resistive element forms an electrically conductive pathway from a first electrical terminal associated with the display structure to a second electrical terminal associated with the display structure. In some embodiments, the resistive element is part of the packaging of the object. In certain cases, the resistive element comprises conductive ink formed on the packaging of the object. In some embodiments, the display structure comprises a shelf on which the product may be placed. In some cases, the display structure is removably attached to a base display unit. In certain embodiments, the base display unit comprises a pegboard. In certain cases, the display structure is electrically coupled to the base display unit. In some of the above methods, the determining is performed using an electronic device communicatively coupled to the display structure. In certain embodiments, the electronic device comprises a controller. In certain cases, the controller controls at least an electrical current flowing to and/or from the display structure. In some embodiments, the identity of the object in contact and in electrical communication with the display structure is determined by detecting a value of electrical current flowing through the object and at least one other object.

Certain aspects relate to a method comprising determining the quantity of objects in contact and in electrical communication with a display structure via a value of electrical current flowing through the display structure, wherein the objects comprise a resistive element with a preselected resistance.

In some embodiments, the determining step is performed based on a change in electrical current flowing through the display structure. In some embodiments, the display structure is a peg. In certain cases, the quantity of objects hanging from the peg is determined by detecting a value of electrical resistance of an electrical current flowing through the peg. In certain embodiments, the quantity of objects hanging from the peg is determined by detecting a change in electrical resistance of an electrical current flowing through the peg. In some embodiments, the display structure is a shelf. In certain cases, the quantity of objects in contact and in electrical communication with the display structure is determined by detecting a value of electrical current flowing through more than one of the objects. In some embodiments of the above methods, the resistive element comprises a conductive ink. In certain cases, the conductive ink of the resistive element forms an electrically conductive pathway from a first electrical terminal associated with the display structure to a second electrical terminal associated with the display structure. In some embodiments, the resistive element is part of the packaging of the object. In certain embodiments, the resistive element comprises conductive ink formed on the packaging of the object. In some embodiments, the determining is performed using an electronic device communicatively coupled to the display structure. In certain cases, the electronic device comprises a controller. In certain embodiments, the controller controls at least an electrical current flowing to and/or from the display structure.

Certain aspects relate to a method comprising determining the location, on a peg, of an object hanging from the peg via a value of electrical current flowing through the peg.

In some embodiments, the location of the object is determined by detecting a change in electrical current flowing through the peg. In some cases, the location of the object is determined by detecting a value of electrical resistance of an electrical current flowing through the peg. In certain embodiments, the location of the object is determined by detecting a change in electrical resistance of an electrical current flowing through the peg. In some embodiments, the peg comprises a plurality of independently electrically addressable sensors along the length of the peg. In certain cases, the plurality of independently electrically addressable sensors comprises a plurality of independently electrically addressable electrical terminal pairs. In certain embodiments, the independently electrically addressable electrical terminal pairs are formed using conductive ink. In some embodiments, the object comprises a resistive element with a preselected resistance. In certain embodiments, the resistive element forms an electrically conductive pathway from a first electrical terminal associated with the peg to a second electrical terminal associated with the peg. In certain cases, the resistive element is part of the packaging of the object. In some embodiments, the resistive element comprises conductive ink formed on the packaging of the object. In some embodiments of the above methods, the determining is performed using an electronic device communicatively coupled to the display structure. In certain cases, the electronic device comprises a controller. In certain embodiments, the controller controls at least an electrical current flowing to and/or from the display structure.

Some aspects relate to an article of manufacture for displaying one or more electronically identifiable objects, comprising: a display peg comprising a first segment configured to transmit a first electrical signal from the display peg when an object is placed in electrical communication with an electrically conductive terminal of the first segment; and a second segment configured to transmit a second electrical signal from the display peg when an object is placed in electrical communication with an electrically conductive terminal of the second segment.

In some embodiments, the first segment comprises a ground terminal, and the first segment transmits the first electrical signal from the display peg when an object is placed in electrical communication with the electrically conductive terminal of the first segment and the ground terminal. In some cases, the second segment comprises a ground terminal, and the second segment transmits the second electrical signal from the display peg when an object is placed in electrical communication with the electrically conductive terminal of the second segment and the ground terminal. In some embodiments, the first and second segments share a common ground terminal. In some cases, the first and second segments comprise separate ground terminals. In some embodiments, the electrically conductive terminal of the first segment and/or the electrically conductive terminal of the second segment comprises conductive ink. In some embodiments of the above articles of manufacture, the article comprises a third segment configured to transmit a third electrical signal from the display peg when an object is placed in electrical communication with an electrically conductive terminal of the third segment.

Further aspects relate to an article of manufacture for displaying one or more electronically identifiable objects, comprising: a display peg, comprising a first electrically conductive terminal, a second electrically conductive terminal, and a third electrically conductive terminal, wherein the first and second terminals are adapted to permit for an electrical current to flow therebetween when a first object, having a resistive element arranged on the point of contact between the object and the display peg, is hung from the display peg; and the first and third terminals are adapted to permit for an electrical current to flow therebetween when a second object, having a resistive element arranged on the point of contact between the object and the display peg, is hung from the display peg.

In some embodiments, the first terminal is arranged in a side-by-side configuration with the second terminal. In some embodiments, the first terminal is arranged in a side-by-side configuration with the third terminal. In some cases, the first terminal is a ground terminal. In some cases, at least one of the first terminal, the second terminal, and the third terminal comprises conductive ink. In some embodiments, the resistive element in the first and/or second object has a preselected resistance. In some cases, the resistive element in the first and/or second object comprises conductive ink. In some embodiments, the terminals are attached to a sleeve at least partially enclosing a support structure of the display peg. Some embodiments of the above articles of manufacture comprise a fourth electrically conductive terminal, wherein the first and fourth terminals are adapted to permit for an electrical current to flow therebetween when a third object, having a resistive element arranged on the point of contact between the object and the display peg, is hung from the display peg.

In some embodiments, a system comprises any of the above articles of manufacture and an object, having a resistive element arranged on the point of contact between the object and the display peg, hung from the display peg. In some embodiments, a system comprises any of the above articles of manufacture and an electronic device communicatively coupled to the display peg.

In some aspects, a packaged article comprises a package; a first electrical contact associated with an interface of the package configured to contact a support mechanism; a second electrical contact associated with an interface of the package configured to contact the support mechanism; and a resistive element having a preselected resistance forming an electrically conductive pathway from the first electrical contact to the second electrical contact.

In some embodiments, the resistive element comprises conductive ink. In certain cases, the conductive ink contains carbon.

Certain aspects relate to a packaged article comprising: a package; a first electrical contact associated with an interface of the package configured to contact a support mechanism; a second electrical contact associated with an interface of the package configured to contact the support mechanism; and a trace of conductive ink connected to the first contact and the second contact, wherein the conductive ink forms at least a portion of a graphic image on the package.

In some embodiments of the packaged article, the interface of the package configured to contact the support mechanism comprises a loop. In certain embodiments, the first electrical contact is arranged along an interior edge of the loop. In certain cases, the second electrical contact is arranged along an interior edge of the loop. In certain embodiments, the loop is a hole in the package. In some embodiments, the conductive ink is deposited as part of a printing process. In certain embodiments, the conductive ink is deposited as part of a multi-color printing process.

Some aspects relate to a method of fabricating a display peg, comprising: arranging a support structure such that the support structure is at least partially surrounded by a substrate on which at least two electrical terminals are positioned, such that, after the support structure is at least partially surrounded by the substrate, the electrical terminals form at least a portion of the outer surface of the display peg.

In some embodiments, the substrate comprises a sleeve, and arranging the support structure comprises wrapping the sleeve at least partially around the support structure. In certain embodiments, the method comprises attaching the sleeve to the support structure using an adhesive. In some embodiments, the substrate comprises a mold, and arranging the support structure comprises injecting support structure material into a cavity of the mold. In certain embodiments, the mold comprises release paper. In certain cases, the method comprises removing the release paper after the support structure material has been injected.

Some aspects relate to an article of manufacture for displaying one or more electronically identifiable objects, comprising: a display peg; and two electrically conductive terminals laterally aligned along an upper surface of the display peg, the terminals adapted to permit for an electrical current to flow therebetween when an object, having a resistive element printed on the point of contact between the object and the upper surface of the display peg, is hung from the display peg.

In some embodiments, the electrical terminals are fashioned using conductive ink. In some embodiments, the electrical terminals are molded to the outer surface of the display peg. In some embodiments, the display peg protrudes from a display with which the display peg is electrically coupled. In some cases, the resistive element is formed using conductive ink. In some instances, the resistive element has a preselected resistance.

Certain aspects relate to a method of electronically identifying one or more objects hung on a display, the method comprising: providing a display peg, the display peg comprising two electrically conductive terminals laterally aligned along an upper surface of the display peg; and hanging an object on the display peg, the object comprising a printed resistive element having a preselected resistance, wherein upon hanging the object on the display peg, the resistive element contacts each of the electrically conductive terminals such that an electrical current is capable of flowing between the electrically conductive terminals via the resistive element.

In some embodiments, the method comprises providing an electrical signal to the display peg, and interpreting an electrical signal received from the display peg. In certain embodiments, the method comprises determining the quantity of the object on the peg based at least in part upon the electrical signal received from the display peg. In some embodiments, the electrically conductive terminals are fashioned using conductive ink. In some cases, the resistive element is formed using conductive ink.

In some aspects, an inventory monitoring system comprises: a first layer comprising a first set of conductive traces; and a second layer comprising a second set of electrically conductive traces, the second layer arranged over the first layer such that the second set of electrically conductive traces overlaps the first set of conductive traces to produce a matrix of conductive trace intersections; wherein the system is configured such that, when an object is placed on the second layer, the system can determine the identity of the object based, at least in part, upon the shape of a feature associated with a surface of the object in contact with the system.

In some embodiments, the inventory monitoring system comprises an electronic device communicatively coupled to the first and/or second layer.

Further aspects relate to an inventory monitoring system, comprising: a pressure sensitive sensor array configured to detect the presence of an object when the object is placed on the pressure sensitive sensor array, wherein the system is configured such that, when an object is placed on the pressure sensitive sensor array, the system can determine the identity of the object based, at least in part, upon the shape of a feature associated with a surface of the object in contact with the system, and the feature does not occupy the entire surface of the object in contact with the system.

In some embodiments, the pressure sensitive sensor array comprises a first layer comprising a first set of conductive traces, and a second layer comprising a second set of electrically conductive traces, the second layer arranged over the first layer such that the second set of electrically conductive traces overlaps the first set of conductive traces to produce a matrix of conductive trace intersections. In some embodiments, the first and second layers are separated by a dielectric material. In certain cases, the dielectric material comprises a fluid dielectric material. In certain embodiments, the dielectric material comprises air. In certain cases, the dielectric material comprises a solid dielectric material. In some embodiments, the feature comprises a ridge and/or indentation associated with the packaging. In certain cases, the feature comprises braille. In some embodiments, the inventory monitoring system comprises an electronic device communicatively coupled to the pressure sensitive sensor array. In certain cases, the electronic device is configured to determine the identity of the object based, at least in part, upon the shape of the feature associated with the surface of the object in contact with the system. In certain embodiments, the electronic device comprises a controller.

Some aspects relate to an article of manufacture for displaying one or more objects, comprising: a display structure comprising a sensor that is capable of identifying at least one property of an object placed on the display structure, wherein the sensor is adapted to generate a signal in response to the object being placed on the display structure, wherein an electronic device coupled to the sensor is capable of determining an identity of the object and a quantity of the object present on the display structure based at least in part on the signal; and a visual indicator capable of visually indicating information related to said identity of the object and quantity of the object present on the display structure, wherein the sensor is incorporated into the surface of the display structure and is capable of identifying at least one of a resistance, a capacitance, an RC value, a weight, a weight distribution, a QR code, and a bar code of the object.

In some embodiments, the display structure comprises a shelf. In some embodiments, the display structure comprises a peg. In some cases, the sensor is capable of identifying a resistance of the object. In some embodiments, the visual indicator comprises a light-emitting device positioned at or near the end of the peg. In some embodiments, the electronic device is coupled to the sensor using conductive ink. In some cases, the sensor is in-molded into the surface of the display structure.

Some aspects relate to a method of electronically identifying one or more objects on a display, the method comprising: providing a display structure, the display structure comprising one or more sensors incorporated into the surface of the display structure; placing an object on the display structure, the object comprising a unique property capable of being identified by the sensor, said unique property being one of a resistance, a capacitance, an RC value, a weight, a weight distribution, a QR code, and a bar code of the object; upon the object being placed on the display structure, identifying, at the sensor, the unique identity of the object; generating a signal, at the sensor, in response to the object being placed on the display structure, wherein an electronic device coupled to the sensor is capable of determining an identity of the object and/or a quantity of the object present on the display structure based at least in part on the signal; and visually indicating information related to said identity of the object and/or quantity of the object present on the display structure.

In some embodiments, the display structure comprises a shelf. In some embodiments, the display structure comprises a peg. In some embodiments, the method comprises identifying, at the sensor, a unique resistance of the object. In some embodiments, visually indicating information comprises activating a light-emitting device positioned at or near the end of the peg. In some embodiments, the electronic device is coupled to the sensor using conductive ink. In some cases, the sensor is in-molded into the surface of the display structure. In some embodiments, the sensor is aligned along a surface of the display structure Further aspects relate to an article of manufacture for displaying one or more objects, comprising: a base, the base comprising: a lower surface comprising at least one sensor integrated into the lower surface, the sensor being capable of identifying at least one of a resistance, a capacitance, an RC value, a weight, a weight distribution, a QR code, and a bar code of an object coupled thereto; and a plurality of sidewalls surrounding the lower surface, thereby defining a cavity; a cover disposed over the base, the cover comprising: a top wall at least partially covering the cavity; and at least one hole in the top wall through which a product to be displayed in the article of manufacture fits, wherein the hole is aligned with a respective sensor of the base such that the product is coupled to the sensor of the base while a portion of the product still protrudes upwards through the hole; and a visual indicator capable of visually indicating information related to an identity of the product and/or a quantity of the product displayed in the article of manufacture at a given time.

In some embodiments of the above article of manufacture, the at least one sensor is in-molded into the lower surface. In some cases, the visual indicator is capable of visually indicating information related to the identity of the product and the quantity of the product displayed in the article of manufacture at a given time. In some embodiments, the base comprises a plurality of sensors integrated into the lower surface.

In some cases, the top wall comprises a plurality of holes through which products to be displayed in the article of manufacture fit. In certain embodiments, the holes are aligned with respective sensors of the base such that the products are coupled to the sensors of the base while portions of the products still protrude upwards through the holes.

Some aspects relate to a method of electronically identifying one or more objects on a display, the method comprising: providing any of the above articles of manufacture; placing an object in the article of manufacture, the object comprising a unique property capable of being identified by the sensor; upon the object being placed in the article of manufacture, identifying, at the sensor, the unique identity of the object; generating a signal, at the sensor, in response to the object being placed in the article of manufacture, wherein an electronic device coupled to the sensor is capable of determining an identity of the object and a quantity of the object present in the article of manufacture based at least in part on the signal; and visually indicating information related to said identity of the object and quantity of the object present in the article of manufacture.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 6A-6I are, according to some embodiments, schematic illustrations of objects comprising resistive elements;

FIGS. 12A-12B are, according to certain embodiments, schematic diagrams illustrating the cross-sectional shape of display pegs;

FIGS. 15A-15B are, according to certain embodiments, schematic diagrams illustrating the wiring of pegboards, according to some embodiments;

DETAILED DESCRIPTION

Figure 1:
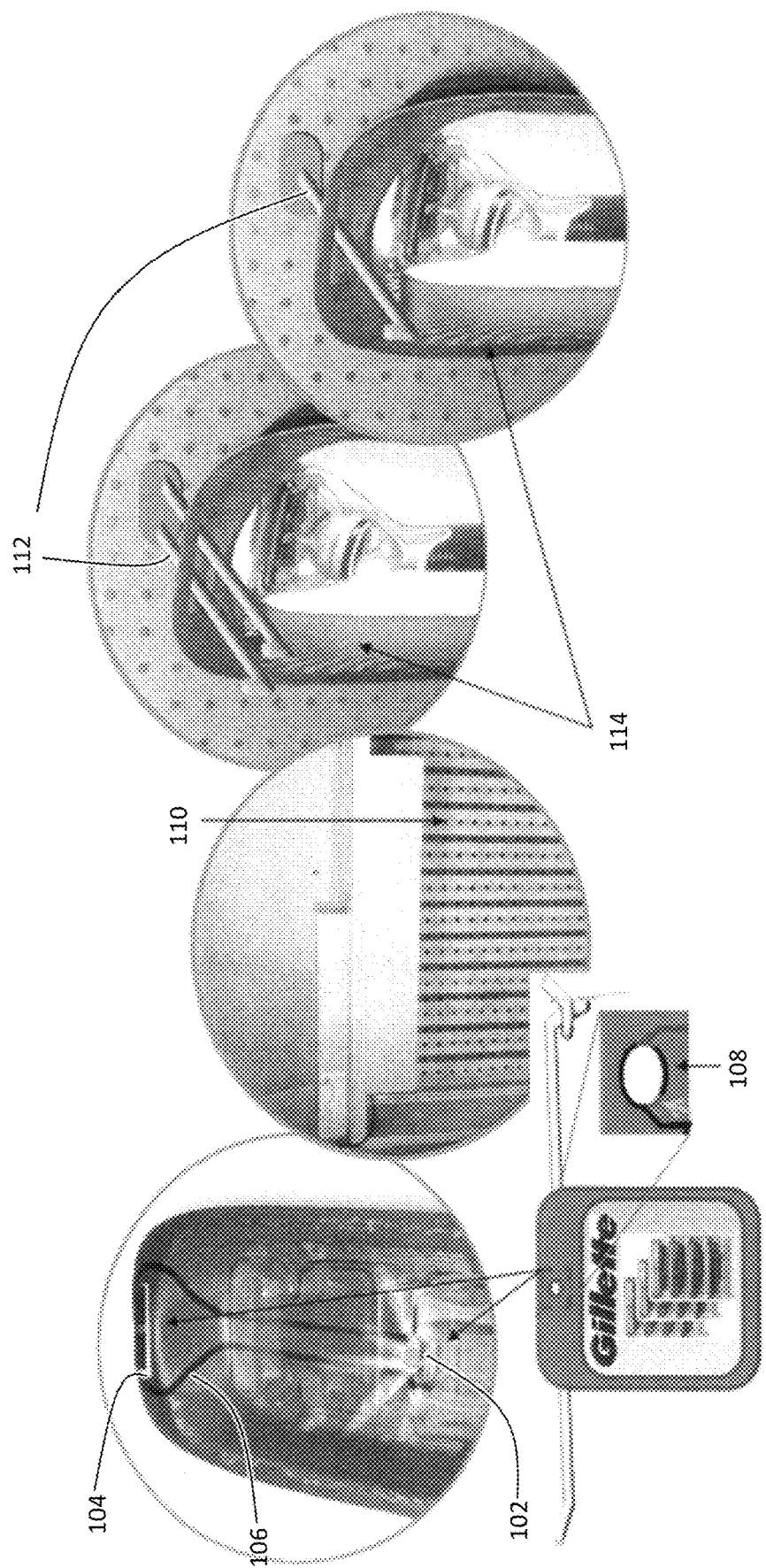
FIG. 1 is a series of photos illustrating the positioning of an object comprising a resistive element on a peg of a display, according to one set of embodiments.

The present disclosure is generally directed to methods of tracking stocked inventory, such as products or other items stocked on a store shelf or other storage space. The disclosure is also directed to devices and systems that may be utilized to carry out such methods.

Certain embodiments are related to the use of conductive inks in product display systems. It has been found, according to certain aspects, that the use of conductive inks to make electrical connections in such display systems can allow for relatively easy wiring of display systems while reducing overall costs. In some such embodiments, the conductive ink can be used to make, at least in part, electrical connections between a controller and a display structure (e.g., a peg, a shelf, and/or a tray) of the display system. The controller can be configured to detect at least one property of an object (e.g., a package, such as a packaged product) that is placed on the display structure. The property determination can be made, according to certain embodiments, based at least in part upon an electrical signal received by the controller from the display structure. For example, in some embodiments, the property determination can be made based at least in part upon a value of resistance of the electrical signal received by the controller from the display structure. In some embodiments, the property determination can be made based at least in part upon a change in resistance of the electrical signal received by the controller from the display structure.

In certain embodiments, conductive ink can be used to form a resistive element on the object (e.g., package) that is to be displayed on the display structure. In some such embodiments, the resistive element can have a preselected resistance. In some embodiments, the object may have a resistive element with a constant resistance. In some embodiments, each type of object (e.g., product) that is to be displayed on the display structure can have a resistive element with a unique preselected resistance. This can allow one to, according to certain embodiments, determine the type and/or quantity of the object that is hung or otherwise associated with the display structure, based on a value of the overall resistance of the electrical pathway between the controller and the product. In some embodiments, the type and/or quantity of the object that is hung or otherwise associated with the display structure can be determined based on a change of the overall resistance of the electrical pathway between the controller and the product.

In some such embodiments, the resistive element having the preselected resistance can be formed using conductive ink. It has been discovered that the use of resistive elements with preselected resistances (and, in particular, resistive elements formed of conductive ink) can allow one to label individual products with minimal cost, allowing one to produce an inventory tracking and/or monitoring system that is sufficiently low in cost to be commercially viable.

In certain embodiments, the conductive inks used herein (e.g., in the display, the objects (e.g., products and/or product packaging), etc.) may comprise a conductive material that may be formed by the evaporation and/or curing of a binder/carrier liquid in which a conductive material is suspended. Examples of conductive inks may include, but are not limited to, metallic inks, such as aluminum ink. Other examples of conductive inks are described below.

Tracking stocked inventory can involve more than just tracking the location and quantity of the inventory. For example, in some instances, it is also desirable for the manufacturer, supplier, or seller of a product or item to track how consumers interact with the products it displays as part of inventory control and marketing. Indeed, it will be desirable for the store of the future to autonomously track when products are initially placed on a display structure, how many times they are touched by consumers before they are purchased, the rate at which products are being purchased, misplacement of products within in the store, and the presence of counterfeit products in the store. For any given product in a store, it may be desirable to know information relating to the date a product was made, the date the product was received at the store, the date the product is expected to expire, the freshness of the product (e.g., based on a relative humidity and/or gases within the packaging of the product), whether the product is out of date (e.g., whether there is a recall notice for the product), whether the product has been tampered with, whether the product was originally packaged properly, whether the product has or has not been paid for, how much of the product has or has not been purchased, the cost of the product, whether any discounts or sales are available for the product, the presence of counterfeit or knockoff products, how long a consumer has been standing in front of or observing the product, and/or whether a consumer touches the product.

Collecting and conveying such information often requires continuous effort (e.g., to update the gathered information, to update a sign or chart conveying the information, etc.). It is desirable to be able to regularly collect this information in a discreet manner, and to efficiently streamline the process of regularly collecting the information. Further, it is desirable to discreetly and selectively convey information to various parties (e.g., manufacturer, store clerk, consumer, etc.). The present application provides for methods and devices that make all of the above information readily discernible from the packaging of the product, the shelving structure used to display or support the product, or a combination of the two.

Much of the product information described above may be of interest not only to the seller of the product but also to the product manufacturer and consumers. According to certain embodiments, the present application provides for methods and devices that make much or all of the information described above available to consumers. The consumers may be capable of checking this information either at the store while purchasing the product or outside the store (e.g., at home) after purchasing the product.

Furthermore, much of the product information described above may be used in connection with other automated systems that are capable of controlling physical properties of the product (e.g., temperature, moisture, etc.). As such, certain embodiments of the present application provide for methods and devices that make the product information available to those automated systems such that the physical properties of the product may be controlled.

On the other hand, the ability to automatically sense the presence or absence of a particular product or part of a merchandise display, the type of product, etc., allows the manufacturer of the product to capture inventory, sales, and marketing data at the point of purchase. This can be achieved through the use of smart pegs (or hooks), shelves, and/or trays (the construction of which is further described herein) that are configured to detect and/or communicate with products that are offered for sale.

One aspect of the disclosure provides for a method of determining an identity and quantity of an object (also described as a product, which may or may not include the packaging of the product as well) present on a display. The method may include providing a display structure. The display structure may include one or more sensors integrated into the display structure. For example, the sensor can be in-molded into the surface of the display structure. In some embodiments, the sensor can be aligned along a surface of the display structure. The method may further include placing an object (e.g., a product, such as a packaged product) on the display structure. The object may have a unique property capable of being identified by the sensor. The unique property may be one of a resistance, a capacitance, an RC value, a weight, a weight distribution, a QR code, and/or a bar code of the object. The method may further include, in some embodiments, identifying the unique identity of the object upon the object being placed on the display structure. In some embodiments, the method comprises generating a signal in response to the object being placed on the display structure. An electronic device coupled to the sensor may be capable of determining an identity of the object, a quantity of the object, and/or any other property of the object present on the display structure based at least in part on the signal. The method may comprise, in some embodiments, visually indicating information related to the identity of the object, quantity of the object, and/or another property of the object present on the display structure.

Identifying a product (or any other type of object) involves more than just reading the label on a product or package of the product. In many cases, the product may be too small to hold a visible or easily readable label. In other cases, even if the product is capable of holding a visible label, it may be aesthetically displeasing for such a label to be visible when the product is on display. For instance, a cosmetic pen is a relatively small product and has scarce space to hold a visible label or to attach a readable tag. Furthermore, a visible label or tag may cheapen the appearance of the cosmetic pen. On one hand, it is desirable for a store, a store clerk or consumer to be able to easily identify a product that is on display. Yet on the other hand, it is also desirable that the identification not detract from the aesthetic appearance of the product. Thus, certain embodiments described herein are related to providing systems and methods for identifying products without the use of bulky or aesthetically displeasing labeling systems.

The present disclosure is applicable to sensors that can be attached to or formed on many types of displays. For example, the sensor may be attached to or formed on a wall, a shelving unit, a pegboard display or peg, a tray, or any other structure that the product may be hung from, set on top of, or otherwise displayed from.

Broadly, a sensor may be any trace or device that is capable of detecting the presence or absence of an object. For instance, a sensor on a peg may be a row of conductive traces that are capable of detecting when objects are placed on the peg. Similarly, a sensor on a shelf may be a piezoelectric sensor capable of detecting when an object is placed on the shelf.

While pegs, shelves, and trays are described specifically below, it should be understood that the inventive features described herein could be used in association with any display system, including display systems that do not include pegs, shelves, or trays. In addition, any features described herein as being used in a peg, shelf, or tray can also be used with either of the other two. That is to say, features that are described herein as being used in a peg could also be used in a shelf or tray, features that are described herein as being used in a shelf could also be used in a peg or tray, and features that are described herein as being used in a tray could also be used in a peg or shelf.

Certain aspects relate to systems and methods for electronically identifying one or more objects in contact with a display structure. In some such embodiments, the system comprises a display structure (e.g., a peg, a shelf, and/or a tray, as described in more detail below), and an object comprising a resistive element. The resistive element may have a preselected resistance. In some embodiments, the resistive element can be in electrical communication with the display structure when the object is in contact with the display structure. In some such embodiments, contacting the object with the display structure forms an electrically conductive pathway from a first electrical terminal associated with the display structure to a second electrical terminal associated with the display structure. In certain embodiments, one or more properties of the object may be determined based upon the effect of the resistive element on the electrical current transported through the object.

As described in more detail below, in some embodiments, the resistive element can be used to determine the identity of the object in contact with the display structure. In some embodiments, the resistive element can be used to determine the quantity of objects in contact with the display structure. In some embodiments, resistive elements can be used to determine the position of an object in contact with the display structure.

As one example, one aspect of the disclosure provides for a method of electronically identifying one or more objects hung on a display. For purposes of this disclosure, no differentiation is made between the object and the object's packaging. In other words, a packaged product and the packaging may together be considered to be the "object" described by the disclosure. The method may include providing a display peg protruding from the display, the display peg comprising a support structure and two electrically conductive terminals formed, printed, or in-molded on the surface support structure. The method may also include providing an object capable of being hung on the display peg. The object may comprise a resistive element having a preselected resistance. In some embodiments, the object may have a resistive element with a constant resistance. The resistive element may be printed, formed, or in-molded on a portion of the object that contacts the display peg when the object is hung on the display peg. The method may further include hanging the object on the display peg in a manner such that the resistive element of the object makes electrical contact with each of the electrically conductive terminals such that an electrical current is capable of flowing between the electrically conductive terminals via the resistive element.

The present disclosure is applicable to many types of displays. In some such embodiments, the display includes a peg or hook from which the product may be hung. The peg or hook can be affixed, in some embodiments, to a structure from which it protrudes substantially outward. For example, the display may be a wall, a shelving unit or a pegboard display, or any other structure on which a peg may be mounted such that the peg extends outward from the structure and an object may be hung on the peg. In some embodiments, the peg or hook may be attached directly to a wall of the store. In certain embodiments, the peg or hook may be attached to a shelving unit, pegboard, or other backing. In some embodiments, the peg may be rigidly attached to the support structure. Attachment of the peg to the support structure may be facilitated by one or more prongs, adhesive, screws, magnets, etc. In some embodiments, pegs can have 1 or more prongs to be attached to a pegboard, or no prongs at all. In some embodiments, pegs can be attached with adhesive, screws, magnets etc.

In any of the examples described herein, parts of the display may include electrical wiring. The electrical wiring may include standard electrical cables known in the art and/or stripes of conductive ink printed or formed onto the display. In certain embodiments, it may be advantageous to use conductive ink to form the wiring of the display (e.g., to form electrical traces on pegboards, pegs, shelves, trays, between the electronic components (e.g., a controller) and the display, or on or between any other components of the display). The electrical wiring may be included on the front or back of the display, or both. Including the wiring on the back of the display may be beneficial since a person such as a customer in a store will observe the products or objects hung on the display from the front of the display, and may not see the wiring in the back. For reasons described in greater length below, the wiring may be communicatively coupled to electronic devices, for example as part of an inventory tracking system. The electronic devices may include, for example, a system controller, a shelf antenna, a database server, and so on.

In certain embodiments, the display system comprises a base display unit (e.g., a board, a wall, or some other base unit). In some such embodiments, the display structure (e.g., a peg, a shelf, etc.) is removably attached to the base display unit. In some embodiments, the display system comprises a board comprising a plurality of holes. For example, the display system may comprise a pegboard. In some such embodiments, the display structure (e.g., a peg, a shelf, etc.) can be positioned within at least one hole of the board. In some embodiments, the electronic devices (e.g., including any of the electronic devices described elsewhere herein, including controllers) are in electrical communication with one or more display structures (e.g., one or more pegs, shelves, and/or trays) via the base display unit (e.g., via a board such as a pegboard).

In the example of the pegboard display, the electrical wiring may run in vertical or horizontal (or sometimes other directions) stripes. The wiring may be coupled to each of the holes in the pegboard. For example, in FIG. 1, the back of pegboard 110 can include electronic ink in series to provide instant contact to inserted pegs (or hooks). If the pegboard holes are a boxed array (as shown in FIG. 1), then the wiring may be organized such that every peghole in a first vertical column is coupled to a first wire, and every peghole in the next adjacent column is coupled to a second wire. The first wire may be coupled to the electronic devices, and the second wire may be grounded. In some examples, the first wires may alternate with the second wires. In other examples, each first wire may be coupled to a different electronic device (e.g., separate tracking systems for each column of pegholes). The same system may apply for wiring in horizontal rows instead of vertical columns (e.g., alternating horizontal wiring stripes). The wiring may be patterned differently if the pegholes are arranged in a different array. For example, if the pegholes follow a hexagonal pattern, the wiring may be arranged alternatingly as described above but along a diagonal line. Alternatively, the wiring may still be arranged vertically or horizontally, but more rows/columns of wiring may be needed to cover every peghole (in some examples, some pegholes may be skipped, for example if not every row or column of pegholes is expected to receive pegs).

In addition to the above described wires, the electrical wiring may include ribbon cables (e.g., a 16 pin connector). Each of the ribbon cables may include multiple ribbon connectors, where a ribbon connector aligned with each peghole (or at least each peghole that receives a display peg) is coupled to that ribbon cable. The ribbon connector may accommodate (e.g., be capable of receiving) a second ribbon cable that is affixed to the respective display pegs that fit into those pegholes coupled with the first ribbon cable. In this manner, multiple electrical wires may be connected from a single peg to the electrical wiring at a single peghole-peg interface. This therefore allows for multiple electrical signals to be transmitted between the electronic devices and a single peg and/or a product/object hanging from the peg.

In some examples, the ribbon connector may be located within about a centimeter of the peghole such that the ribbon cables of the peg and display wiring can be properly aligned with and coupled to one another. The electrical wiring of the display may be crimped to the ribbon connector in order to establish electrical connection. The interface between the electrical wiring on the display and a peg may also include a z-axis electrically conductive glue or tape.

FIG. 1 illustrates pegs (or hooks) 112 inserted into pegboard 110. In addition, in FIG. 1, products 114 are hung on pegs 112. Two or more electrodes can provide the ability to measure total resistance across them to count and verify inventory, track refill removal, and verify correct product placement, as described in more detail below.

In addition to (or alternative to) the electrical wiring, any of the displays described herein (including any of the displays employing shelves and/or trays, described in more detail below) may include coils for wireless power transfer and/or wireless communication. Like with the electrical wiring, each coil may electrically charge a component included in the objects (e.g., an RFID chip, a resistive element, an LED included in the object packaging) and/or information may be wirelessly communicated therebetween (e.g., an ID of the object). The wireless charging and communication may be bidirectional. In some examples, a transmitter coil may be mounted to the back of the display and a receiver coil may be embedded within the packaging of an object such that electrical wiring need not be run along the peg to communicatively connect the object to the electronic devices. In some embodiments, an object (e.g., package) could have a coil made to a certain frequency. That frequency can be read, in some embodiments, by a receiving coil thus acting as an individual package signature.

Figure 2A:
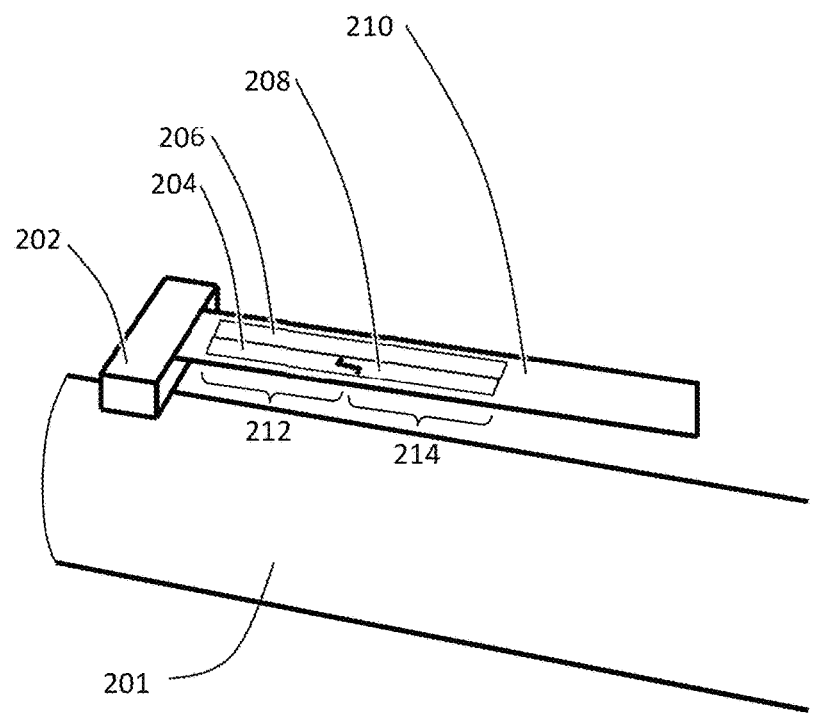
FIG. 2A is, according to some embodiments, a schematic illustration of the components of a display peg.
Figure 3:
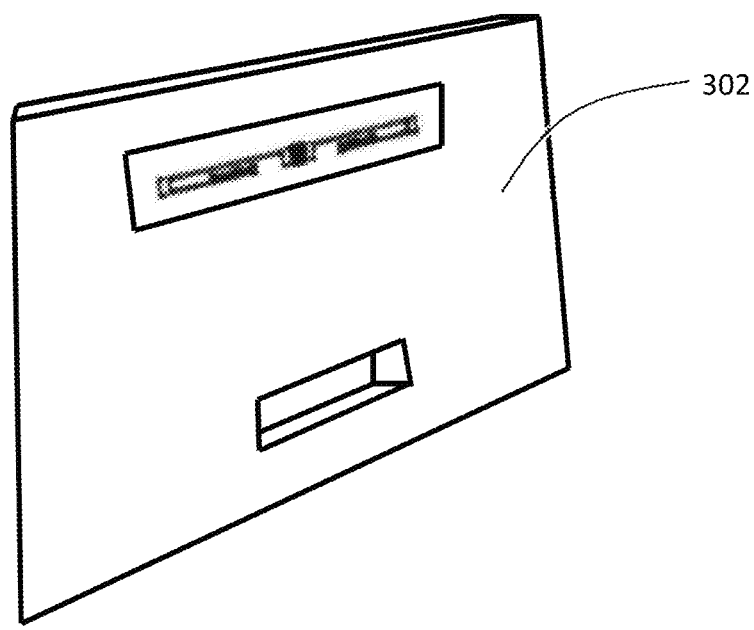
FIG. 3 is, according to one set of embodiments, a schematic illustration of a tail unit of a display peg.

The display hook (or peg) may comprise a support structure. The support structure may be made of a plastic or metal or other rigid material core. For example, in FIG. 2A, the display peg comprises support structure 201. The support structure may be covered with a flexible peg sleeve. The sleeve may be adhesive backed in order to permit for the sleeve to remain affixed to the support structure. For example, FIG. 2A illustrates flexible peg sleeve 210, prior to being affixed to support structure 201. The sleeve may be fitted to the peg using a shrink film such as a heat shrink wrap. In other examples, described below, the peg may be formed without using any sleeve. In FIG. 2A, the display peg further comprises ribbon connector 202. The display peg in FIG. 2A can be connected to tail unit 302, illustrated in FIG. 3.

Figure 4A:
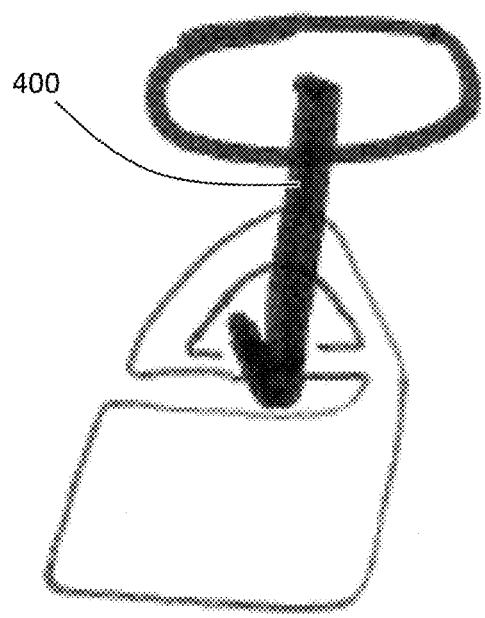
FIGS. 4A-4D are exemplary schematic illustrations of display pegs, according to certain embodiments.
Figure 4B:
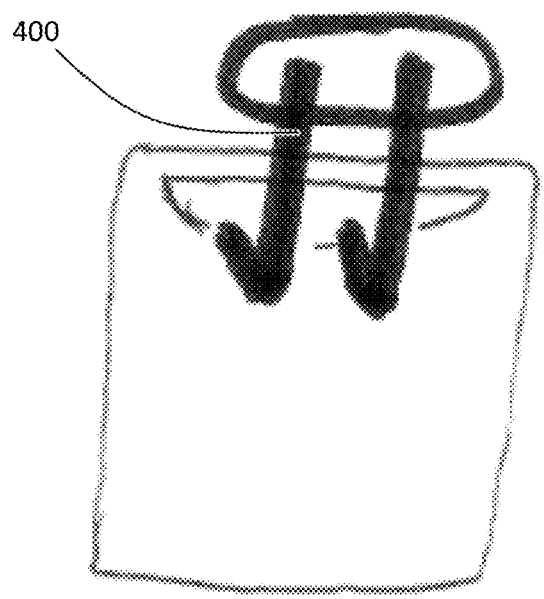
Figure 4C:
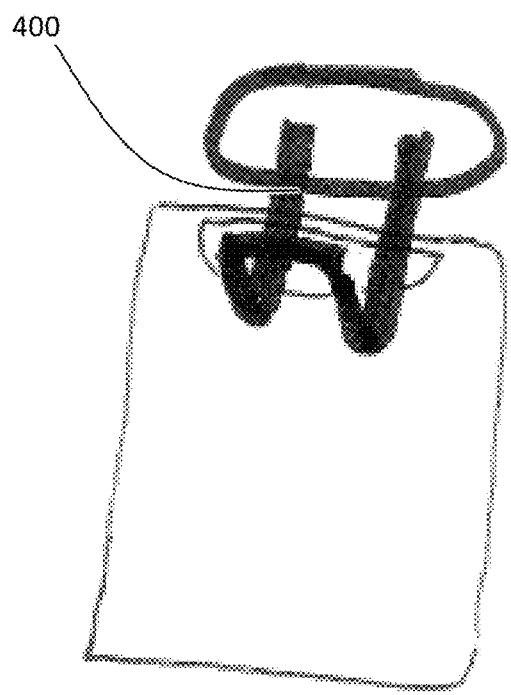
Figure 4D:
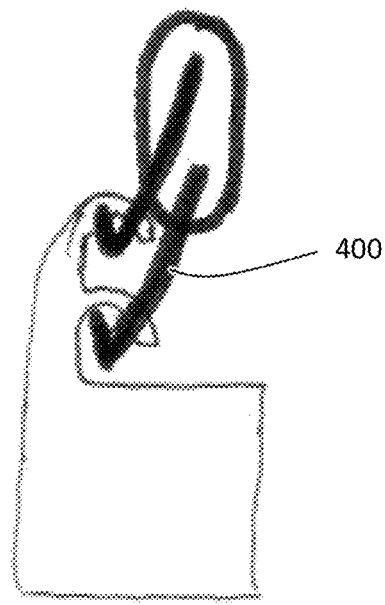

The display peg may come in any of various shapes and sizes. FIGS. 4A-4D illustrate some of the types of display pegs 400 that are applicable to this disclosure, such as a single rod straight peg (FIG. 4A), a double rod straight peg (FIGS. 4B and 4D), and a U-shaped peg (FIG. 4C). Other pegs applicable to the disclosure include brackets and straight rods without any hook at the end. While the illustrated rods are all substantially straight, parallel to the floor, and orthogonal to the display, other display pegs applicable to the disclosure may be more curved (such that any object hung on the peg slides to the minimum of the curve) and/or tilted (such that any object hung from the peg slides to the back or to the front of the peg).

In certain embodiments, the peg can be formed by arranging the peg support structure such that the support structure is at least partially surrounded by a substrate (e.g., a sleeve, mold, or the like) on which at least two electrical terminals are positioned. In some such embodiments, after the peg support structure is at least partially surrounded by the substrate, the electrical terminals form at least a portion of the outer surface of the display peg. In some embodiments, the substrate comprises a sleeve, and arranging the support structure can comprise wrapping the sleeve (which may have the electrical terminals printed on it or otherwise positioned on it) at least partially around the support structure. In some embodiments, the substrate comprises a mold (which can have the electrical terminals printed on it or otherwise positioned on it), and arranging the support structure comprises injecting support structure material into a cavity of the mold.

For example, in embodiments in which a sleeve is used, the sleeve may include electrical terminals. For example, referring to FIG. 5, peg 502 can comprise positive electrical terminal 506 and negative electrical terminal 508. The electrical terminals may be formed, printed, or otherwise fashioned (e.g., in-molding, etc.) using conductive inks or conventional circuits and circuit boards. A method by which conductive inks may be printed or formed or in-molded on surfaces has been taught in, for example, U.S. Pat. No. 8,198,979, issued Jun. 12, 2012, the disclosure of which is hereby incorporated by reference herein in its entirety. The in-molding process may involve first printing the electrical terminals on a mold (e.g., film) and then injection molding the peg into the cavity of the mold (e.g., film). Alternatively, the electrical terminals may be printed on a release paper, instead of a film, inside the injection mold. Using a release paper will cause the terminals to be molded to the outer surface of the peg without being sealed in or covered by the film.

In some examples, the sleeve may be a woven shrink wrap. The woven wrap may be fitted to the peg by sliding the wrap over the peg and then stretching the wrap lengthwise such that the diameter of the wrap constricts (similar to a Chinese finger trap). One or more electrically conductive threads or wires may be embedded in the wrap such that a first end of the wire touches the interface between the peg and the display (e.g., fits into a ribbon connector, contacts a z-axis adhesive on the front surface of the display, is crimped to an electrical wire behind the display, etc.) and the second end of the wire extends or pokes out of the sleeve at a location where an object may be hung. In this way, the wrap may function as an electrically conductive terminal for contacting an object hung on the peg to the display (and further to the electronic devices connected to the display).

Some conductive terminals may be ground terminals, while others may be coupled to the electronic devices. Each terminal may be electrically coupled via the electrical wiring in the display (e.g., via a circuit board, via conductive ink traces). In an example having several electrical terminals in a peg, each terminal may be coupled through the display using a ribbon cable and connector. As such, each terminal may provide a separate electrical signal.

The present disclosure generally applies to pegs that have at least two electrical terminals. One of the electrical terminals may be a ground terminal, grounded through the electrical wiring. The other terminal may be connected (e.g., electronically coupled) to the electronic devices such that information may be transmitted both ways between the electronic devices and a product or object hanging on the peg. The peg itself may include one or more electronic devices coupled to the terminals and to the electrical wiring (for example, as described below, the peg may include one or more LED lights capable of conveying information regarding the objects hanging on the peg or capable of conveying other information received from the electronic devices).

In some examples, at least one of the terminals may be replaced by a wireless coil. For example, the object may receive an electrical signal wirelessly at a receiver coil and then carry an electrical current from the receiver coil to a resistive element that is coupled to the peg from which the object hangs (or to another coil, such as a transmitter coil, to further wirelessly transmit the received signal).

In some examples, the electrical terminal coupled to the electronic devices may be segmented into multiple separate segments. Each segment may be capable of transmitting its own unique electrical signal, effectively establishing several electrical terminals on a single peg.

Figure 2B:
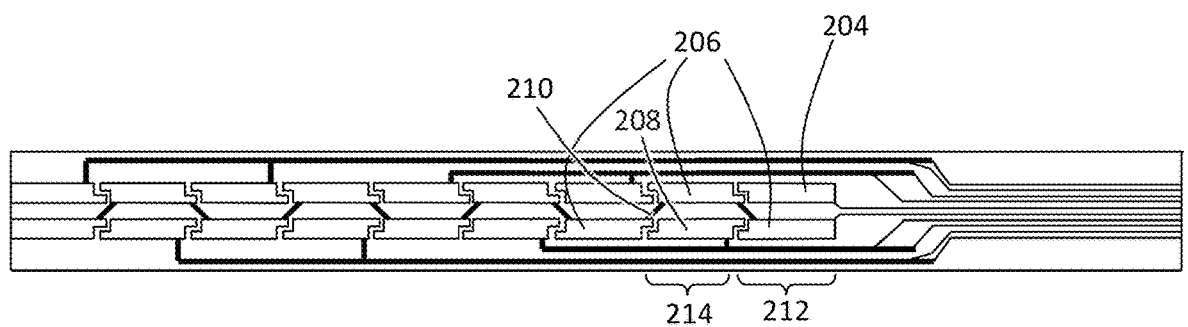
FIG. 2B is an exemplary schematic diagram illustrating a layout of electrically conductive terminals.

In some embodiments, the display peg comprises a first segment configured to transmit a first electrical signal from the display peg when an object is placed in electrical communication with an electrically conductive terminal of the first segment, and a second segment configured to transmit a second electrical signal from the display peg when an object is placed in electrical communication with an electrically conductive terminal of the second segment. For example, referring to FIG. 2A, the peg includes first segment 212 and second segment 214. In FIG. 2A, the peg includes a common rail 206 (which can be used as a ground terminal), a first electrical terminal 204, and a second terminal 208. In some embodiments, when an object is placed in electrical communication with terminal 204 and common rail 206, a first electrical signal can be transmitted from the display peg (e.g., to a controller or other electronic device capable of reading the signal from the display peg). In some embodiments, when an object is placed in electrical communication with terminal 208 and common rail 206, a second electrical signal can be transmitted from the display peg (e.g., to a controller or other electronic device capable of reading the signal from the display peg). In some embodiments, additional segments may be present (e.g., as illustrated in FIG. 2B). In some such embodiments, a third segment is configured to transmit a third electrical signal from the display peg when an object is placed in electrical communication with an electrically conductive terminal of the third segment. Fourth, fifth, sixth, etc. segments can also be present.

In some embodiments, the first and second segments share a common ground terminal. For example, in FIG. 2A, each segment shares common ground terminal 206. In other embodiments, the first and second segments comprise separate ground terminals.

In certain embodiments, the ground terminal can be arranged in a side-by-side configuration with the other terminal in the segment to which it is coupled. For example, in FIG. 2A, ground terminal 206 is arranged in a side-by-side configuration with first electrical terminal 204 and second electrical terminal 208.

While two terminal segments are illustrated in FIG. 2A, other embodiments may include more than two terminal segments. For example, in some embodiments, the peg may comprise three, four, five, or more segments. Each segment can include a pair of terminals to which electrical contact may be made. In addition, the layout of the terminal segments is not limited to the embodiment shown in FIG. 2A, and in other embodiments, other terminal layouts may be used. For example, FIG. 2B is a schematic illustration of an exemplary terminal layout that may be used, according to certain embodiments. In FIG. 2B, the terminal layout includes first segment 212 and second segment 214 (as well as 7 additional segments, each segment including a pair of conductive terminals). In FIG. 2B, multiple ground terminal portions 206 are arranged in a "zig-zag" pattern, and are interconnected via a plurality of intermediate electrical connectors 210. The active terminals (e.g., 204 and 208) are also arranged in a "zig-zag" pattern. The active terminals are independently electrically addressable via electric traces extending from the base of the peg, along the length of the peg, and to the hot terminals. Other layouts of electric terminals are also possible.

Certain embodiments comprise determining the location, on the display peg, of an object hanging from the display peg. This can be achieved, for example, by detecting a change in the electrical current flowing through the display peg (e.g., using a controller). One way this may be accomplished is by arranging a plurality of independently electrically addressable sensors along the length of the display peg. For example, as described above with respect to FIGS. 2A-2B, a plurality of segments of terminal pairs may be arranged along the length of the display peg. In some embodiments, these segments may be independently electrically addressable such that, when an object comprising a resistive element (e.g., including any of the resistive element configurations described elsewhere herein) is placed on the peg, the location of the peg can be determined by determining which of the segments exhibits a change in resistance. Similar schemes can be employed in non-resistive sensors. For example, in some embodiments, a row of capacitive sensors, pressure sensors, or any of the other sensor types described herein may be arranged along the length of the peg. The location of an object placed on the peg can then be determined, for example, by determining a change in an electrical current flowing through the peg (e.g., by determining which sensor transmits an altered electrical signal when the object is placed on the peg).

The terminals may be placed on the surface of the support structure of the peg such that an object hung from the peg contacts the surface of the peg at the terminal. In some examples, the terminal is placed along the top surface. Some of these examples are shown in the accompanying illustrations in FIGS. 4A-4D. In other examples, for instance where the object hung from the peg is hung by a narrow hole that touches the peg on all sides of the hole, the terminal may be placed along any surface of the peg. It is generally preferable, however, to place the terminal along the upper surface since the gravitational force exerted on the object hanging from the peg generally provides for the most reliable electrical connection along the top surface of the peg.

If the peg is a single rod straight peg, each of the terminals may be formed along the top surface of the rod. Each surface may extend along the length of the rod, either along the entire length or a substantial portion of the length (e.g., half, most, 90%, up to the curved part of the peg, etc.). If a terminal is divided into several segments, each segment may occupy a distance along the length of the rod such that at any cross-section of the length of the rod, there are exactly two terminals, a ground terminal and an active terminal.

If the peg is a double rod straight peg, each rod may include a terminal. In other words, the ground terminal may be formed on the left rod and the active terminal on the opposing right rod, or vice versa. Alternatively, the terminals may be formed on the same rod of the double peg.

In some examples of the disclosure, a cross-section of a peg (one rod or two) may include more than two terminals. For instance, one terminal may be connected to ground while the other terminals may each be connected to different electronic devices (e.g., one terminal to a server, to an LED, to an alarm, to an antenna for wireless communications, etc.). In such an example, each of the terminals along the cross-section may provide the same electrical signal or different electrical signals to the electronic devices respectively.

In an example where the terminal is segmented along the length of the rod, the segments may be spaced such that one object fits per segment. For example, if a peg is designed to receive a packaged razor, and the packaging of each razor is about 2 inches thick (i.e., about 5 razors can fit on a rod that is 10 inches long), then each segment may be about 2 inches long such that each razor packaging, when hung from the rod, touches a different segment of the active electrical terminal. In this manner, each razor packaging may send a different electrical signal through the rod to the electrical devices. In these examples, each segment may be connected to a different respective wire of the second ribbon cable.

While certain of the above examples have been described as applying to a rod or peg having a flexible sleeve, in other examples, the wiring (e.g., conductive ink traces) may be printed/formed/in-molded directly to the rod/peg itself without any need for adhesive backing. For example, in some embodiments, the peg (or hook) can be made from an electrically conductive material, such as copper or steel. The circumference of the peg may be coated with a dielectric or a nonconductive insulating material. The sensor can then be attached to or formed on the coating along a surface of the circumference of the peg. The conductive material may be grounded by way of the support structure to which the peg is affixed. As such, the conductive material may function as the ground electrode of the sensor.

In some embodiments, instead of coating the solid core of the peg with a material, the sensor can be preprinted on a wrapper, and the wrapper can be wrapped around the core of the peg. The core of the peg (which itself can be hollow or solid) can be made, for example, from paper, plastic, metal, or any other suitable material. The wrapper may be made from paper or a film that acts as a carrier. The peg can be made using other processes, such as injection molding, blow molding, slush molding, etc. During the molding process, the peg may be cast with an inlaid conductor. Alternatively, a conductive material may be printed (e.g., via three-dimensional printing) onto the peg. The conductive material in any of these examples may be formed or printed such that it contacts the sensor to complete a circuit.

In some embodiments, the peg can be cast with inlaid conductors. In certain embodiments, the peg can be 3D printed with conductive materials, or 3D printed on top of conductive materials to form a trace.

In some molding processes, the peg may be produced flat with hinges. For example, the peg can be mechanically hinged, living hinged, or printed with predetermined bend areas. In some embodiments, the peg can be direct printed, ink jet printed, transfer printed, adhered to (e.g., pressure-sensitive adhesive (PSA) adhered to), or otherwise have circuitry attached to the surface of the peg. After production, the peg can be folded or bent to form its finished shape. As such, the sensor and conductive traces may be formed on a flat surface and subsequently bent into a finished circuit. When using conductive inks to form the sensor in such examples, it may be advantageous to use one or more thermoformable or stretchable inks so that the electrically conductive areas of the circuit do not deform or crack when the peg is folded into its finished shape.

In some embodiments, the electrical terminals may be any standard wiring that is affixed directly to the peg or to a sleeve fitted around the peg by any means known in the art. As such, the present disclosure is not limited to in-molded or printed electrical connections but to any type of electrical connection that can be established between the product (e.g., while hanging on the peg, while resting on a shelf, etc.) and other electronic devices (e.g., an inventory management system).

The object (that is, the object itself or its packaging) may include a resistive element. The resistive element, like the other wiring of the present disclosure, may be formed using conductive inks. The resistive element may be formed/printed or otherwise fashioned onto the object on a portion of the object that contacts the peg when the object is hung from the peg. In this fashion the resistive element may complete an electrical connection between the terminals included in the peg along a given cross-section of the peg (or between terminals associated with any other display support type, such as a shelf or tray). In some embodiments, the object can include a first electrical contact associated with an interface of the package (e.g., a loop of the package) that is configured to contact the support mechanism and a second electrical contact that is configured to contact the peg. In some such embodiments, the resistive element (which can be formed of conductive ink) can form an electrically conductive pathway from the first electrical contact to the second electrical contact. For example, as illustrated in various of FIGS. 6A-6C and 6E-6H, the resistive element 602 may be formed at the top of loop 604 such that both terminals contact the resistive element. It may be beneficial for the loop by which the object hangs to be curved such that good contact is made between the terminals of the peg and the resistive elements of the object (as opposed to if the loop were flat and the object could slide side to side on the peg).

In some embodiments, the first and/or second electrical contacts of the resistive elements are arranged along an interior edge of the loop. For example, in FIG. 6A, resistive element 602 comprises contacts formed along the interior edge 606 of loop 604.

The examples shown in FIGS. 6A-6I are not meant to be limiting to the disclosure but rather to show the many ways in which the resistive element may be configured in order to contact the terminals of the peg. The object may include a loop with an arched top (e.g., FIG. 6A), such that a single rod peg having a terminal along its top surface would contact the top of the loop. Some objects may include loops with two arches for hanging on double straight rod pegs (e.g., FIG. 6B). Some objects may include a narrow loop (e.g., FIGS. 6C-6E). Because the narrow loop may contact all surfaces of the peg, the resistive element may be placed anywhere along the narrow loop (and for that matter anywhere along the circumference of the peg) The resistive element may directly connect the two terminals (e.g., FIG. 6C), may connect the terminals through a more conventional resistive element (e.g., FIG. 6D), and may provide other electrical components (e.g., an RFID tag) between the resistive elements such that the other electrical components are serially connected between the terminals (e.g., FIG. 6E). Instead of a conventional loop, the object may include a slit that opens when the object is placed on the peg enough for the object to be received by the peg and maintain electrical contact between the peg and all or any sides of the slit (e.g., FIG. 6F). In some examples, the object may include one or more wireless receiver coils coupled to a resistive element, such that the resistive element establishes an electrical connection between a wire terminal in the peg and a wireless transmitter (e.g., in the display) (e.g., FIG. 6G). In some examples, the object may include an open slit instead of a loop (e.g., FIG. 6H), or multiple loops electrically connected to one another (e.g., FIG. 6I).

In some embodiments, the resistive element of the object can comprise conductive ink, and the conductive ink can form at least a portion of the graphic image. For example, in some embodiments, the object can be a packaged article, and a trace of conductive ink (which can serve as the resistive element) can form at least a portion of a graphic image on the package. The conductive ink may be formed, for example, as part of a printing process in which the conductive ink alone, or the conductive ink along with other colors of ink, are formed on the package. In some embodiments, the conductive ink can be in the form of dots on the product or product package. In certain embodiments, dots of other colors (e.g., cyan, magenta, yellow, or any other colors) may be present along with the conductive ink on the product package. In some embodiments, the conductive ink may be deposited as part of a multi-color printing process. For example, the conductive ink may be printed on the package as part of a standard four-color printing process (e.g., a CMYK (cyan, magenta, yellow, key) printing process). In some embodiments, the conductive ink can be used as a black (i.e., "key") component of the printing process.

Figure 7:
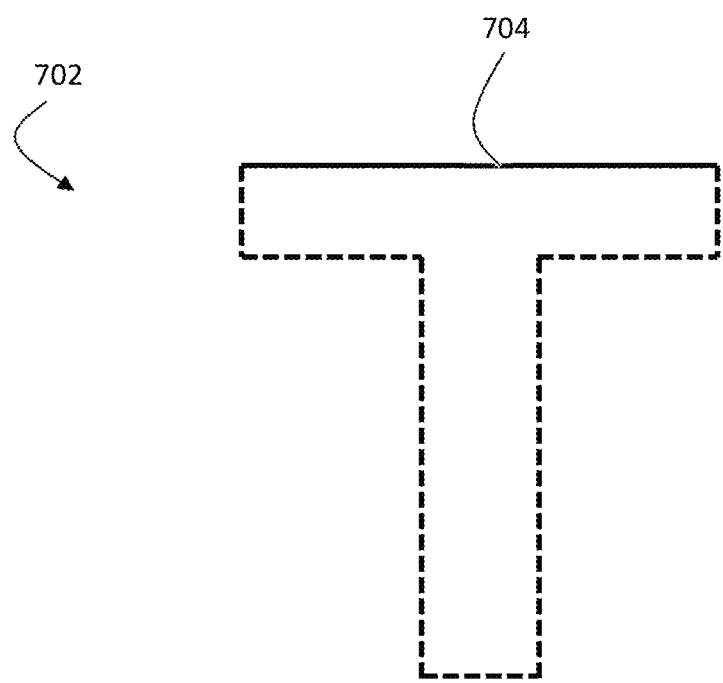
FIG. 7 is, according to some embodiments, a schematic illustration of a conductive ink trace incorporated with a graphic image.

The conductive ink may be incorporated into any kind of graphic content, including text, images, and/or symbols. In some embodiments, the conductive ink can be arranged along the edge of the graphic content (e.g., text, images, or symbols). For example, FIG. 7 is a schematic illustration of graphic element 702 (the letter "T"), which is outlined in dashed lines. In this embodiment, conductive ink trace 704 (shown in solid line) has been arranged along the top edge of the graphic element. In some such embodiments, positioning the conductive ink in this fashion can make it difficult for a viewer to visually detect the regions in which the conductive ink is present, which can help avoid distracting the viewer's attention from the graphic elements of the object (e.g., package).

In some embodiments, the conductive ink used in the object (and/or, in the electrical wiring described elsewhere herein) can be a carbon-containing conductive ink. The use of carbon-containing conductive inks can be advantageous, in certain but not necessarily all embodiments, as the resistance of structures formed using such inks varies linearly with the length of the structure. This linear variability can make it easier to design unique resistive elements (e.g., for each of the different types of objects that one wishes to detect). For example, if one wishes to design resistive elements having resistances of 10Ω, 20Ω, and 30Ω, one can fabricate a resistive element having a first length for the 10Ω resistance, a resistive element having a second length that is twice that of the first length for the 20Ω resistance, and a resistive element having a third length that is three times the first length for the 30Ω resistance. On the other hand, if the variation in resistance were non-linear (as may be the case for certain conductive inks that do not contain carbon), the non-linearity of the relationship between resistive element length and resistance would need to be taken into account when designing the resistive element. While the use of carbon-containing conductive inks may be advantageous in some embodiments, it should be understood that the present disclosure is not limited to the use of carbon-containing conductive inks, and in certain embodiments, conductive inks that are free of carbon may also be used.

The disclosure further provides for several object (e.g., package) shapes and designs (e.g., a package that is designed to hang on a peg). In some embodiments, the object (e.g., package) may have a resistor, dielectric, semiconductor, or conductor printed on its surface near or on the peg hole that will communicate the resistor, capacitance signature, proximity or other sensing method to the peg surface that will further communicate the individual identity of the object. The object may have an LED or other optical device and/or sound device and/or heating device and/or current carrying traces that interact with the peg surface. The die cut hole may have a flap that bends either forward or backwards and has exposed ink. In some embodiments, through hole printing after die cutting can be used to put ink on the inside of the peg hole.

In addition to the above described resistive elements, the object may include a radio frequency identifier (RFID) capable of emitting a radio frequency signal. In some examples, the RFID may be a passive RFID, that is, the identifier is powered by an outside frequency source. For instance, if the RFID is included in the object, the object may be scanned by a store clerk, and the scanner may activate the RFID such that the scanner can read the information contained in the RFID circuitry. Alternatively, the RFID may be activated by a scanner stationed at the entrance and/or exit of the store such that an alarm may be sounded by activation of the RFID (e.g., in response to energy provided by the scanner, the RFID generates its own signal that is detected either by the scanner or by another receiver which then activates the alarm). In some examples, the RFID may be activated by a wireless receiver included in the object and coupled to the RFID. The RFID circuitry may contain about 96 bits or more of information. 96 bits may be enough information to provide a unique ID for every product in a given store (a total of 2^96 possible IDs). Passive RFID technology is well established and may be used for long range detection. However, passive RFID, in some applications, may be prohibitively expensive. In some embodiments, information contained in the RFID circuitry can indicate the identity of the product, or other information related to the product (e.g., brand, model number, color, cost, etc.).

In other examples, the RFID may be a chipless RFID. The chipless RFID may also provide a unique ID having between about 2 to about 8 bits, or in some examples more bits. While chipless RFIDs are generally short range devices (e.g., scannable from about 10 feet away), the RFIDs may be coupled to long range antennae in order to give the signal a higher range (e.g., a hundred feet, several hundred feet, etc.). The chipless RFID may also be passive (i.e., does not generate its own signal without being provided with an external power source). The resonating circuitry of the RFID may be as small as about 4 microns in diameter, making inclusion of the circuitry in packaging of an object or in the object itself both feasible and cost effective. Data may be captured from this technology at a relatively fast rate (e.g., about one bit in two microseconds).

In some examples, the RFID may be electrically coupled to the resistive element. For instance, hanging the object on a peg may establish an electrical connection between two terminals of the peg using two separate resistive elements, with the RFID serially connected between the resistive elements. In this manner, the RFID may be powered by a power source (e.g., a battery) connected to the active terminal. Alternatively, the RFID may transmit information over the active terminal to a connected electronic device (e.g., automatically, when powered by a scanner, when powered by a battery coupled to one of the terminals). In one such example, a cross-section of the peg may include three or more terminals, where one terminal provides a power source, one terminal is grounded, and a third terminal receives information from the RFID. The information may indicate the identity of the object, or other information related to the object (e.g., brand, model number, color, cost, etc.).

FIG. 1 provides an illustration of how the resistive element may be positioned on a loop or other hanging means/mechanism included in the razor packaging such that an RFID device is connected to the terminals. In the leftmost picture, an electrical connection between the RFID (small oval 102 at the bottom of the picture) and the loop (white slit 104 at the top of the picture) is formed by wiring (bold curvy lines 106). In some embodiments, solid or segmented conductive ink 108 can be used. The conductive ink can be sensing or power providing.

Figure 8:
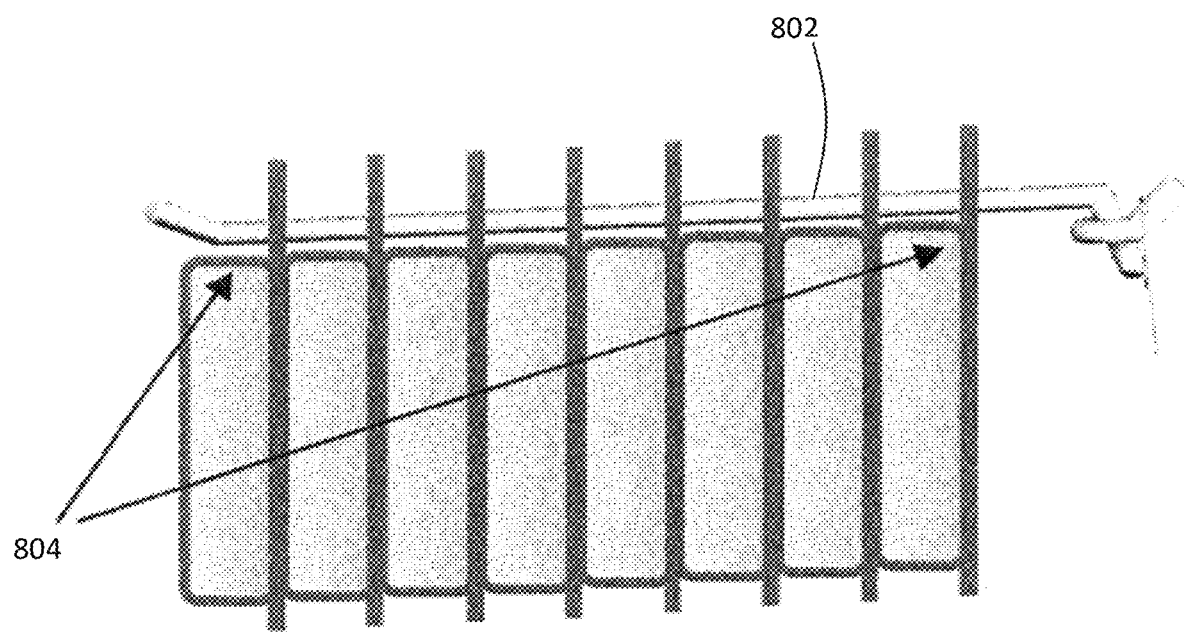
FIG. 8 is a schematic illustration of a display peg from which multiple objects are hung, according to some embodiments.

As shown in FIG. 8, multiple objects 804 (e.g., products) may be hung on a single peg 802, according to certain embodiments. In the exemplary embodiment illustrated in FIG. 8, each object (e.g., package) may have a 10Ω resistance, and the peg may have a 1.25Ω resistance.

The product can include electrical connections for both sensing and powering. For example, the sensor can read a resistance across the negative and positive trace lines in a product. The sensor can then communicate that resistance to an electronic module for deciphering and further action. Additionally, the sensor can relay pulsed power through the same trace lines to power the product (e.g., an RFID in the product, an LED indicator in the product, etc.). In some embodiments, an object (e.g., a package) comprises a heating circuit such that, when power is sent to the object, the object is heated. In some such embodiments, heating the object can remove moisture and/or condensation. In some such embodiments, the object may self heat a product before use (e.g., to keep buns warm, to warm a drink, or for any other use). Such systems can, in some embodiments, use less power than microwaves and render the product ready to sell in a warmed state.

In some examples of the disclosure, the resistive element may work in tandem with the RFID. For example, the resistive element may provide information to the connected electronic devices while the RFID provides other information to a handheld scanner. In one such example, a person may scan an object hanging on the peg. Scanning the object may identify the precise identity of the object (e.g., a 96 bit ID) or may identify a general identity that may belong to a small pool of possible objects (e.g., an 8 bit identity). Scanning the object may not indicate how many of that object is hanging on the particular peg scanned. However, the resistive element may provide information to the electronic devices indicating the quantity of an object hanging on a given peg. The scanner may be equipped with an antenna for communicating with the same electronic devices as the peg, such that the electronic devices may receive information from both the resistive element via the display wiring as well as from the RFID via the scanner. As such, the electronic devices may determine the type of object scanned and how many of the object are on a given peg. Thus, the scanner is only needed to scan a single product on each peg or on each shelf, and the electronic devices can then sum the total number of products that are present among the several scanned pegs and shelves in the store, providing a complete inventory check.

Determining the quantity of an object on a given peg may be accomplished in one of several ways. For example, in some embodiments, the property determination can be made based at least in part upon a value of resistance of the electrical signal received by the controller from the peg. In some embodiments, the property determination can be made based at least in part upon a change in resistance of the electrical signal received by the controller from the peg. Similar methods can be used with shelves and/or trays, described in more detail below.

One determining process involves hanging several objects on a peg having only one active terminal and one ground terminal. Each object may have a resistive element with a preselected resistance or resistivity. Therefore, if two of the same object are hanging on the peg, the equivalent resistance between the terminals will be half of that if only one of that object were hanging on the peg. Given a known voltage drop across the terminals, the amount of electrical current traveling between the terminals may indicate the quantity of an object on the peg. In some embodiments, the object may have a resistive element with a constant resistance.

In some embodiments, an identity and/or quantity of the object in contact and in electrical communication with the peg (or other display structure) is determined by detecting a value of electrical current (or a change in the value) flowing through the object and at least one other object. In other cases, an identity and/or quantity of the object in contact and in electrical communication with the peg (or other display structure) is determined by detecting a value of electrical current (or a change in the value) flowing through a single object.

For illustrative purposes, each Gillette® Fusion® razor may be packaged in packaging having a 10 kΩ resistive element, while each Gillette® MACH3® razor may include a 20 kΩ resistive element. These resistive values may be preprogrammed into the electronic devices. Therefore, if a 10V battery source is provided to a peg holding one of these two products, the electronic device may interpret a 1 mA electrical current to mean that one Fusion® or two MACH3® razors are hanging on the peg. By scanning any object on the peg, the electronic device may determine whether Fusion® or MACH3® razors are hanging on the peg, thereby determining the quantity and type of object on the peg.

In other examples, the active terminal may be separated into separate segments such that each segment may have a different electrical current traveling across that segment. In those examples, if several Fusion® razors were placed on such a peg, each terminal would have a 1 mA current traveling across. If every object that could be hung from that peg would have a unique resistive element having a unique resistive value, the electronic device could determine the object hanging from each segment from each peg without any information from a scanner. Alternatively, even if every product were to include a resistive element having the same resistive value (e.g., 10 kΩ), the electronic device could determine the quantity of the object hanging from each peg without knowing the identity of the object, and may further receive information regarding an object's identity from the scanner. In this manner, the electronic device may assume that every object on a peg is identical and use the identity information from a scanner that scans the front object on a peg to determine the identity of every object on the peg. As such, if there are fifty Fusion® razors in a store, five pegs having ten razors each, a person would only have to scan the front five razors in order for an electronic inventory management device to determine that there are fifty Fusion® razors in the store. This would significantly reduce the amount of manual work needed to collect inventory information in the store.

The above described system may also be capable of determining when an object is placed on the wrong peg. For example, if one Fusion® razor and one MACH3® razor were both placed on the same peg, the equivalent resistance of the razors would equal about 6.67 kΩ. As such, in the example where the peg includes only one active terminal and one ground terminal, a 10V drop across the terminals would result in a 1.5 mA current. Since the 1.5 mA current would not match any of the currents that the controller expects to detect if one a single product were hung from the peg, the system may determine that two different products are hanging from the peg. The system may then alert a person (e.g., an employee of the store) to investigate the peg and move an object off the peg and back to its proper peg.

While these specific examples have been described for a peg-based system, it should be understood that, in other embodiments, similar strategies may be employed with shelf and/or tray systems.

While the above examples relate specifically to objects having resistive values associated therewith, the disclosure applies similarly to objects having capacitive values or RC values (e.g., where the voltage provided from the controller is alternating having a range of frequencies, and an AC current produced may be used to identify the object). For example, each product may have a unique capacitance or RC impedance value printed on it, which may be detected by the electrical terminals of the peg or shelf on which the product is placed. The above described system could then count the quantity of the product and even determine if the wrong product (e.g., two different products) is present on the peg or shelf.

In some examples of the disclosure, a capacitive element may be used in place of or in addition to the resistive element. The capacitive element can also be formed in the object using similar methods. For example, in some embodiments, a capacitance sensor can be integrated into a peg (e.g., via in-molding) such that the peg can read different capacitance signatures either of an object or a label attached to the object.

There are certain differences between using a resistive element and a capacitive element in connection with a product. Firstly, the resistive element encodes and conveys information by means of a resistive value. By contrast, the information encoded in and conveyed by the capacitive elements is carried in a capacitive value. Secondly, the resistive element can generally only communicate with sensors that come in physical contact with the element. By contrast, the capacitive element may communicate with any sensor to which the element is capacitively coupled, even if it does not physically contact the sensor. Thus, an object having a capacitive element may be capable of communicating with sensors without physically contacting the sensors.

In some embodiments, sensors may include a mix of both capacitance and resistive sensing. In some such embodiments, an object that has a capacitance signature through a label can be read by a peg, and an object that has a resistor can also be read off the same peg.

In some embodiments of the disclosure, it may be unnecessary to include either a resistive element or a capacitive element in the product. For example, the product may not include a resistive element or a capacitive element if it is identified by a weight sensor or force sensor or visual sensor, or any other sensor that does not rely on a resistance or capacitance to identify information about the product.

The present disclosure is not limited to identifying products based on resistive, capacitive, or RC impedance values, but also includes identifying products based on weight or weight distribution. For example, a shelf or peg may be equipped with both a weight sensor and/or pressure sensor capable of collectively determining both weight and weight distribution. The sensor could, based on distributions, identify the product present on the peg or shelf, and then by summing the total weight, determine the quantity of the product present. Such determinations do away with the need to scan products entirely, since products would effectively be scanned simply by being placed on their respective displays.

Further, the present disclosure also covers identifying products based on codes printed or otherwise attached to the products. For example, a visual sensor may be capable of identifying a product based on a bar code or QR code. The visual sensor may further be capable of scanning each product on the peg or shelf and determining a total quantity of products. Alternatively, the visual sensor may work in tandem with a second sensor, such as any of the above described resistance, capacitance, RC impedance, weight or pressure sensors, to determine quantity.

The present disclosure provides, in some embodiments, for peg constructions having one or more mechanical sensors built into the peg. For example, a balloon peg may be used to detect changes in weight or pressure. The balloon peg may be formed from a solid core. In some such embodiments, a balloon is formed, like an inflated sheath, around the core. A pressure sensor, strain gauge, and/or a force sensor can be attached to the end of the balloon. As the air pressure is displaced because of different weights being applied to the balloon surface in different locations, the composite of displacement can be read to equal a weight sensor that can represent a certain object. Also, changes in the air displacement inside the balloon may be indicative of pressure or weight changes on the balloon surface, which could be read by the above described sensors to indicate that a product has been placed on or lifted from the peg.

The balloon peg can be made up of multiple segments. Each segment may include its own air chamber or compartment such that air is displaced within a single chamber without affecting any of the connecting chambers. Such a construction may indicate not only a change in pressure or weight, but also identify the location of change relative to the peg.

In addition, the balloon surface may also (or alternatively) be printed with conductive traces. The conductivity of each trace would vary as the balloon stretches or contracts. Alternatively (or in addition), the conductive trace could indicate a resistance (or capacitance) increase when a product is rested on the trace. An electrical circuit connected to the conductive trace could then interpret the changes in resistance (or capacitance) to make determinations similar to those of the pressure sensor and strain gauge described above. Thus, conductive traces could use product weight, electrical resistance, or a combination of the two, in order to identify a product on (e.g., touching) the balloon.

The balloon peg could have one or more conductive traces printed along the interior or exterior of the balloon, the conductivity of each trace varying as the balloon stretches or contracts. Each trace could be a separately conductive segment, and could be connected to a separate circuit or sensor for performing independent sensing operations. In an embodiment where the balloon is broken up into separate chambers or compartments, a separate trace could be located on each respective separate chamber.

In some embodiments, the balloon peg with pre-printed sensors can be blown up on site.

Figure 9:
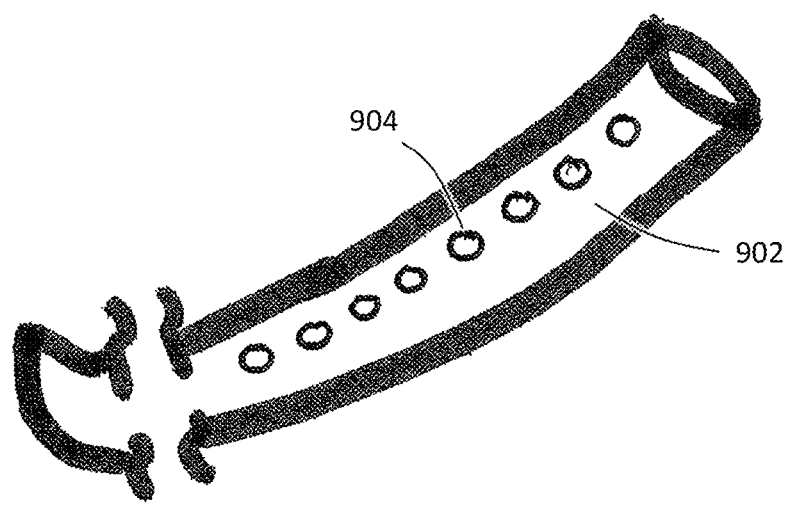
FIG. 9 is a schematic illustration of a display peg, according to some embodiments.
Figure 10A:
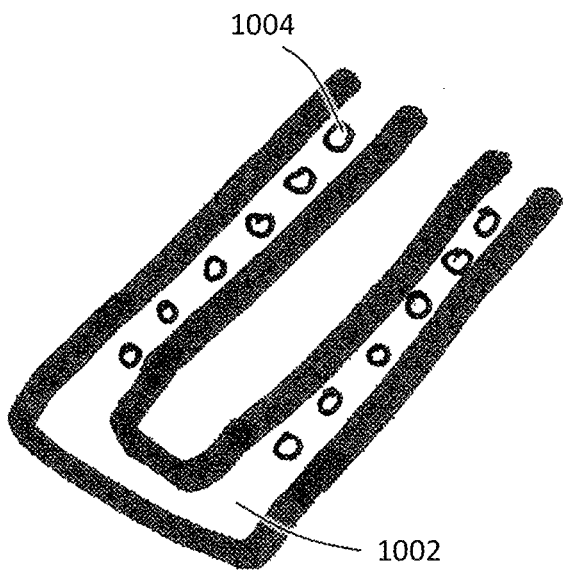
FIGS. 10A-10B are, according to some embodiments, schematic illustrations of display pegs.
Figure 10B:
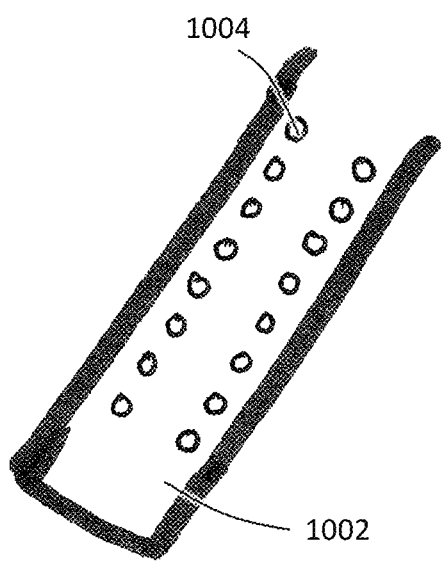

The number of sensors and conductive materials that may be attached to or formed on the peg (or hook) is limited only by the amount of available space on the peg's surface and the size of each sensor or conductive trace. Sensors may be located on any portion of the peg's circumference, and in some embodiments may be located on a front end of the peg, opposite the end of the peg affixed to the support structure. Conductive materials can be located in any of the aforementioned locations, and may even be located on the back end of the peg. In some embodiments, multiple sensors may be located along the surface of the peg. For example, in FIG. 9, peg 902 comprises multiple sensors 904 arranged in a row from the front end to the back end of the peg. In some embodiments, the peg may include multiple rows of sensors. For example, in FIGS. 10A-10B, peg 1002 comprises multiple sensors 1004 arranged in rows from the front end to the back end of the peg. Conductive traces can similarly be lined along the circumference of the peg.

Figure 11:
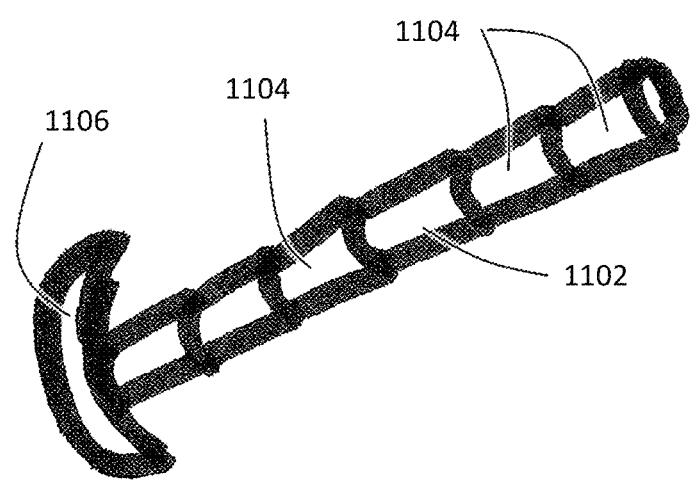
FIG. 11 is a schematic illustration of a display peg comprising multiple peg segments, according to some embodiments.

In some examples, the peg may be made from smaller peg segments. Each peg segment may itself be a complete peg, as described above, capable of attaching to other complete pegs to form a larger or longer peg. For example, in FIG. 11, peg 1102 comprises multiple peg segments 1104, each of which may itself be a complete peg. Alternatively, some peg segments may be formed with sensors and/or conductive traces using the processes described above, while other peg segments may be formed without sensors or conductive traces. For example, in FIG. 11, nonconductive segment 1106 with no sensors may be attached to the front end of a conductive segment having a sensor, for ornamental purposes, safety purposes, or to keep products from slipping off of the peg.

In each of the embodiments described above, the peg may further include, in addition to the sensors and conductive traces, other electrical components for information or energy transfer. For example, the peg may include a piezoelectric cell, a photovoltaic cell, or a radio receiver/transmitter in order to facilitate energy generation or energy transfer. Harvested energy may be derived from any of kinetic energy, solar energy, microwaves, AM waves, FM waves, or magnetic flux. The peg may also include additional components such as switches (e.g., magnetic switches), RFID chips, and antennae. The use of such additional electrical components is not limited to embodiments in which pegs are employed, and in some embodiments, the additional electrical components described above can be used with any of the systems comprising a shelf and/or a tray, described in more detail below.

The peg may take any one of various shapes. It can be square or round or triangular. The upper side of the peg can be flat, round, or flat with rounded sides. In some embodiments, pegs can be completely round, square, triangular or any other shape including extending and contracting sections to change the shape or size of the peg. They can have a flat top and rounded sides or all flat sides with or without radius. They can have a series of dips or curves, or be completely straight. The edges of the upper side of the peg may or may not be tapered. For example, in FIG. 12A, peg 1202 has a substantially square cross-sectional shape. On the other hand, in FIG. 12B, peg 1202 has notches formed in the upper left-hand and upper right-hand corners of the peg.

The construction of the peg is not limited to the embodiments described above. In some embodiments, the peg comprises a label (e.g., an in-molded label) that has conductive traces exposed on the peg, and that can carry power to the object (e.g., package) that is bridging the traces. In some such embodiments, the object has an electronic component that will activate when power is sent from the peg to the object.

In some embodiments, operation of the peg is alternated between a first state in which a sensing trace is set where the electronics read the resistance across the negative and positive trace lines and communicate that resistance reading to an electronic module for deciphering and action, and a second state in which power is pulsed through those same trace lines to power a package that contains lights, RFID or any other active component or sensor requiring power.

In some embodiments, pegs can receive power wirelessly from other pegs to transfer power as repeaters. In some such embodiments, if 1 peg has power and is in close enough proximity to a repeater coil, additional pegs will get power as well.

In some embodiments, the peg comprises a proximity sensor (e.g., positioned at the end of the peg). In some such embodiments, when a consumer approaches, the peg can determine that someone is there. Such arrangements may be used as an occupancy sensor. In some embodiments, the occupancy sensor can start a timer to track how long someone is there looking at a product or other object. That information, coupled with information regarding what they touch and put back versus what they don't touch, versus what they touch and buy is valuable data to determine buying habits and if the packaging or display is increasing sales. Proximity sensors may also be used on any other part of the display (e.g., on a shelf, on a tray, etc.)

In some embodiments, objects (e.g., packages) can be held magnetically to a peg board instead of with holes. For example, in certain embodiments, an iron-containing material can be printed on the object and can be used to hold the object onto a peg of a peg board. In some such embodiments, one object holds its position next to an adjacent object and/or to the peg due to magnetic pull on the peg wall. In some embodiments, the object can be made of magnetic materials. In certain embodiments, magnets can be attached to the object(s) to hold them in place. In some embodiments, a magnetic field that is polarized is employed, which can allow for object to be held in the field without any pegs. In some such embodiments, the object would float in the air between the poles of the magnetic field.

Certain embodiments make use of power harvesting pegs. For example, in some embodiments, the pegs have the ability to harvest energy, for example, through piezoelectric movement on the pegs, which can be used, for example, to recharge a battery or capacitor. The energy harvesting can be by kinetic energy, solar energy, wave harvesting of microwave, AM and FM waves, or magnetic flux.

In some embodiments, pegs can have in-molded hard sensor components such as magnetic switches, RFID readers and/or chips, antennae, etc. In certain embodiments, RFID chips can be embedded in each segment, and the peg can be the antenna that holds them in place and also harvests energy to be self-powered by storing that energy in a capacitor.

In some embodiments, the display comprises (in place of, or in addition to one or more pegs) a shelf on which a product may be placed. In some such embodiments, a sensor can be mounted on or in-molded to either a top surface or a bottom surface of the shelf. For example, if a shelf is plastic and a capacitive sensor array is affixed underneath the surface (e.g., on the "B" side) of the shelf, any conductive object placed on top of the surface (e.g., on the "A" side) of the shelf could be sensed. If the e-field is large enough, the volume of the conductive material in the object (e.g., package) or attached to the object could be read and calculated including if a touch code (which is described in greater detail later in the disclosure) was on the bottom of the object. The capacitive sensors could then read the touch code. The thickness of the shelf, the material the shelf is made from, and the distance between the capacitive sensor and the product being read would need to be compensated for.

The sensor may be affixed to the shelf using any of the other processes described above in connection with the peg (e.g., transfer molding, printing, etc.).

Figure 13:
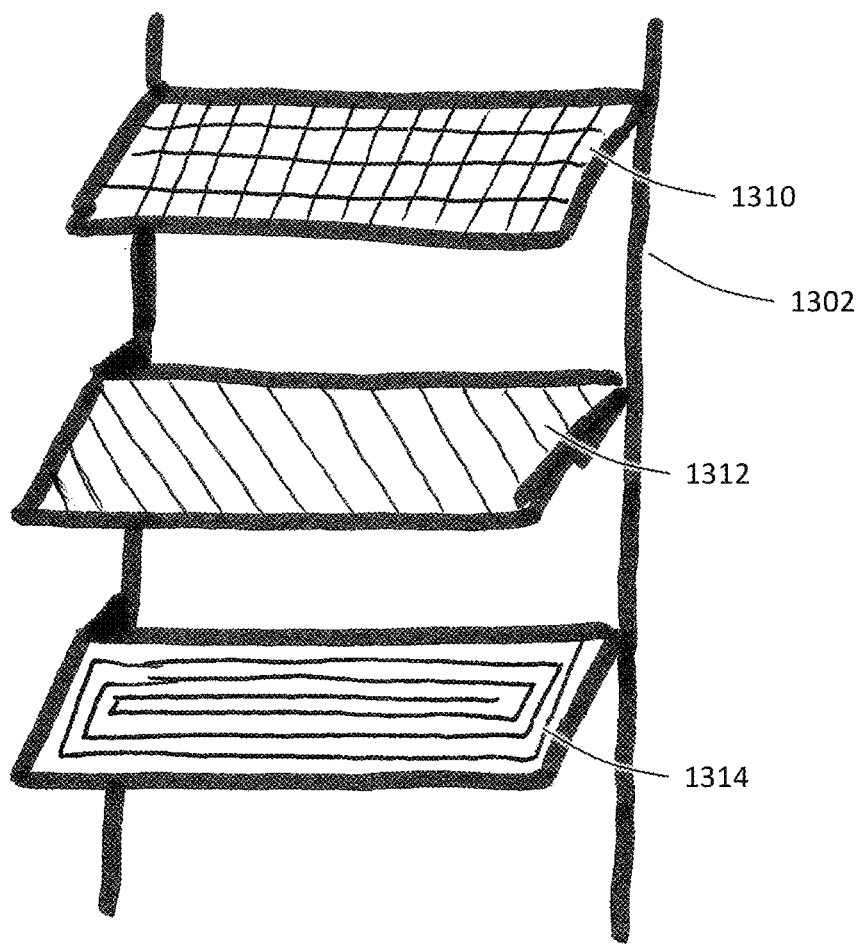
FIG. 13 is a schematic diagram illustrating a variety of sensor layouts on shelves, according to some embodiments.
Figure 14:
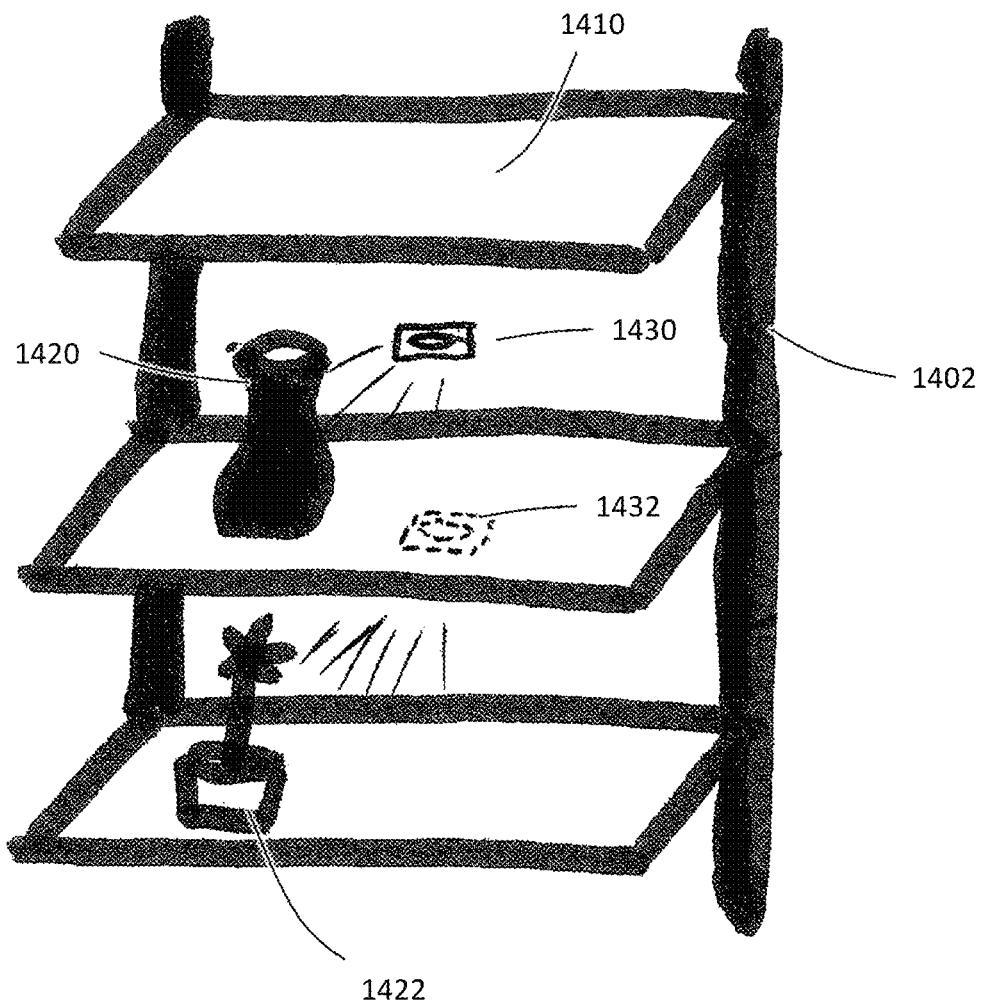
FIG. 14 is, according to some embodiments, a schematic illustration showing the use of sensors to detect objects on shelves, according to some embodiments.

Positioning of the sensor on the shelving unit may vary depending on the type of sensor that is being positioned. For example, resistive, capacitive, or force sensors may be arranged along the upper surface of a shelf in a grid, rows, or other pattern. For example, in FIG. 13, display 1302 comprises shelf 1310, on which sensors are arranged in a grid pattern. In FIG. 13, display 1302 also comprises shelf 1312, which comprises sensors arranged in a row pattern. In display 1302 of FIG. 13, shelf 1314 comprises sensors arranged in a "jelly-roll" pattern. An optical sensor, magnetic sensor, or antenna, on the other hand, may be affixed to any of an upper surface, a sidewall, or a backwall of the shelving unit, or even the underside of a shelf, in order to view the objects on the shelf. For example, in FIG. 14, display 1402 comprises shelves 1410. Object 1420 can be detected using sensor 1430 (which can be, for example, an optical sensor). In addition, object 1422 can be detected using sensor 1432.

In some embodiments, the shelf can be used in a display system comprising a board comprising a plurality of holes. The shelf can be connected to the display system, in some such embodiments, by arranging one or more protrusions on the shelf in one or more of the holes. For example, the display system may comprise a pegboard. The shelf can be connected to the pegboard, for example, by arranging one or more protrusions on the shelf in one or more holes of the pegboard.

The electrical wiring may run vertical or horizontal, or sometimes other directions. In the example of the pegboard display, the wiring may be coupled to each of the holes in the pegboard. For example, as illustrated in FIG. 15A, wiring may be connected to each of the holes in the pegboard by using multiple wiring segments. In FIG. 15B, a single wiring segment is used to connect all of the holes of the pegboard (e.g., by arranging the wiring segment in a serpentine pattern). In certain embodiments in which shelves are employed, the wiring may similarly run along a surface of a shelf. The wiring may be organized such that every first vertical column is coupled to a first wire, and every next adjacent column is coupled to a second wire, thereby alternating wires (i.e., power terminals) between columns. For example, the first wires may be coupled to the electronic devices, and the second wires may be grounded. In some examples, the first wires may alternate with the second wires. In other examples, each wire may be coupled to a different electronic device (e.g., separate tracking systems for each column). The same system may apply for wiring in horizontal rows instead of vertical columns (e.g., alternating horizontal wiring stripes). The wiring may be patterned differently if the pegholes or points of contact are arranged in a different array. For example, if the pegholes or points of contact follow a hexagonal pattern, the wiring may be arranged alternatingly as described above but along a diagonal line. Alternatively, the wiring may still be arranged vertically or horizontally, but more rows/columns of wiring may be needed to cover every peghole (in some examples, some pegholes may be skipped, for example if not every row or column of pegholes is expected to receive shelves).

Figure 16:
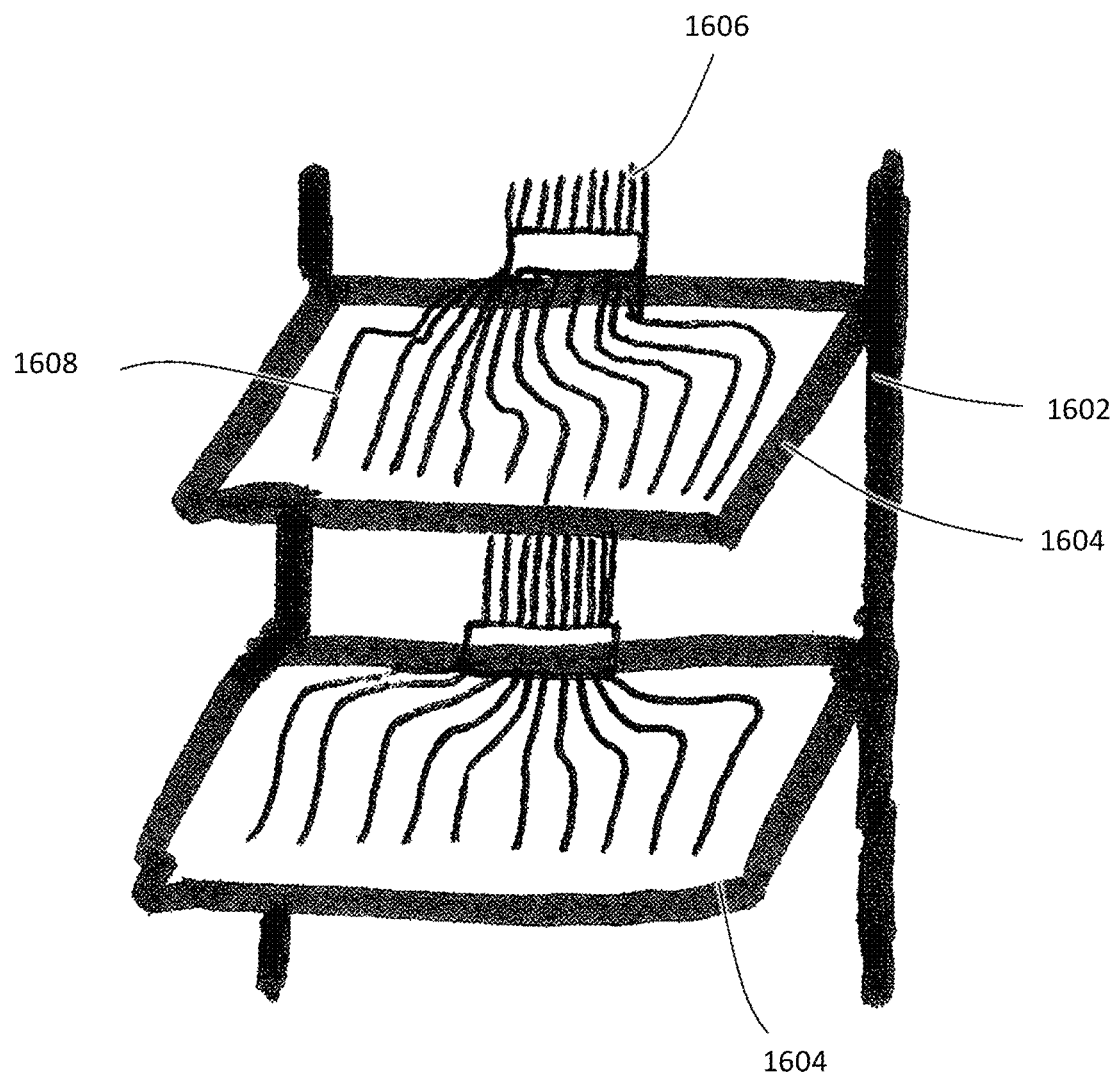
FIG. 16 is a schematic diagram illustrating the wiring of shelves to a display unit, according to some embodiments.

As noted above with respect to pegboards for hooks, the electrical wiring may include ribbon cables (e.g., a 16 pin connector). Each of the ribbon cables may include multiple ribbon connectors, where a ribbon connector aligned with each peghole (or at least each peghole that receives a display shelf) or point of contact is coupled to that ribbon cable. The ribbon connector may accommodate (e.g., be capable of receiving) a second ribbon cable that is affixed to the respective display shelves that fit into the pegholes or points of contact that are coupled with the first ribbon cable. In this manner, multiple electrical wires may be connected from a single shelf or from a single point of contact to the electrical wiring of the display via a multi-wire cable. This therefore allows for multiple electrical signals to be transmitted between the electronic devices and a single shelf or point of contact. Similar to hanging displays, ribbon cables may run along the backwall or sidewall of a shelving unit and connect to the various sensors located on the shelves. Each wire in the ribbon cable could be connected to a different row or column lined on the shelf. For example, in FIG. 16, display 1602 comprises shelves 1604. Wires 1606 within a ribbon cable may be connected to rows 1608 lined on shelves 1604.

In some embodiments, a pressure and/or weight sensor is associated with (e.g., placed on) a shelf. Generally, pressure and weight sensors are capable of identifying products resting on a shelf. These sensors may be capable of making complex identifications of products without having to read any encoded information from the product itself. For example, the sensor may map the size of a product and the weight and distribution of the weight. The weight and weight distribution can be determined, at least in part, by the design of the package or other object. For example, the weight distribution may be based on ridges, indents, and/or embossing on the object (e.g., on product packaging). Such complex identifications would allow for an individual signature on each object. In some embodiments, two or more of the dimensions of the object, the weight of the object, and/or the surface pressure mapping can be used to identify the object type. Several of these sensors can be positioned on an upper surface of a shelf onto which the object (e.g., a product) is placed, and the combined readout of the sensors can be compared to a list of weight distributions for various products, programmed in the inventory management system. If the combined readout of the sensors matches the weight distribution of a listed product, the system may positively identify the product. The system may further be equipped to identify a weight distribution that corresponds to multiple objects (e.g., products) on the shelf, and may uniquely identify each object and further count the number of objects located on the shelf.

Figure 17:
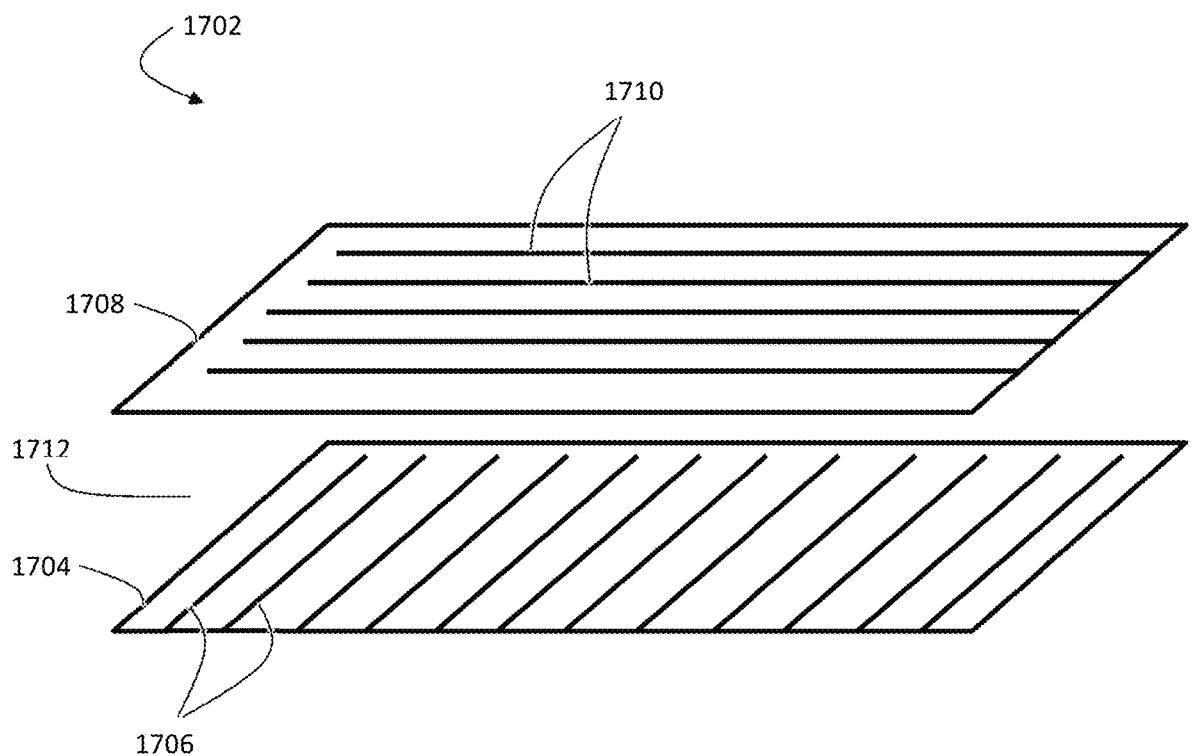
FIG. 17 is a schematic illustration of a multi-layered weight sensor, according to some embodiments.

Certain embodiments relate to a multi-layered pressure sensitive sensor that can be used to identify objects. For example, in some embodiments, the sensor comprises a first layer comprising a first set of conductive traces and a second layer comprising a second set of conductive traces. Referring to FIG. 17, for example, sensor 1702 comprises first layer 1704 comprising a first set of conductive traces 1706, and second layer 1708 comprising a second set of conductive traces 1710. In FIG. 17, second layer 1708 is arranged over first layer 1704 such that the second set of electrically conductive traces 1710 overlaps the first set of conductive traces 1706 to produce a matrix of conductive trace intersections. While conductive traces 1706 and 1710 are illustrated as being substantially perpendicular in FIG. 17, they need not necessarily be so, and in other embodiments, traces 1706 and 1710 could form other angles at their intersections.

In some embodiments, the first and second layers are separated by a dielectric material. For example, in FIG. 17, layers 1704 and 1708 can be separated by dielectric material 1712. Dielectric material 1712 can be, for example, a fluid material (e.g., a gas or liquid material). In some embodiments, dielectric material 1712 is air. For example, in some such embodiments, layer 1704 and 1708 can be stretched such that they are taut, and separated by a thin film of air positioned between the layers. In certain embodiments, the dielectric material comprises a solid dielectric material.

In some embodiments, the multi-layered pressure sensitive sensor is configured such that, when an object is placed on the second layer, the system can determine the identity of the object based, at least in part, upon the shape of a feature associated with a surface of the object in contact with the system. For example, in some embodiments, when an object is placed on layer 1708, layer 1708 (and electrical traces 1710) may be deformed such that traces 1710 are moved closer to traces 1706 in layer 1704. A controller electrically connected to electrical traces 1706 and/or 1710 may be configured to receive a signal that varies based up on the spacings between traces 1706 and 1710 at their intersections. As top layer 1708 is deformed, the controller may be configured to receive a combined readout of the sensor intersections that have been moved closer together, which can be compared to a list of known patterns (e.g., using a lookup table) for various products programmed in the inventory management system. If the combined readout of the sensor intersections matches the pattern of a listed product, the system may positively identify the product. The system may further be equipped to identify a weight distribution that corresponds to multiple products on the shelf, and may uniquely identify each product and further count the number of products located on the shelf.

In some embodiments, the feature of the object that is used by the multi-layered pressure sensor to determine the identity of the object can correspond to a shape of the surface of the object in contact with the pressure sensitive sensor. For example, the feature could be the circular surface of a cylindrical object placed on the pressure sensitive sensor. In certain embodiments, the feature does not occupy the entire surface of the object in contact with the system. For example, the feature may correspond to one or more ridges and/or indentations on the product or the product packaging. As a few specific examples, the feature can correspond to text, a graphic image, braille, or any other suitable surface feature. In some embodiments, the feature occupies less than about 50%, less than about 40%, less than about 30%, less than about 20%, less than about 10%, or less than about 5% of the surface area of the object that faces the display structure.

Figure 18A:
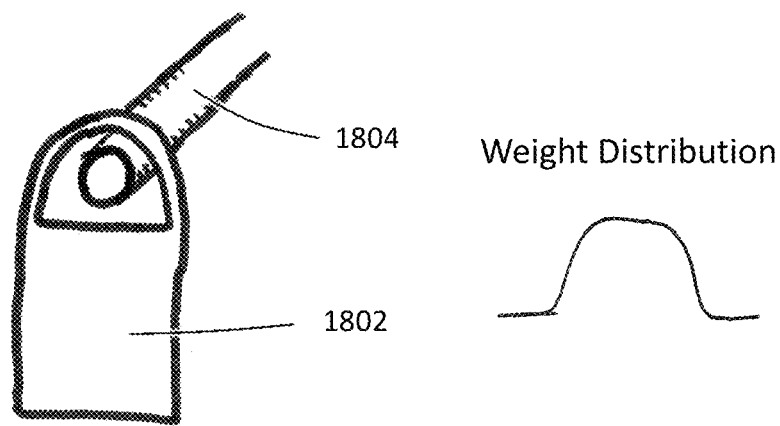
FIGS. 18A-18C are, according to certain embodiments, schematic diagrams illustrating display pegs in which pressure sensors are used to detect objects.
Figure 18B:
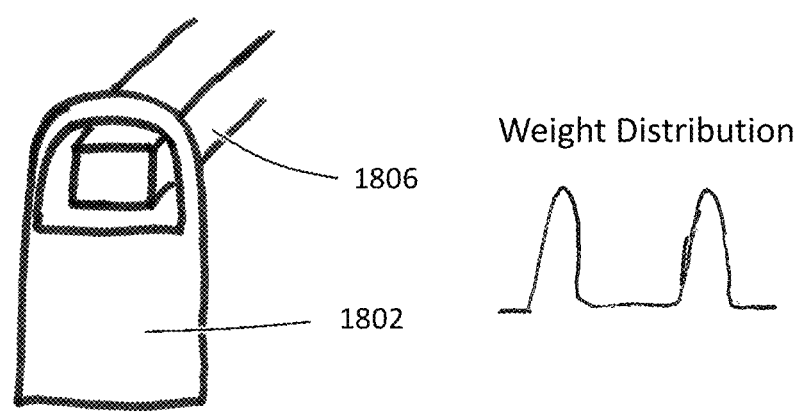
Figure 18C:
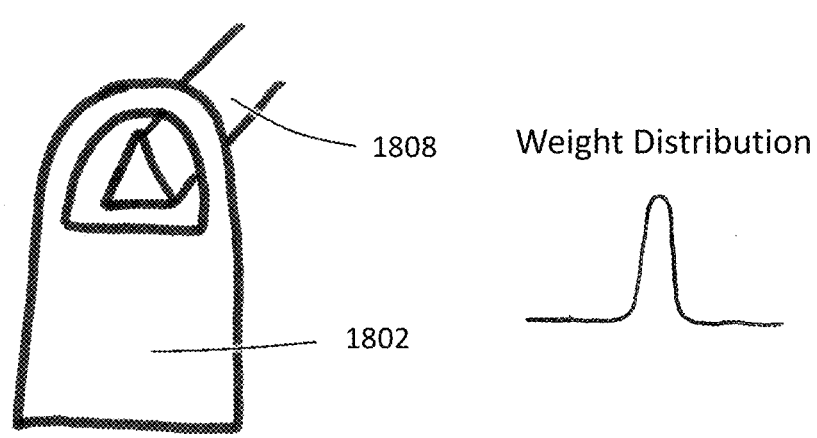

Weight sensors may also be used in pegs. For example, in some embodiments, a peg may include a two dimensional array of weight sensors along an upper face of the peg where products are normally hung. Each product may have a known weight, and the sensors in the peg may be capable of identifying a hung product based on the sensed weight. Furthermore, depending on the loop in the product packaging, the weight of each respective product may be distributed differently. FIGS. 18A-18C illustrate this point. In FIG. 18A, object 1802 having a semi-circular loop is hung on peg 1804 having a circular cross section. In FIG. 18B, object 1802 is hung on peg 1806 having a square cross-section, and in FIG. 18C, object 1802 is hung on peg 1808 having a triangular cross section. As shown in FIG. 18A, a semi-circular loop hung on a circular peg will distribute more evenly and will contact more weight sensors than a semi-circular look hanging on a square or triangular peg, which, as shown in FIGS. 18B-18C, do not make the same contact with the peg and therefore does not distribute weight in the same fashion.

Weight and force sensors (e.g., used in association with pegs and shelves, as described above, and/or used in association with trays, as described below) are capable of, according to certain embodiments, conveying additional data about a product, aside from just identifying the product. For example, if the weight distribution pattern matches a particular product but the total weight does not match that product, the sensors may determine that the product has not been filled properly (i.e., a short fill) or is not within its proper tolerance. Additionally, these sensors are capable of determining when a product is touched or pulled off of a shelf or peg. Currently, brick and mortar stores are capable of gathering data related to consumer interest for a product based only on consumer purchases. However, such data does not account for consumer interest where a consumer considers purchasing a product but then decides not to do so. Such data is largely regarded as valuable, yet currently can only be gathered by online stores, based on the whether a consumer visits a certain webpage where the product is being sold (regardless of whether the consumer actually purchases the product). Sensing changes in pressure to the product will effectively give brick-and-mortar stores a way to gauge consumer "visits" to the product, much like visits to a website, adding to the robustness of currently available consumer interest data.

Weight and/or pressure sensors may be used, in some embodiments, to determine the position of a product on a display support (e.g., peg, shelf, and/or tray).

In some embodiments, the shelf can operate with a capacitive cover over the top, molded into the shelf, or mounted under the shelf. In some such embodiments, the capacitive sensor can sense touch codes, an object that has a capacitive signature such as liquids, a printed label that is metallic, an attached metal foil, a package that is made with a certain resistance such as carbon in the blow mold or formed in any other manner or any other metal or product that can be detected.

In some embodiments, the objects positioned over the shelves may not be in contact with the shelves. As described above with respect to pegs, in some embodiments, objects (e.g., packages) can be held magnetically to a shelf. For example, in certain embodiments, an iron-containing material can be printed on an object and can be used to hold the object above a shelf. The object can be made of magnetic material and/or a magnet can be attached to the object. In some embodiments, a magnetic field that is polarized is employed, which can allow for an object to be held in the magnetic field without directly touching the shelf. Thus, the object can appear to float.

One aspect of the disclosure provides for an article of manufacture having a base. The base may include a lower surface. The lower surface can, in some embodiments, have at least one sensor in-molded or otherwise formed into the lower surface. In some embodiments, the sensor may be capable of identifying at least one of a resistance, a capacitance, an RC value, a weight, a weight distribution, a touchcode, a QR code, and a bar code of an object coupled thereto. The base may include, in some embodiments, a plurality of sidewalls surrounding the lower surface, thereby defining a cavity. The article of manufacture may include a cover disposed over the base. In some embodiments, the cover can include a top wall at least partially covering the cavity. The cover may also include at least one hole in the top wall through which a product to be displayed fits. The hole may be aligned with a respective sensor of the base such that the product is coupled to the sensor of the base while a portion of the product still protrudes upwards through the hole. The article of manufacture may further include a visual indicator capable of visually indicating information related to the identity of the product and quantity of the product displayed therein at a given time.

One embodiment of the disclosure provides for a cosmetic tray having a cover, base, and optionally a tray enclosed between the cover and base.

Figure 19:
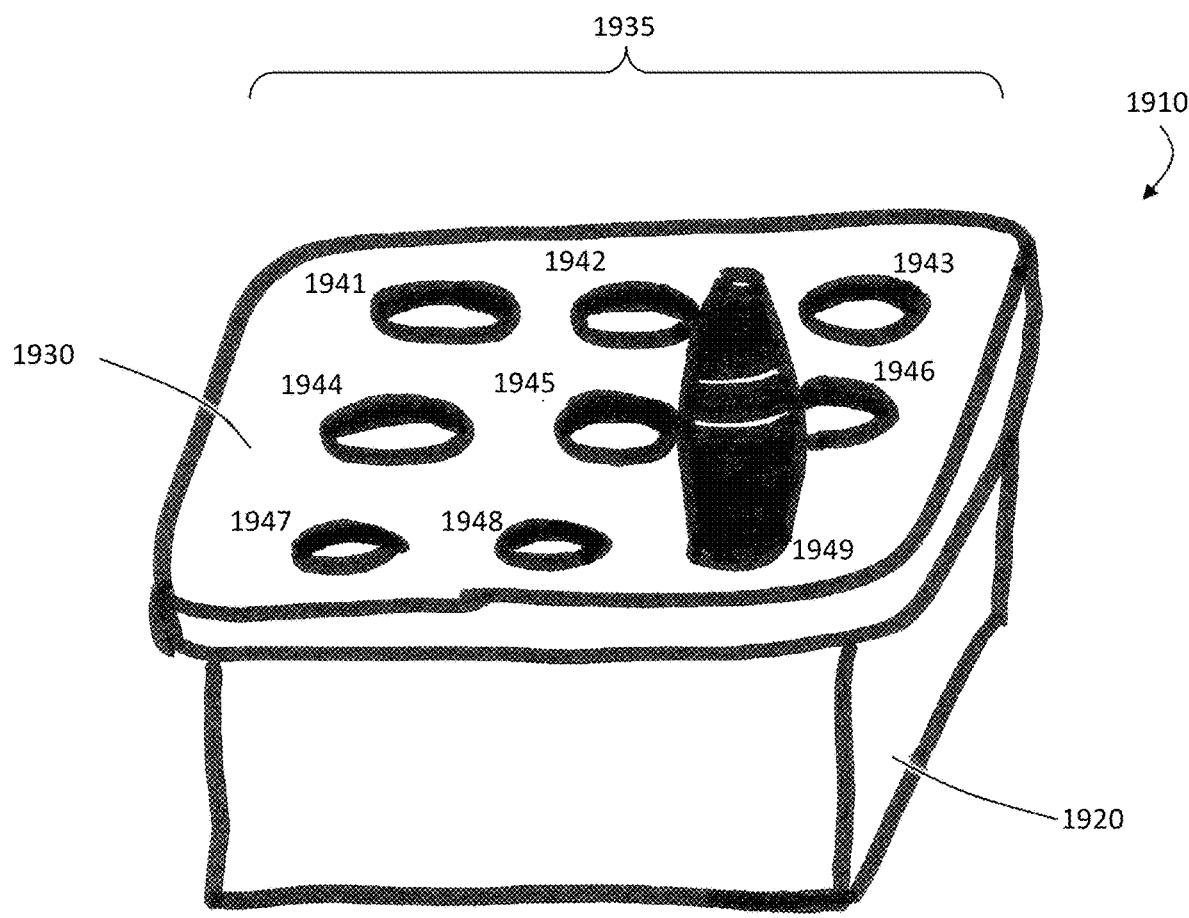
FIG. 19 is a schematic diagram of a display, according to certain embodiments.

FIG. 19 shows an example display 1910 having a base 1920 and cover 1930. The cover of the tray is, in certain embodiments, made of any rigid material, such as various plastics or metals. The cover includes, in some embodiments, a top surface, and, in certain embodiments, sidewalls surrounding the top surface, such that the top wall and sidewalls are capable of fitting over and around the base, or more generally the cosmetic tray can be construed such that the cover and sidewalls are formed to provide a box-like structure where the cover has openings for receiving objects that align with sensors on the base that detect the presence of the object and relay information about the object to a back-office system. The sidewalls prevent the cover from laterally shifting along the top of the base, providing alignment between the cover and the base. In the example of FIG. 19, the cover 1930 is wider and longer than the base 1920. Sidewalls may be offset from the edge of the top wall such that the sidewalls rest flush with the outer surface of the sidewalls of the base.

In some embodiments, alignment may be accomplished without sidewalls. For instance, the cover may be magnetically aligned with the base, aligned using guideposts or other guiding structures present in the base (e.g., indentations or impressions in the lower surface of the base). In some examples, a product resting on the tray may keep the cover and base properly aligned without any other aligning element. In further examples, the cover may be the same length and width as the base, enabling a user of the display to visually align the cover to the base.

In the example of FIG. 19, the top wall of the cover 1930 includes one or more holes 1935, through which a product (e.g., a cosmetic pen in FIG. 19) is placed. The size and shape of the holes may be selected based on the dimensions of a product designed to fit through the hole. As such, if a display is designed to display more than one product, the size and shape of each hole in a single display may vary from hole to hole to accommodate the varying dimensions of those products.

The base 1920 may be made, in some embodiments, of any rigid material, and may be the same material or a different material than the cover. In the example of FIG. 19, the base includes a lower surface or bottom wall and sidewalls to support and maintain proper alignment with the cover 1930. The lower surface can provide support for the product placed through one of the holes of the cover. The height of the sidewalls can be selected such that the distance between the lower surface of the base and the top wall of the cover is smaller than the height of the product. As a result, when the product is placed through the hole, the product will reach the lower surface of the base while still partially protruding out of the top of the hole through which it was placed. In some examples, the height of the sidewalls may be selected to permit a desired amount of the product (e.g., for aesthetic purposes, to avoid concealing a label or brand of the product, etc.) to protrude through its respective hole.

Where the display is designed to accommodate more than one product, either the cover or the base may vary in height or shape to accommodate holding products of various heights. For example, the top wall of the cover may be terraced or stepped, with the taller products fitting into the holes on the higher steps, and the shorter products fitting into the holes on the lower steps. Alternatively (or in addition), the lower surface of the base may be terraced or stepped, such that shorter products are placed on the higher steps and do not fall into (e.g., through the holes of the cover of) the display.

Figure 20:
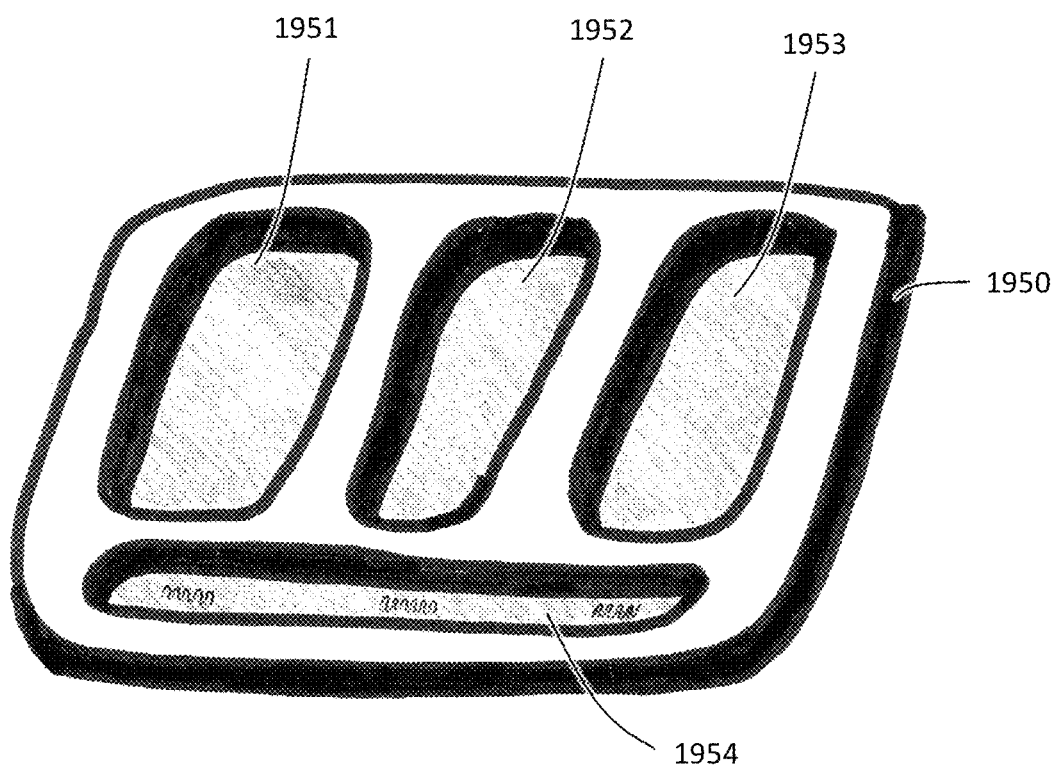
FIG. 20 is, according to some embodiments, a schematic illustration of a tray, which may be incorporated into a display.
Figure 21A:
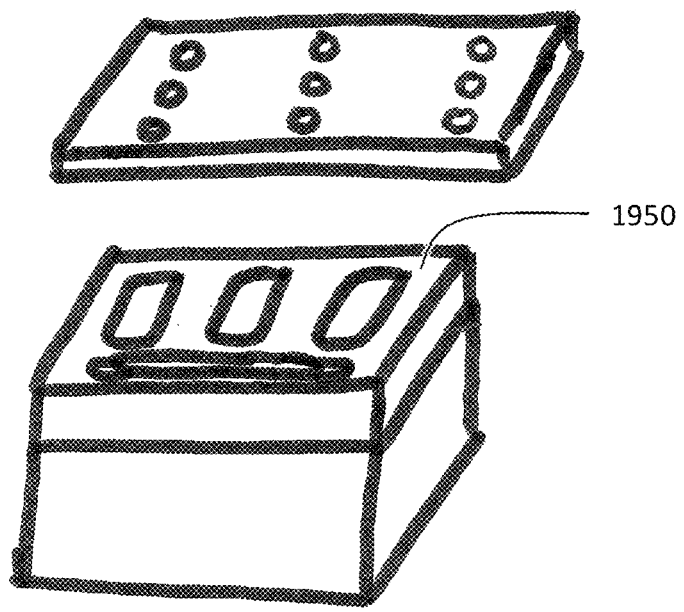
FIGS. 21A-21B are schematic diagrams illustrating various ways in which a tray may be integrated into a display, according to certain embodiments.
Figure 21B:
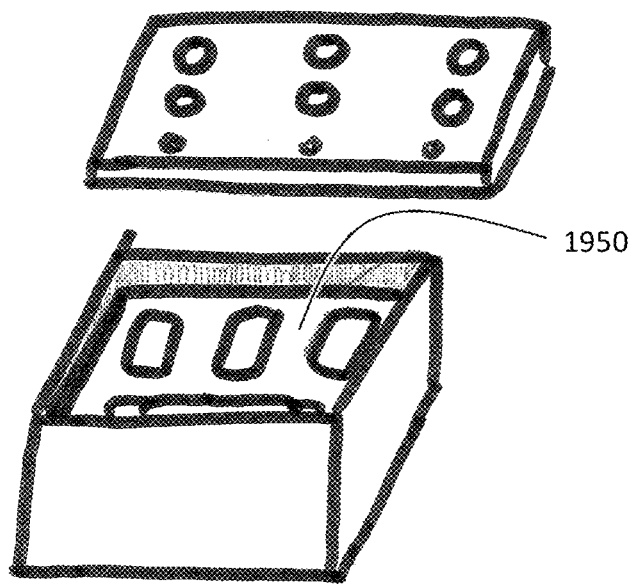

Optionally, a tray (shown in FIG. 20) may be incorporated into the display above the base and underneath the cover. The tray, like the cover and base, may also be made of any rigid material, and may be the same material or a different material than either the cover or the base. The tray may rest on the lower surface of the base or be vertically disposed between the cover and the lower surface of the base. As a further example, the tray may have an outer edge or lip that rests or is clamped between the sidewalls of the cover and the sidewalls of the base. FIG. 21A depicts a tray 1950 having the same length and width as the base. The cover then fits on top of the tray in the same manner as it fits on top of the base (as described above). FIG. 21B depicts a tray that fits inside the base. The cover can then fit on top of the base, with the tray enclosed within the base. As shown in FIG. 20, the tray 1950 includes several cavities 1951-1954 of uniform or varying depth (depending on the types of products to be stored in tray). The cavities are formed into the tray in alignment with the holes formed into the cover. In the example of FIGS. 19-21, cavity 1951 is formed in alignment (e.g., directly underneath) with holes 1941 and 1944. Cavity 1952 is formed in alignment with holes 1942 and 1945. Cavity 1953 is formed in alignment with holes 1943 and 1946. And cavity 1954 is formed in alignment with holes 1947-1949. In other examples, the tray may be flat and have no cavities. The tray may provide the terracing and/or stepping described above to enable the display to accommodate products of varying heights.

The tray 1950 is designed to span the full length and width, or nearly the full length and width, of the cavity of the display 1910. In other examples, the tray may only partially span the length or width or both of the display, such that a product placed through one hole of the display touches an upper surface of the tray whereas another product placed in a different hole touches the lower surface of the base. In further examples, multiple trays may be inserted into the display. For instance, each of cavities 1951-1954 could be formed into separate trays that all neatly fit into the display by resting on the lower surface of the base.

In the above example, the base, cover, and tray are formed in separate molds and subsequently attached. In other examples, any combination of the base, cover, and tray may be a single structure formed together in a mold.

Figure 22:
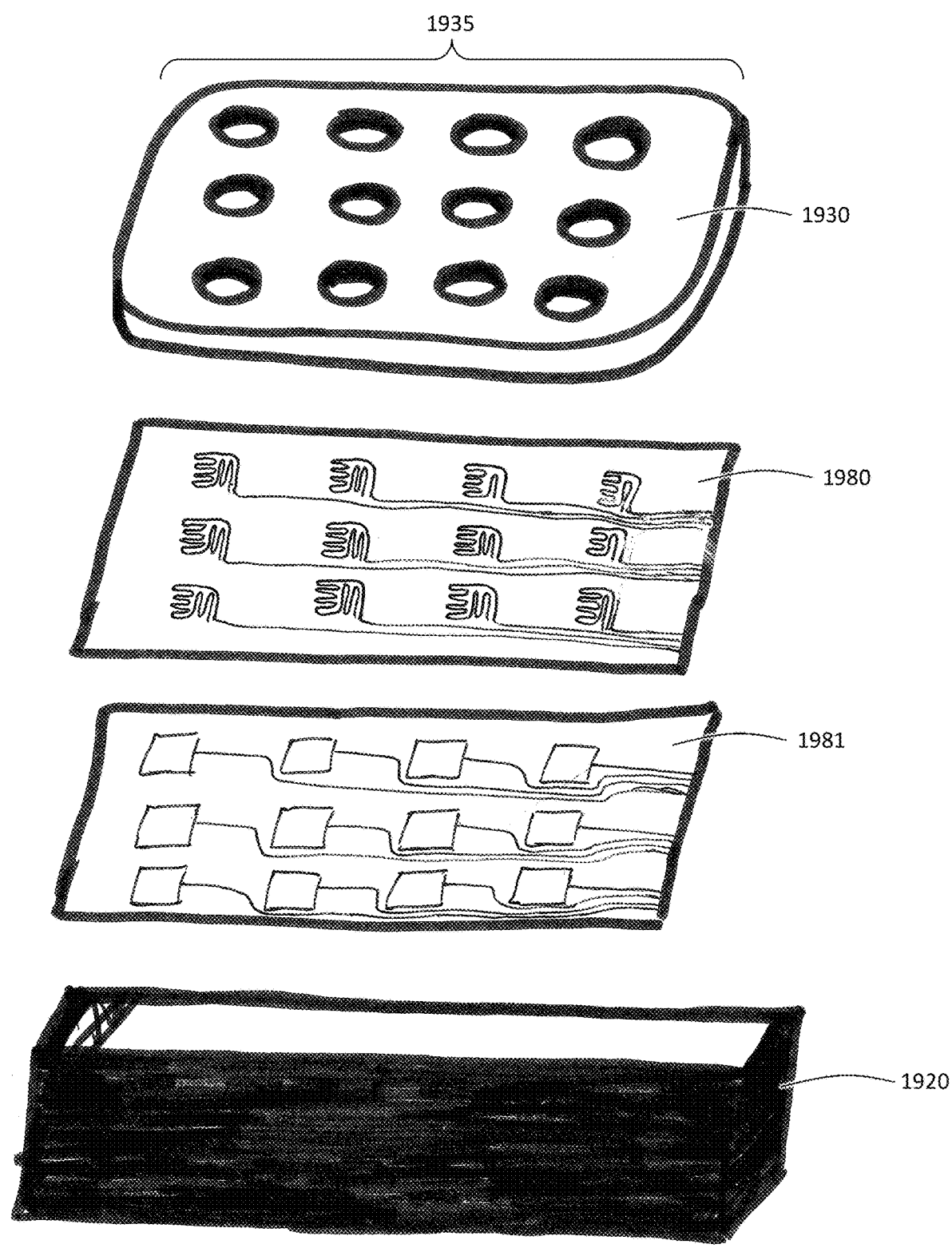
FIG. 22 is, according to some embodiments, a schematic illustration of a display in which contact sensors are integrated into a display.

In the above examples, a product that is placed through a hole of the cover contacts an upper surface of either the tray (or tray cavity) or the lower surface of the base. A sensor may be positioned at the point of contact to detect characteristics of the product. For example, one or more sensors may be formed on an upper surface of the tray or the lower surface of the base. The sensors may be formed in alignment with the holes of the cover such that a product placed through a hole contacts a respective sensor (or sensors) underneath the hole. Alternatively, the sensors may be formed onto a separate sheet, slide or tray that fits inside the base. FIG. 22 depicts an embodiment providing for two sheets 1980 and 1981 of sensors aligned with the holes of the cover 1930 above. The sheets fit into the base 1920 and the cover is then placed over the base. In some examples, the sensors may be printed on an upper surface of the each sheet.

An insulating sheet or layer may be placed between the two sensor sheets 1980 and 1981 to prevent electrical shorting between the sensors.

In the example of FIG. 22, only the top sheet 1980 is capable of directly physically contacting the product placed on top of it. The top sheet may be, in some embodiments, capable of sensing features of the product that require direct physical contact. For example, the top sheet 1980 may be an ohmmeter capable of detecting a resistive or conductive value of a resistive element printed or otherwise formed on the face-down side (i.e., the side in contact with the top sheet) of the product.

In the example of FIG. 22, the bottom sheet 1981 is separated from the product by the top sheet 1980. Nonetheless, the bottom sheet 1981 may still be capable of detecting the presence of or even physical features of the product placed on top of it through the top sheet 1980. For example, the bottom sheet may include a capacitive sensor that is capable of detecting local changes in the electric field. The capacitive sensor may then detect the capacitive value of an element printed or otherwise formed on the face-down side of the product. In a further example, the bottom sheet may include a piezoelectric sensor capable of detecting an amount of pressure applied by the weight of the product through the top sheet. If the top sheet 1980 is sufficiently flexible or movable, the bottom sheet 1981 may be capable of detecting small changes in pressure or weight. The bottom sheet may detect several other features of the product, as described in the examples provided herein. In yet a further example, the bottom sheet may include a magnetic sensor. The magnetic sensor may be activated by a magnet of varying gauss levels placed on the product or product packaging (e.g., a primary container). When the magnet comes within a certain distance of the magnetic sensor, the sensor may change resistance. This in turn may actuate a switch. The resistance may vary according to the product container that has different magnets with different gauss levels thereby identifying a product type, including differentiating colors of the same product. This could be done with one active sheet where the sensor is placed between two silver buses allowing the loop resistance to be changed and altered. Sensors included on the top sheet may be capable of performing the same operations as those of the bottom, as well as other operations that require direct physical contact.

With regard to some of the sensing capabilities described herein, the sensors may be formed along an underside (opposite the top side) of the tray, base, or sheet. For example, a capacitive sensor may be capable of sensing E-field changes through a plastic base (or tray or sheet) and may be affixed to the underside of the base.

In certain of the embodiments in which trays are employed, the wiring may be organized such that every group of sensors is coupled to a different wire or cable of wires. The wiring may further be organized such that every separate cavity of a tray (or, more generally, every separate group of sensors for a different product) is coupled to a different wire or cable of wires. The electrical terminals for the wiring and/or the wiring itself may be formed using any of the methods described elsewhere herein for the formation of electrically conductive terminals, traces, and the like. For example, in some embodiments, the electrical terminals for the wiring and/or the wiring itself may be formed, printed, or otherwise fashioned (e.g., in-molded, etc.) using conductive inks or conventional circuits and circuit boards. A method by which conductive inks may be printed or formed or in-molded on surfaces has been taught in, for example, U.S. Pat. No. 8,198,979, issued Jun. 12, 2012, the disclosure of which is hereby incorporated by reference herein in its entirety. The in-molding process may involve first printing the electrical terminals on a film and then injection molding a tray into the cavity of the film. Alternatively, the electrical terminals may be printed on a release paper, instead of a film, inside the injection mold. Using a release paper may cause the terminals to be molded to the outer surface of the tray without being sealed in or covered by the film. In another alternative, the electrical terminals may be any standard wiring that is affixed directly to the tray by any means known in the art. As such, the present disclosure is not limited to in-molded or printed electrical connections but to any type of electrical connection that can be established between the product (e.g., while sitting on a tray, on a base, on a sheet, etc.) and other electronic devices (e.g., an inventory management system).

In addition to the above described wires, the electrical wiring may include ribbon cables (e.g., a 16 pin connector). Each of the ribbon cables may include multiple ribbon connectors, with a ribbon connector aligned with each sheet or tray of sensors. In this manner, multiple electrical wires may be connected from a single display to the electrical wiring of an inventory tracking system or other back-end system via a multi-wire cable connected to the display. This therefore allows for multiple electrical signals to be transmitted between the back-end electronic devices and a single tray or a single sheet (or single group of sensors).

The electrical wiring of the display may be crimped to the ribbon connector in order to establish electrical connection. The interface between the electrical wiring on the display and sheet or tray may also include a z-axis electrically conductive glue or tape.

As described above, several types of sensors may be employed in various of the above described environments to gather various data about one or more objects (e.g., products). For example, a sensor may be sensitive to capacitance, temperature, light, magnetism, pressure, weight, and/or freshness of a product. Any of the sensor types described above can be used in any type of product support system (e.g., shelf, peg, tray, etc.) In addition, it should be understood that the pegs, shelves, and trays described herein are not limited to employing the types of sensors described above, and in other embodiments, other sensor types may be used in associated with pegs, shelves, and trays.

For example, in some embodiments, the display (e.g., a peg, shelf, and/or tray of a display) can comprise a resistive sensor. Embodiments employing resistive sensors in pegs are described above. Trays can also make use of resistive sensors. In some embodiments in which shelves are used, a resistor can be printed on or otherwise integrated with the object (e.g., package), and a surface of the shelf can comprise a resistance reader with numerous open circuits. In some such embodiments, once a product closes the circuit, the shelf reads the resistance, and the size of the product may be determined by how many open circuits are closed.

In some embodiments, the display structure comprises a pressure and/or weight sensor. As noted above, pressure and weight sensors can be capable of making complex identifications of products without having to read any encoded information from the product itself. For example, the sensors may map the size of a product and the weight and distribution of the weight based on ridges, indents, or embossing on the product or its packaging. In some embodiments, a high precision load cell or weigh module, manufactured by Sensortronics, as well as high precision load cell and weigh module technologies described in U.S. Pat. Nos. 5,031,463 and 5,220,971, the disclosures of which are hereby incorporated by reference herein in their entirety, could be used to identify the unique weight and/or distribution properties of a product placed on it by generating an electrical current corresponding to the sensed weight, or a sequence of current values (or signal or waveform) corresponding to a unique weight distribution. Such precise identifications would allow for an individual signature on each object (e.g., product and/or package) by reading out the result of such weighing and comparing the result to a list of weights and/or distributions for various products, programmed in a back-end system such as an inventory management system. If the readout of a sensor matches the weight and/or weight distribution of a listed product, the system may positively identify the product. The system may further be equipped to uniquely identify each product and further count the number of products located on one or more displays throughout the store.

In some embodiments, the display structure (e.g., peg, shelf, and/or tray) comprises a magnet-based sensor. For example, a peg, shelf, and/or tray may comprise a magnetic sensor that is capable of reading different gauss levels. In some such embodiments, specific gauss levels can be used to identify particular products. Thus, the magnetic sensor on the peg, shelf, and/or tray can read differing gauss levels to know the unique signature of the product.

In some embodiments, the display structure (e.g., peg, shelf, and/or tray) comprises a combination of optical sensors (e.g., cameras) to read a QR code, bar code, and/or a visible touch code. In some embodiments, a mirrored or reflective shelf can be used to project a readable code from an object (e.g., package) that can be captured by a device on top of or proximate to the display structure.

In some embodiments, the display structure (e.g., peg, shelf, and/or tray) can read the frequency of coils attached to an object (e.g., a package).

In some embodiments, the sensors can track physical aspects or properties of an object, such as the temperature or freshness of the product. In some embodiments, the system comprises a freshness sensor. A freshness sensor may be capable of reading a relative humidity, for example, inside the packaging of the product. In some embodiments, the freshness sensor may be capable of detecting gas buildups within the packaging. This information in turn may indicate to storekeepers and consumers alike whether a product has expired, has been tampered within, or is otherwise unsafe for purchase. The freshness sensor may be located inside the packaging of the product, or may be communicatively connectable to a sensor inside the packaging. In some embodiments, the freshness sensor may be communicatively connectable to a sensor or other transmitter/receiver in the display. In some examples, a freshness sensor inside a product may not include its own battery, and in some such cases, cannot operate without first being connected to a power source. Placing the product on a peg, wall, shelf, and/or tray may couple the product to a power source (e.g., via the electrical wiring, wirelessly, etc.) such that the sensor may be powered to operate. In this sense, a sensor that includes both mechanical components (e.g., for sensing relative humidity or gases) and electrical components (e.g., for analyzing the gathered information related to humidity or gas concentration) may be arranged such that the electrical and mechanical components are separate from one another. For instance, the mechanical components may be located inside the product, whereas the electrical component may be the sensor (or part of the sensor) formed on the display on which the product hangs or rests.

In some embodiments, the system comprises an optical sensor. For example, optical sensors or cameras may be capable of reading codes printed on the object (e.g., product), such as a QR code or a bar code.

The system comprises, in certain embodiments, a thermal sensor, such as a thermistor. The thermal sensor can determine changes in temperature.

In some embodiments, the system comprises a capacitive sensor. The capacitive sensor can be configured to determine a change in an electric field. Capacitive sensors may be capable of reading capacitances printed or applied to objects (e.g., products). Capacitances can include a single value capacitance associated with an object. (Resistive sensors can operate in a similar fashion.) Alternatively, capacitances can include more complex patterns of capacitance values that interact with the sensor to convey specific information or constructions. One such pattern of capacitances is a touch code, which is discussed in greater detail in United States Patent Application Publication Nos. 2012/0306813, titled "System and Method for Retrieving Information Carrier by Means of a Capacitive Touch Screen," 2013/0115878, titled "System Comprising a Capacitive Carrier for Acquiring Information," and PCT Publication Nos. WO 2012/038434, titled "Information Carrier and System for Acquiring Information," and WO 2013/087930, titled "Touch-Sensitive Data Carrier and Method," the disclosures of which are hereby incorporated by reference in their entirety. Touch codes can work by embedding a thin layer of capacitive material into a paper or other printed item, such as product packaging. The capacitive material can then interact with a touchscreen or other capacitive sensor. When the touch code and capacitive sensor are brought in contact or into close proximity, the touch code provides instructions or information to a device associated with the touchscreen or sensor.

A magnetic sensor, which can be used according to certain embodiments, can provide many of the same features. For example, the object (e.g., product) can be formed with a magnet having a predetermined gauss level or pattern serving as the unique signature for the object. The magnetic sensor can then read the gauss levels to determine the identity of the object.

Similarly, in some embodiments, a sensor can include an antenna for reading and interpreting a frequency signal from an object (e.g., product). For example, the object may contain coils or other circuitry (e.g., resistive and capacitive elements) that resonate at a predetermined frequency or pattern, and the sensor can read that frequency or pattern and identify the object having that unique frequency or pattern. In this manner, the sensor may be equipped to read, for example, RFID codes from an RFID tag included in the object.

Many of the above sensors convey information that is not only useful for inventory tracking but is also useful for consumers while the object (e.g., product) is in the store, and even after the object is taken out of the store. For instance, a consumer may be interested in determining the price of the product and whether there are any sales or discounts. Alternatively, a consumer who takes the product home may want to determine the freshness of the product on an ongoing basis. As such, the sensors discussed in this application are applicable not only to store displays but can also be available to consumers. For example, a consumer may purchase a device (e.g., for use in the home) that, when placed in physical connection or proximity with the product, may read data from a thermistor, an RFID, or a freshness sensor, or any other indicator included in the product and connected to a terminal on the outer surface of the product. As such, the consumer can receive up-to-date information regarding the product, such as discounts on the product, a maximum temperature that the product reached during its lifetime (e.g., indicating whether food or medications were previously exposed to high temperatures), callbacks on the product, a date stamp on the product (e.g., indicating when the product was manufactured or received or purchased, etc.) or freshness of the product. In one example, a consumer could use a sensor in a handheld device to gather this information from the product. In certain such embodiments, the consumer can access the internal memory of the object and/or an internal data logger chip set. In some embodiments, this information can be used to track freshness and/or update inventory at home for a virtual home product inventory control that can interface to a handheld device, smart house system, smart phone, etc. In some embodiments, the sensor can perform a date stamping function. In some such embodiments, the sensor can indicate the date of a object to know when it was made or received. In some embodiments, the sensor can establish a chain of custody of the object.

In some embodiments, the object comprises a recall sensor. In some such embodiments, an electronic component in the object has lot numbers that can be activated with a power peg. In some such embodiments, a signal (e.g., an RF, IR, WiFi, Blue tooth, etc. signal) is sent to an electronic capture device. This device can have up to date recall notices, and if the lot number matched, the object could light up, change color or display a permanent marking such as "OUT OF DATE—DO NOT USE".

In some embodiments, the sensor can be used for record keeping. For example, the sensor can be used to determine where and when a lot numbered product had been purchased and how many of the same lot are still not purchased.

Some sensors can be placed inside the object (e.g., inside a product or product packaging). For example, as noted above, a freshness sensor could be inside the product to gather information about relative humidity and gas buildup in the product. Similarly, a temperature sensor could be in the product to gather information about a maximum temperature experienced by the product.

Other sensors may be placed either inside or outside of the object. For example, an RFID can be placed anywhere within the object, either under the surface of the object packaging or on top of the surface of the packaging. Regardless of whether the sensor is on the inside or outside of the object, it is generally desirable, in such embodiments, that other devices are capable of communicating with the sensor. Thus, if the sensor is inside the object (e.g., packaging), the sensor may include an electrical connection to the surface of the object. The connection may be wired (e.g., a wire piercing through the packaging, extending from the sensor to an outer surface of the product) or wireless (e.g., an RFID with wireless communication capabilities, an antenna, etc.).

Other sensors may be located separate from the object. For instance, a sensor may be attached to the display from which the object is hung or rests on. If the object hangs on a peg, the sensor may be connected to or embedded in or printed on the peg. If the object rests on a shelf, the sensor may be connected to or embedded in or printed on the shelf. If the object sits on a tray, the sensor may be connected to or embedded in or printed on the tray. If the object is stuck to a wall, the sensor may be connected to or embedded in or printed on the wall. Such sensors may include pressure sensors or weight sensors (including balloon sensors that detect air displacement within a balloon in response to a portion of the balloon being compressed by the weight of the object placed on top of it). These sensors may provide information regarding not only the identity of a specific object, but also about the display on which the object is displayed. For instance, these sensors are capable of determining whether an object is lifted off the display, how many of the object are located on the display, and whether the object is properly set on the display or moved to the wrong display.

As demonstrated in the above examples, sensors on the inside of an object generally indicate information related to physical aspects of the product, sensors on the outside of an object generally interpret and convey non-physical information or properties regarding the object, and sensors attached to displays for displaying the object interpret and convey a variety of information about the object, including information about the object's life on the display. However, none of these generalities should be taken to limit the scope of the present disclosure, as sensors within objects are also capable of conveying non-physical information, and sensors outside of objects are capable of interpreting and conveying some physical information. In some examples of the disclosure, multiple sensors may work in tandem with one another. For example, a resistive element may work in tandem with an RFID for conveying information about an object hanging on a peg or sitting on a shelf. The resistive element can provide some information to the connected electronic devices while the RFID can provide other information to a handheld scanner. In one such example, a person may scan the product. Scanning the product, such as manually with a handheld scanner, may identify the precise identity of the object (e.g., a 96 bit ID) or may identify a general identity that may belong to a small pool of possible objects (e.g., an 8 bit identity). Scanning the product may not indicate how many products are hanging on any particular peg or sitting on any particular shelf. However, the resistive element may provide information to the electronic devices indicating the quantity of products on a given display. The scanner may be equipped with an antenna for communicating with the same electronic devices, such that the electronic devices can receive information from both the resistive element via the display electrical wiring as well as from the RFID via the scanner. As such, the electronic devices may determine the type of product scanned and how many of the product are present on a given display. Thus, the scanner is only needed to scan a single product on each display, and the electronic devices can then sum the total number of products that are present among the several scanned pegs and shelves in the store, providing a complete inventory check.

Information about the object may be accessible to and/or conveyed to any of a combination of object manufacturers, consumers, store clerks, and so on. The information may be conveys by lights (e.g., LEDs) or screens (e.g., LCD screens).

Object (e.g., product) information can be specific to an individual object or can be more general about the object type. Unique information regarding a product type can include any combination of a product name, price, discounts associated with the product, recall information associated with the product, and so on. Specific information may indicate whether a product has been paid for, whether the product has been taken out of the store without being purchased, whether the product is defective, outdated, spoiled, whether the product is the last available in stock, and so on.

Product information of interest to a consumer could be transmitted from an RFID in the object to a handheld device used by the consumer, such as a smartphone or PDA (such that the consumer would be able to gather the information even after taking the product home), or could be relayed to a digital display hanging above the product in the store.

Sensing capabilities can include at least any of the following: determining the identity of an object, identifying defective/counterfeit products, tracking inventory of products, tracking consumer interactions with products, and/or tracking physical properties of products.

Determining the identity of a product may be accomplished in several ways. Some examples of determining the identity of an object hung on a peg are described in detail above. However, the identification of objects/products is not limited to embodiments in which pegs are employed. For example, in some embodiments, the product (that is, the product itself or its packaging) may include a resistive element printed or otherwise formed using the same or similar methods of printing and forming described above in connection with the sensors. For example, the resistive element may be formed using conductive inks. The resistive element may be formed/printed or otherwise fashioned onto the product on a portion of the face-down portion of the product that contacts or comes closest to the sensor (e.g., a sensor in a peg, shelf, and/or tray). In this fashion the resistive element may complete an electrical connection between two or more terminals of the sensor. For example, the resistive element may be formed at the bottom tip of a cosmetic pen such that both terminals of a sensor (e.g., in a shelf or tray) contact the resistive element. It may be beneficial for the bottom of the cosmetic pen to make good electrical contact with the tray or base so that the electrical circuit is properly completed.

Determining the quantity of a type of product associated with a display may also be accomplished in several ways. Some examples of determining the quantity of objects hung on a peg are described in detail above. However, the determination of the number of objects/products associated with a display element is not limited to embodiments in which pegs are employed. For example, in some embodiments, the above described sensors can also be used to determine the quantity of a type of product sitting on a particular tray (or shelf), or, more generally, track inventory of the product. For example, the tray (or a portion of the tray designed to receive a single product type) may include only one weight sensor and one resistive sensor. Several products may be placed on the resistive sensor and on the weight sensor. The sensor must then determine not only what product type has been placed on top but also how many items of that product type have been placed there. Such determinations may be accomplished in several ways.

In one example, the single resistance sensor may have two terminals, and the resistive element printed on the face-down side of each product may electrically connect the terminals when placed in the tray. Each item of a certain product type may have a resistive element with a preselected resistance or resistivity. Therefore, if two items of the same product type are present on the tray, the equivalent resistance across the terminals of the resistance sensor will be half of the equivalent resistance across the terminals if only one item of the product type were present. Given a known voltage drop across the terminals, the amount of electrical current traveling between the terminals may indicate the quantity of the product type.

For illustrative purposes, every red Max Factor Lipfinity lipstick may be packaged in packaging having a 10 kΩ resistive element, while each red Max Factor Colour Elixir lipstick may include a 20 kΩ resistive element. These resistive values may be preprogrammed into the electronic devices. Therefore, if a 10V battery source is provided to a tray holding one of these two products, the electronic device may interpret a 1 mA electrical current to mean that one Lipfinity or two Colour Elixir lipsticks are sitting in the tray. By scanning any object on the tray, the electronic device may determine whether a Colour Elixir or Lipfinity lipstick is present, thereby determining both the type and the quantity of product on display.

In other examples, the active terminal may be separated into separate segments such that each segment may have a different electrical current traveling across that segment. In those examples, if several Lipfinity lipsticks were placed on such a tray, each terminal would have a 1 mA current traveling across it. If every product that could be placed on the tray would have a unique resistive element having a unique resistive value, the electronic device could determine the product on each segment without any further information. Alternatively, even if every product were to include a resistive element having the same resistive value (e.g., 10 kΩ), the electronic device could determine the quantity of the object on each sensor of the tray without knowing the identity of the object, and may further receive information regarding an object's identity from a different source (e.g., an RFID). In this manner, the electronic device may assume that every object in the tray (or a portion of the tray) is identical and may use the identity information from a single product to determine the identity of every object on the tray. As such, if there are fifty Lipfinity lipsticks in a store, five trays having ten products each, only the RFID of the first (or a single) product in each tray would have been sensed in order for an electronic inventory management system to determine that there are fifty products in the store. This would significantly reduce the amount of work or equipment needed to collect inventory information in the store.

The above described sensors can identify when a product is placed on the wrong tray or in the wrong place. For example, if one Lipfinity lipstick and one Colour Elixir lipstick were both placed on the same terminal, the equivalent resistance of the products would equal about 6.67 kΩ As such, in the example with only one pair of terminals for several products, a 10V drop across the terminals would result in a 1.5 mA current. Since the 1.5 mA current would not match any of the currents that the system expects to detect if one a single product type were present in the tray, the system may determine that two different product types are present. The system may then alert a person (e.g., an employee of the store) to investigate the tray and move a product off the tray and back to its proper place.

While the above examples relate specifically to objects having resistive values associated therewith, the disclosure applies similarly to objects having capacitive values or RC values (e.g., where the voltage provided from the controller is alternating, having a range of frequencies, and an AC current produced may be used to identify the object). For example, each product may have a unique capacitance or RC impedance value printed on it, which may be detected by the electrical terminals of the tray (or shelf) on which the product is placed. The above described system could then count the quantity of the product and even determine if the wrong product (e.g., two different products) is present on the tray (or shelf).

In some embodiments, the sensor(s) can identify whether a product placed on the display (e.g., on a peg, on a shelf, and/or in a tray) is defective or counterfeit. For example, if the resistive or capacitive value or other identifying feature of the product does not match any value stored in the inventory management system, the product may be determined to be counterfeit. In some embodiments, if the identity of the product is determined based on a pressure profile (e.g., a footprint), the system may determine that the packaging of the product may be damaged to the extent that the appropriate footprint is not sensed. As an additional example, if the identity of the product is determined based on a resistive value, capacitive value, or weight distribution or footprint, and a weight sensor determines that the weight of the product does not match the identified product's normal weight, the sensors may collectively determine that the product is defective or damaged. As an additional example, if a sensed weight distribution pattern matches a particular product but the total weight does not match that product, the sensors may determine that the product has not been filled properly (i.e., a short fill) or is not within its proper tolerance.

Each of the above described sensors may be wired via electrical wiring attached to the display. The electrical wiring may include standard electrical cables known in the art, printed circuit elements, stripes of conductive ink, or a combination of these. The wiring may be lined, in-molded, printed, or otherwise attached to the display. The electrical wiring may be attached to the inside and/or the outside of the display. The electrical wiring may be (e.g., attached) to either the front or back of the display, or both. Attaching the wiring to the back of the display may be beneficial (e.g., aesthetically desirable) since a person (e.g., consumer, such as a customer in a store) will generally observe the products or objects placed on or in the display from the front of the display and may not see the wiring in the back. The wiring may communicatively couple the sensors to electronic devices, for example as part of an inventory tracking system. The electronic devices may include, for example, a system controller, a shelf antenna, a database server, and so on.

The sensor may be attached to the display (e.g., to a peg, a shelf, a tray, or any component thereof) using one or several manufacturing methods. In one embodiment of the invention, the sensor is in-molded into the display. Generally, in-molding involves placing a preformed circuit on a thermoformable structure. The preformed circuit may comprise different layers of electrically conductive and/or non-conductive materials that form capacitors, resistive elements, or other electronic components. The preformed circuit may for example comprise a conductive ink trace which is then printed or formed or in-molded onto a surface of the display. Such processes have been described in, for example, U.S. Pat. No. 8,198,979, issued Jun. 12, 2012, the disclosure of which is hereby incorporated by reference herein in its entirety.

One method of in-molding comprises printing a conductive ink sensing zone on a formable film, forming the film to a desired shape, die-cutting the formed film, inserting the formed film in an injection mold, and introducing a molten plastic material into the mold. Exemplary films include polycarbonate-based Makrofol® and Bayfol® films supplied by Bayer Films Americas of Berlin, Conn. The color, translucence, and/or transparency of the film may be selected based on the desired application.

An ink layer may be applied to the film using a printing process as described above. Suitable inks for forming ink layers include without limitation Noriphan® HTR, a solvent-based, one-component screen printing ink based on a high temperature resistant thermoplastic resin which is supplied by Pröll KG of Germany, and Nazdar® 9600 Series inks with 3% catalyst, which are supplied by the Nazdar Company of Shawnee, Kansas.

A conductive ink ground layer may also be printed. The ground layer provides a barrier for the switch (electrode) traces to ensure that inadvertent actuations do not occur by accidentally touching a trace. The conductive ink used in the ground layer and the other conductive ink layers (described below) is, in some embodiments, formulated to withstand forming processes wherein the film is formed into a desired shape. The conductive ink is, in certain embodiments, formulated to withstand typical injection molding temperatures and blow-off. One suitable conductive ink is DuPont Silver Conductor 5096, which is designed for use in thermoforming operations or where extreme crease conditions are employed on flexible substrates. Another example of a conductive ink is Electrodag® SP-405, available from Acheson Colloids Company. The ground or shield layer includes a plurality of unprinted (inkless) areas that define apertures which are sized to accommodate conductive ink sensing zones.

A dielectric layer may also be printed on the ground layer using a dielectric ink that is formulated to withstand the film forming and molding processes described below. The dielectric layer is, in some embodiments, configured to cover the entire ground layer and insulates the conductive ink sensing zones and their associated electrodes from the ground layer.

A wide variety of printing processes may be used to deposit the various ink layers, including without limitation screen printing, off-set printing, gravure printing, flexographic printing, pad printing, intaglio printing, letter press printing, ink jet printing, and bubble jet printing.

To facilitate the foregoing printing processes, the film may, in certain but not necessarily all embodiments, remain substantially flat during the printing of ink layers. It should be noted that there can be multiple layering sequences other than those noted above. For example, if a layer of ink-based LEDs is not desired, then the layer (e.g., conductive layer) may be removed from the print stack-up. Alternatively, layers may be eliminated by combining layers (e.g., combining the electrode and LED layers) into a single layer. After the film is prepared, it can be formed to a desired shape and size. The desired shape can be selected based on the structure into which it will be incorporated. Thus, for example, if the film is to be used on a display A-side (e.g., a side facing a customer), it may be formed to have a shape that conforms to the A-side shape. If the film is to be used with a peg, shelf, and/or tray (or a component thereof) it is therefore formed to the shape of those items.

In a vacuum thermoforming process, a mold is provided that defines the desired film shape. The mold may comprise cavities and/or raised portions to define recessed surfaces and protruding surfaces, respectively, in the film. The film is then clamped in a frame and heated. Once a rubbery state is achieved (e.g., flexible, softened, supple, and the like), the film is placed over the mold cavity. Air is then removed from the cavity via a vacuum, such that atmospheric pressure forces the film against the walls of the mold. Typical vacuum thermoforming temperatures are generally from about 180° C. to about 200° C., with a temperature of about 190° C. being advantageous in some (but not necessarily all) cases. Typical vacuum thermoforming pressures are about 1 bar.

High pressure air may also be used to force the film into the mold, and a vacuum is not required. Details of exemplary high pressure forming processes are provided in U.S. Pat. No. 5,108,530, the entire contents of which are hereby incorporated by reference. In the Niebling HPF process, typical temperatures are from about 160° C. to about 180° C. The process pressure is generally from about 100 bar to about 300 bar.

Pressure forming processes using pressures lower than those in the Niebling process may also be used to form the film to the desired shape (such as the Hytech Accuform process). In one exemplary embodiment, the film comprises a polycarbonate sheet. When polycarbonate sheets are used, typical forming parameters include a pressure of about 35 bar, a temperature of about 160 to 180° C., a maximum draw depth of about 35-40 mm, and an elongation ratio of about 3:1 to about 4:1.

The form tool may be designed to create a part where decorative features are visible on the A-surface of the film (e.g., side of the film facing a user). The decorative features may include symbols that invite a consumer or user to touch or move an object near the surface of the peg or shelf. In a preferred embodiment, the decorative features are printed on the B-surface of the film and are visible on the A-surface. However, in other embodiments, the decorative features may be printed on the A-surface of the film. Generally, it is preferable to use a positive (e.g., male or protruding) tool as opposed to a negative (e.g. female or cavity) tool in the film forming process to avoid contact between the film's A-surface and the tool surface, which can produce marks and surface wear on film. It should be understood however, that a negative tool can be used in the forming process instead. The cycle times, temperatures, and vacuum or pressures can be adjusted accordingly to ensure the part does not exhibit any cracking of inks or excessive stretching.

In a hydroforming process a diaphragm face of unpressurized fluid can come into contact with the film surface. The diaphragm can be contained within a frame that is matched to an embossing die (male tool). At the appropriate time the fluid can be pressurized, which can form the film into the desired shape based on the male tool on the other side of the film. The diaphragm again can be depressurized. and the film can be released from the tool. The cycle times, temperatures, and pressures can be adjusted accordingly to ensure the part does not exhibit any cracking of inks or excessive stretching.

In another embodiment, the sensor may be attached to the display using an insert label forming process. The insert label process may involve preparing the sensor on a transfer film using any of several known methods, and then inserting the transfer film into a mold. Upon removal of the transfer film from the mold, the sensor would be released from the film and deposited into the mold. This may be accomplished using a cooled injection molded plastic so that the surface onto which the sensor is released is decorated. The transfer film can be printed with a thermoplastic carrier ink layer and thermoset color and/or conductive layers, or the transfer film may be printed with all thermoplastic ink layers. The ink layers may have a catalyst or crosslinker allowing for the thermoplastic inks to become thermoset during the exposure to the heated plastic in the injection mold. The thermoplastic portions may soften and melt when touched by hot molten injection molded material. Upon cooling, the inks may have better adhesion to the now solid injection molded plastic, and the release agent on the transfer film may allow the transfer film to be separated from the ink. The ink, now solidified, may be adhered to the injection molded plastic and becomes a functional layer attached to the plastic with the appropriate wear and functional attributes. The functional inks can be used for a resistive circuit, a capacitive circuit, or any other sensing circuit, and could be either exposed or not exposed. An exposed functional ink may be, for example, a functional ink that can be accessed directly and a resistance measurement can be made with normal multi-meter probes. A non-exposed version may be a functional ink that can be printed closer to the plastic surface, where the exposed surface has wear layers that are either a decorative design that act effectively as insulators to the conductive or resistive inks or are of any design and color and are actually designed to have high "K" values and be a dielectric or highly insulative ink, thus protecting the functionally conductive inks from being accessed directly with multimeter probes.

In yet another embodiment, the sensor may be formed by spraying or ink jetting. In such an embodiment, a conductive ink may be installed into an ink jet or three-dimensional printer and then sprayed onto the surface of the display, thereby forming a sensing circuit.

In yet a further embodiment, standard (e.g., copper) wiring may be inlayed onto or inserted into or onto a surface of the display. In other words, the sensor may electrically (e.g., conductively, capacitive, etc.) connect to the display without the use of conductive inks altogether, using nothing more than conventional wiring and/or conductive foils. For example, electrical wiring and/or conductive foils may be applied directly to the surface of the peg, shelf, and/or tray (or a component thereof). Alternatively, the electrical wiring and/or conductive foils may be applied to a film or other surface that is then secured to and/or placed on top of the shelf, peg, or tray surface. For example, the film or other surface may serve as a carrier that includes an adhesive on one side that adheres to the peg, shelf, and/or tray surface. In another embodiment, the carrier may be made so that when heated it adheres to the surface of the peg, shelf, and/or tray.

Figure 23:
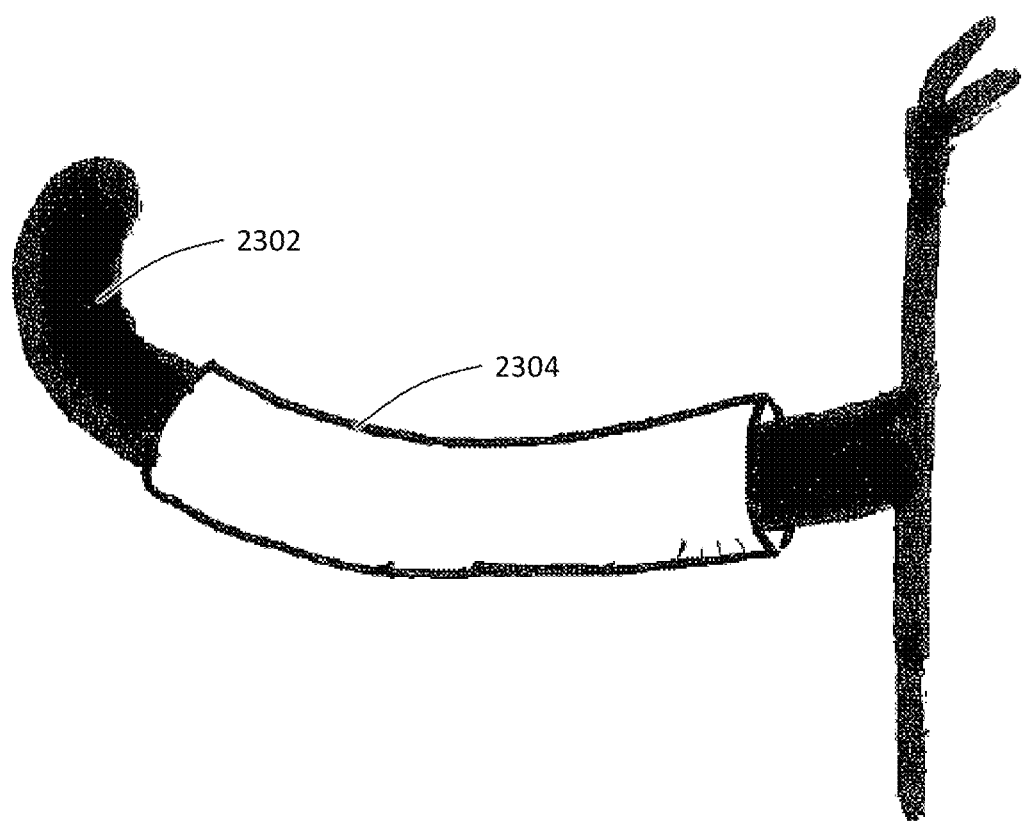
FIG. 23 is a schematic illustration of a display peg comprising a film, according to some embodiments.
Figure 24:
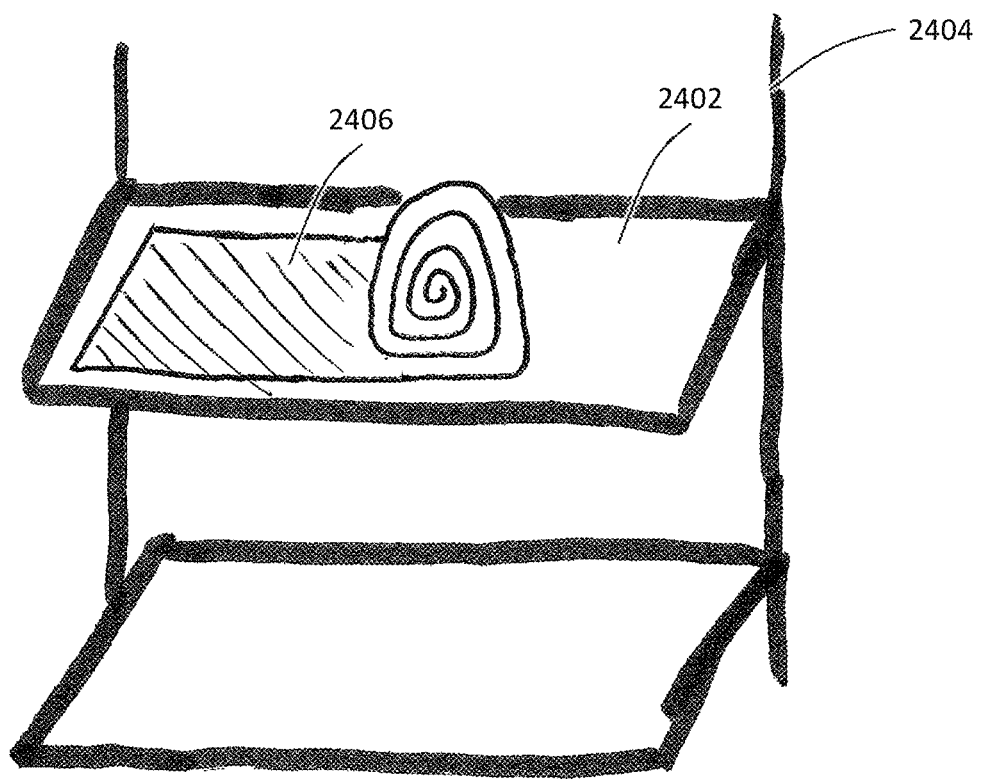
FIG. 24 is, according to some embodiments, a schematic diagram illustrating a sensor being rolled out over a shelf.

In some embodiments, the sensor may be prepared directly onto the display. For example, a conductive ink sensor may be directly printed onto the display using an ink jet or three-dimensional printer. In other embodiments, the preparation may be indirect. For instance, the sensor may be in-molded, insert-molded, printed, or otherwise formed onto a separate film that may subsequently be attached to the display. In those examples where the display is a peg or hook, the separate film may be a sleeve that fits around the circumference of the peg or hook of a display board. For example, in FIG. 23, film 2304 is formed around peg 2302. In those examples where the display is a wall or a shelving unit, the separate film may be rolled out like a mat over the surface of the wall or on top of a shelf surface of the shelving unit. For example, in FIG. 24, film 2406 can be rolled out over shelf 2402 of display 2404. In those examples where the display is a tray or sheet, the separate film may be a laminate that fits around the surface of the or sheet. In some such cases, the separate film may be rolled out like a mat over the surface of the base or tray. By using a separate film, multiple sensors can easily be manufactured at the same time and subsequently applied to the displays, resulting in a higher production yield. Use of film separate from the peg, shelf, and/or tray also permits the store to implement the technologies described herein and retrofit its already existing shelving or displays, without need to purchase new displays, resulting in a significant cost savings. The displays can also be manufactured with the sensors in-mold applied, attached or otherwise adhered by the manufacturer and supplied to the display unit purchaser ready to use.

As noted above, in some embodiments, RFID may be included in the object (e.g., the packaged product). In some embodiments, the RFID may be electrically coupled to a resistive or capacitive element within a display element (e.g., a peg, shelf, and/or a tray of a display system). For instance, in some embodiments, placing the product on a display may establish an electrical connection between the resistive or capacitive element and a transmitter/receiver in the display (in place of or in addition to the sensor) connected to an active terminal. In this manner, the RFID may be powered by a power source connected to the active terminal. Alternatively, the RFID may transmit information through the transmitter/receiver over the active terminal to a connected electronic device. Transmission between the product and the electronic device may occur automatically, when initiated by device, or upon powered being supplied from the power source to the product. In one such example, the transmitter/receiver may include several terminals for providing power from a power source, receiving information from the RFID, and/or grounding the electrical connections.

Turning next to the electronic devices coupled to the display structures (e.g., peg, shelf, and/or tray) described herein (and, in some embodiments, wirelessly coupled to the scanner), the electronic devices may, in some embodiments, include any combination of servers, computers, antennae, alarms, etc., for example, to form a distributed monitoring system. The electronic devices may include a system controller capable of providing an electrical signal (such as the 10V signal described above) to each of the display elements (e.g., pegs, shelves, trays, etc.). In some embodiments, the system controller may be further capable of interpreting an electrical signal received from the display elements (e.g., pegs, shelves, trays, etc.). Information may be transmitted both ways between the electronic devices and a product or object hanging on or positioned over the display structure (e.g., peg, shelf, and/or tray). The display structure itself (e.g., peg, hook, or shelf) may include one or more electronic devices coupled to the terminals and to the electrical wiring. For example, as described elsewhere herein, the display structure may include one or more LED lights capable of conveying information regarding the objects hanging on the peg or capable of conveying other information received from the electronic devices.

The electrical signal may be an electrical current (e.g., flowing through the display structure. In some embodiments, the value of the electrical current may indicate the quantity and/or type of object associated with the display (e.g., hung from a given peg, associated with a shelf, and/or positioned within a tray). In some embodiments, the value of the electrical current may indicate the position of the object associated with the display. In some embodiments, the electronic device may determine a property related to an object (e.g., an identity, a quantity, and/or a location) based on a change in an electrical current flowing through the display structure (e.g., the peg, the shelf, and/or the tray). In some embodiments, the electronic device may determine a property related to an object (e.g., an identity, a quantity, and/or a location) based on a change in an electrical resistance of an electrical current flowing through the display structure (e.g., the peg, the shelf, and/or the tray). In other examples, the electrical signal may be more complex than a DC current (e.g., an alternating current having a certain frequency, a series of bits having a unique or semi-unique identity, etc.). The controller may relay the received information to a server, where inventory of the object, as well as other objects, may be gathered, analyzed, and/or stored.

While the above descriptions discuss only a close-range RFID scanner, other types of scanners and object sensing methods are equally applicable to this disclosure. For example, object sensing may be accomplished using capacitive or magnetic methods. In such examples, the object may include a capacitive element having a different dielectric than the surrounding air. The object may then be detected by a radio frequency (RF) signal. As with the resistive elements, each object may include its own unique capacitive element having a capacitive value different than other elements. Further, the resistive and capacitive elements may be coupled to one another to provide an RC circuit having a resonant frequency. This frequency may be used by the controller to identify the object. Capacitive sensing may also include piezoelectric and/or capacitive sensing surfaces.

The aforementioned information can be gathered at several points in the inventory tracking system. For instance, data can gathered by the individual sensors, and can further be relayed to a central server or controller. The individual sensors themselves can either be part of the product (inside or outside the product), part of the display, or portable (e.g., a handheld scanner, a consumer controlled handheld device, etc.). Moreover, it is often desirable not only to gather this information but also to display the information. Optical sensors, such as light guides and photodiodes, may also be used to identify and/or sense the presence of objects, such as in an electronic article surveillance system.

Product information can, in some embodiments, be more discreetly conveyed to store personnel using the back-end inventory management system or other connected electronic devices. Alternatively, information could be discreetly conveyed by use of an LED color scheme. In the LED color scheme, different color LEDs associated with the product (e.g., in the packaging of the product, in the display, close to the display, etc.) could light up depending on the type of information to be conveyed.

Figure 5:
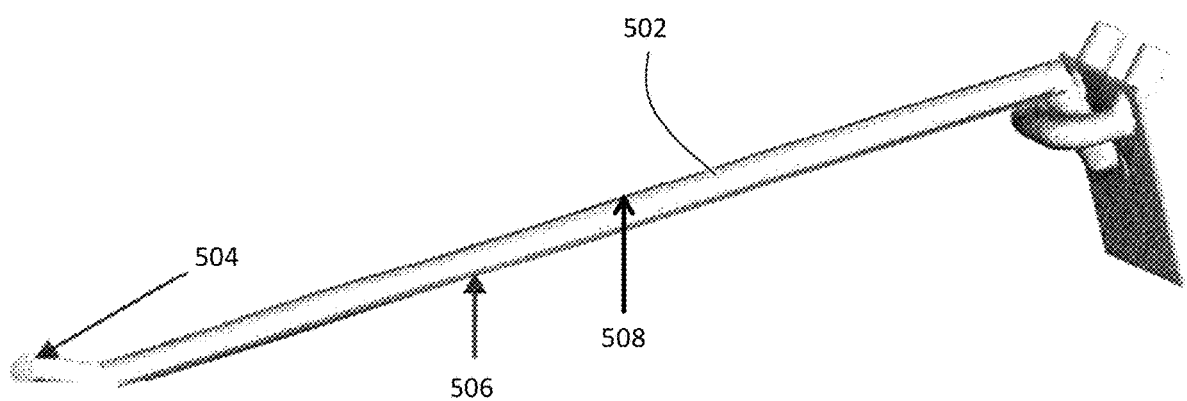
FIG. 5 is, according to certain embodiments, a schematic illustration of a display peg.

In one example, one or more pegs (or other display components, such as a shelf, tray, or any components thereof) may include a light-emitting device, such as an LED. For example, in FIG. 5, peg 502 comprises LED 504. In embodiments in which the display comprises a peg, the LED may be located at the tip of the peg, as illustrated in FIG. 5, or on the display in proximity to the peg. In some embodiments, the LED can be located on a back wall of the display, out of view of the consumer, or on a front wall or top wall (or any other external surface of the display), in view to the consumer. The LED may change colors to provide visual clues. The LED may turn different colors depending on the status of the peg (or other display component, such as a peg or shelf). For example, if the peg (or other display component) is vacant, the LED may turn a first color (e.g., red). This may indicate that restocking is needed. If the peg (or other display component) has at least one object hanging, or if every terminal on the peg (or other display component) is occupied, the LED may turn a second color different from the first color (e.g., green). If a sensor at the entrance/exit to the store determines that an object was taken through said entrance/exit without being paid for, the sensor may also identify the type of object and the peg (or shelf location, or tray location) from which the object was taken and may relay a signal to the peg (via a network of antenna and/or the display electrical wiring) such that the LED on the peg (or other portion of the display) flashes a color (e.g., flashing red). For example, an RFID transmitter/receiver could be stationed at the exit of the store to determine whether the product is shoplifted. A positive shoplifting determination could trigger an LED light in the product or a control room of the store to flash.

As another example, in some embodiments, a light-emitting device of a first color (e.g., green) can signify that the peg has the correct amount of product and all the product on the peg is accurate and not mixed. In some such embodiments, a light-emitting device of a second color (e.g., red) can signify that the peg does not have enough product (e.g., based upon a minimum threshold). In some embodiments, a light-emitting device of a third color (e.g., yellow) can indicate that the product is getting low and needs attention or a restock. In some embodiments, a light-emitting device of a fourth color (e.g., orange)—can signify that the peg has mixed products and has to be looked at. In some embodiments, a light-emitting device of a fifth color (e.g., white) can signify that the peg is empty.

Determining whether a display structure (e.g., a peg, shelf, tray, etc.) is understocked or sufficiently stocked may be based on predetermined values stored in a memory of the electronic devices. If an electronic device determines that more than one product is placed on the peg or shelf, thereby indicating that a product was placed in the wrong location, the LED may turn yet a different color (e.g., orange). In addition to LEDs in the visible light spectrum, LEDs may also emit light in a nonvisible spectrum, such that consumers are not able to normally see. Infrared devices, polarized glasses or light frequency filters could be used by store personnel to view the existence of such lights, which would have predetermined meanings (such as the various meanings outlined above). If a sensor at the entrance/exit to the store determines that a product was taken through said entrance/exit without being paid for, the sensor may also identify the type of product as well as the peg or shelf from which the product was taken, and may relay a signal to the peg or shelf (via a network of antenna and/or the display electrical wiring) such that the LED on the peg turns or flashes yet another color (e.g., red, flashing red, etc.). In addition to LED lights, the sensors and electronic devices may be capable of activating other displays (e.g., LCD, etc.) known in the art to convey the desired information. For example, in some embodiments, the sensor and electronic devices may be capable of displaying a product's price or a sale associated with the product.

Aside from activating LED lights, an electronic device may be further capable of connecting with other automated systems that are capable of controlling physical properties of the product (e.g., temperature, moisture, etc.) in response to determinations made about the products. For example, an electronic device may receive information regarding the temperature of a pastry on a bakery shelf. If the temperature drops below a certain threshold, the electronic device may activate a heating coil directly underneath the pastry to warm up the pastry. Additionally, the shelf may include a weight sensor that senses when the pastry is removed from the shelf. The electronic device may receive an indication when the pastry is removed, and may immediately deactivate the heating coils even if the temperature sensor has not yet adjusted to the absence of the pastry. Such warming systems could use less power than microwaves and could provide ready-to-sell products to consumers in a warmed state. As another example, an electronic device may receive information regarding the temperature of a powder in a cosmetic tray. If the temperature drops below a certain threshold, the electronic device may activate a heating coil directly underneath the powder to keep the powder warm. Additionally, the tray may include a weight sensor that senses when the powder is removed from the tray. The electronic device may receive an indication when the powder is removed, and may immediately deactivate the heating coils even if the temperature sensor has not yet adjusted to the absence of the powder. Such warming systems could use minimal power and could provide ready-to-use products to consumers in a warmed state, but could also be integrated into cosmetic trays owned by consumers to maintain the ready-to-use state of purchased products, such as cosmetic powders. Similarly, heating coils, humidifiers, dehumidifiers, and other climate control related technology can interact with the sensors and the information conveyed by the sensors in order to maintain optimal freshness of the product(s).

In some embodiments, information gathered by the sensors or other electronic devices may activate an alarm. For example, a product that is shoplifted from the store (e.g., using an RFID sensor), a counterfeit or defective product placed on a tray, or an expensive product lifted off a tray or touched (e.g., using a weight sensor), may trigger an alarm.

The LEDs and/or alarms may be powered using the same terminals through which above described in-package and external sensors can be powered. For example, the sensor can read a resistance across the negative and positive trace lines in a product. The sensor can then communicate that resistance to an electronic module for deciphering and further action. Additionally, the sensor can relay pulsed power through the same trace lines to power the product (e.g., an RFID in the product, an LED indicator in the product, etc.)

In certain embodiments, some or all of the above described technologies can be placed into communication with one another (e.g., shoplifting alarms in communication with an inventory database). The objects may be printed with one or more antenna arrays to wirelessly communicate with controllers, servers, and other electronic devices. As described above, the information communicated via these antennae may include any combination of: product identity (e.g., brand, model, color, cost, promotions, etc.), product quantity (e.g., on a given peg, in a store, availability in a nearby store, etc.), product security (e.g., whether a product was paid for before leaving a store), product location (e.g., via long range wireless scanning using a wifi scanner, wireless power transmission such as witricity, and other network connections, such as a PoE connection, or a line drop connection, to identify the whereabouts of a certain product, for instance to determine whether several shoppers are carrying the product in their carts, suggesting that the product is popular or other shopper preferences), and/or product authentication (e.g., detection of a product having no RFID tag, or no resistive element, or an unknown RFID tag, or an unknown resistive element value). The information may be analyzed by a computer or manually, either off-site or in a back office of a store.

As noted above, in certain embodiments, the display comprises a visual indicator. The visual indicator may be capable of visually indicating information related to the product. For example, in some embodiments, the visual indicator is capable of visually indicating information related to the identity of the product displayed (e.g., at a given time). In some embodiments, the visual indicator is capable of visually indicating information related to the quantity of the product displayed (e.g., at a given time). The visual indicator may be, in some embodiments, a light-emitting device, such as a light emitting diode (LED). In some embodiments, the visual indicator comprises a screen, such as an LCD screen. The visual indicator may be electronically coupled to a display structure (e.g., a peg, shelf, and/or tray). In some embodiments, the visual indicator is electronically coupled to an electronic device, such as a controller. The visual indicator may indicate information based upon a determination made by an electronic device. For example, the electronic device (e.g., controller) may determine an identity, quantity, and/or position of an object (e.g., a product). The electronic device may then send a signal to the visual indicator that results in the visual indicator indicating the information determined by the electronic device.

Certain of the systems and methods described herein may be employed in a number of use cases including, for example, as anti-counterfeit measures, to reduce shrinkage, to provide for inventory awareness, to enhance production scheduling, to provide promotional opportunities, and/or to analyze shopper behavior.

For example, when employed in an anti-counterfeit system, tagged goods (e.g., goods tagged via RFID) can be monitored during packaging, shelving, storage, at the point of purchase (POP), and/or at the point of sale (POS). In certain embodiments, statistical sampling can greatly reduce ongoing tag costs. For example, if 10 of 100 items are tagged per case/carton, an absence of detecting any tags on a "restocked" shelf can create an alert suggesting counterfeit goods have been substituted for authentic product. In some embodiments, if "tagged goods" appear, but do not match a database of specific IDs, or appear at the wrong location, it may suggest that the goods are counterfeit or gray market goods.

As another example, in certain embodiments, certain of the systems and methods described herein can be employed to reduce shrinkage. For example, certain of the systems and methods described herein can be used to detect known theft events, such as multiple product removal (e.g., when 6 are removed from storage, and only 3 are shelved). In some embodiments, portal monitoring of some or all logical portals will provide enhanced awareness of points of shrinkage.

In some embodiments, certain of the systems and methods described herein can be employed to provide for inventory awareness. Automated sensing can, in some embodiments, greatly reduce out of stock situations by generating automated restock alerts. In some embodiments, a dashboard can be used to determine (e.g., measure and/or quantify) whether product is shipped, received, on floor, and/or back stock.

Certain of the systems and methods described herein can, in some embodiments, be used to enhance production schedules. In some such embodiments, the data collected by automated sensing is pushed to assist operations in production scheduling and logistics. In some embodiments, fulfillment may be completely automated by automatic sensing between supplier and retailer, resulting in thousands of hours of saved labor.

According to some embodiments, certain of the systems and methods described herein can be used to analyze shopper behavior. In some embodiments, certain of the systems and methods described herein can be used to monitor on shelf/point of purchase (POP) product velocity, pick and replace time, and/or count passersby, which can, according to some embodiments, provide insight into the degree of success of product promotions.

Certain of the systems and methods described herein can provide for several levels of automated sensing. For example, in some embodiments, determining whether an object is present may be performed (e.g., using capacitive, magnetic, and/or other sensing methods). In some embodiments, a simple identification (e.g., 2 to 8 bit, low cost identification, such as via chipless RFID) can be performed. In some embodiments, a full identification (e.g., using passive RFID, e.g., to provide 96 bit or higher unique identifications) can be performed, for example, for full featured inventory and authentication. In some embodiments, optical sensing may be performed (e.g., using light guides and/or photodiodes). In some embodiments, sensing may be performed through actuation of piezoelectric or capacitive sensing surfaces.

Figure 25:
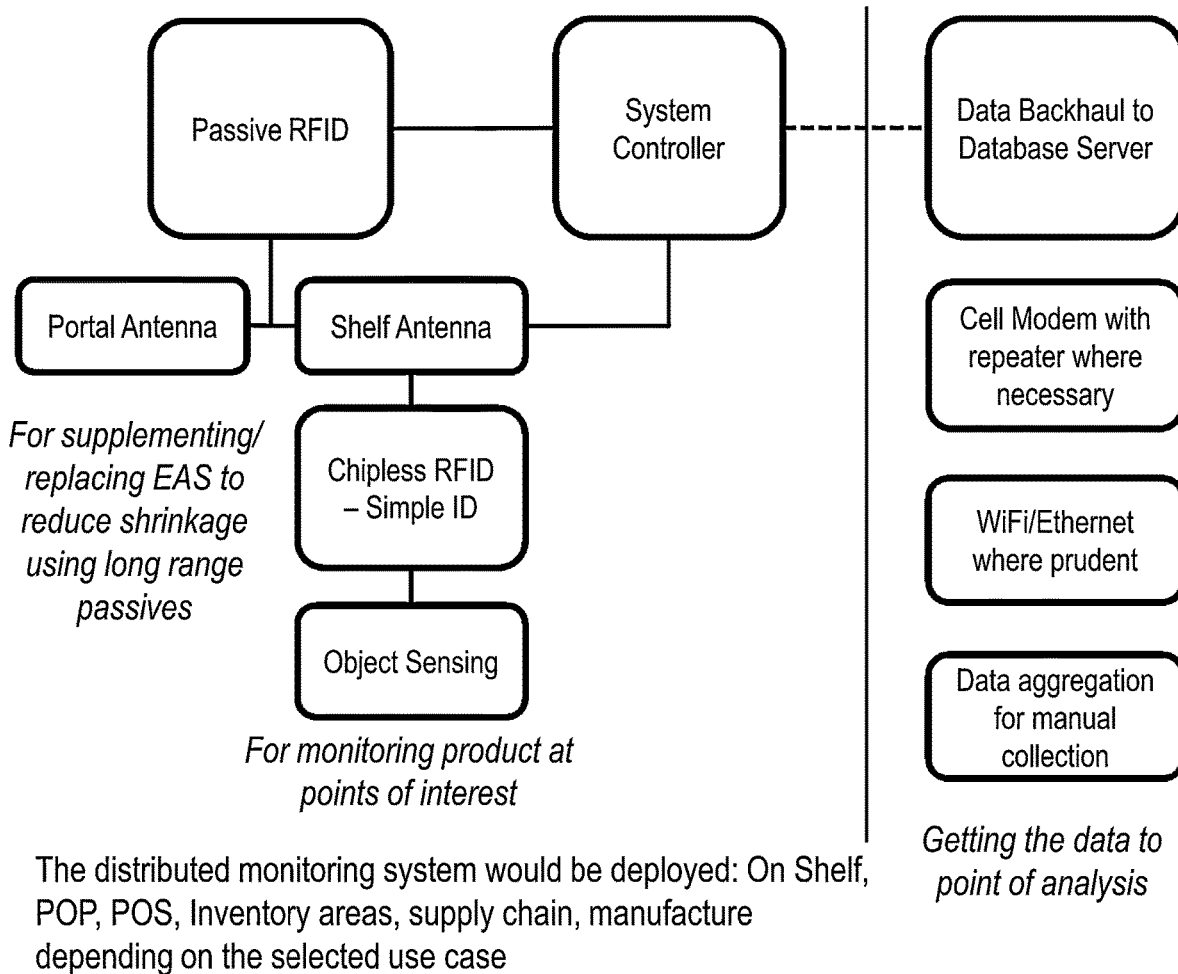
FIG. 25 is, according to some embodiments, a schematic diagram illustrating the connectivity between monitored products and data collection and analysis systems.

FIG. 25 is a schematic diagram illustrating the connectivity between monitored products and data collection and analysis systems. Object scanning may be performed for monitoring product at a point of interest. In some embodiments, chipless RFID or a simple ID may be used to identify the product. Information from the scanned object can be transmitted to a shelf antenna, which may communicate with a system controller. The system controller may communicate with a database server. The database server may allow for data aggregation for manual collection.

Figure 26:
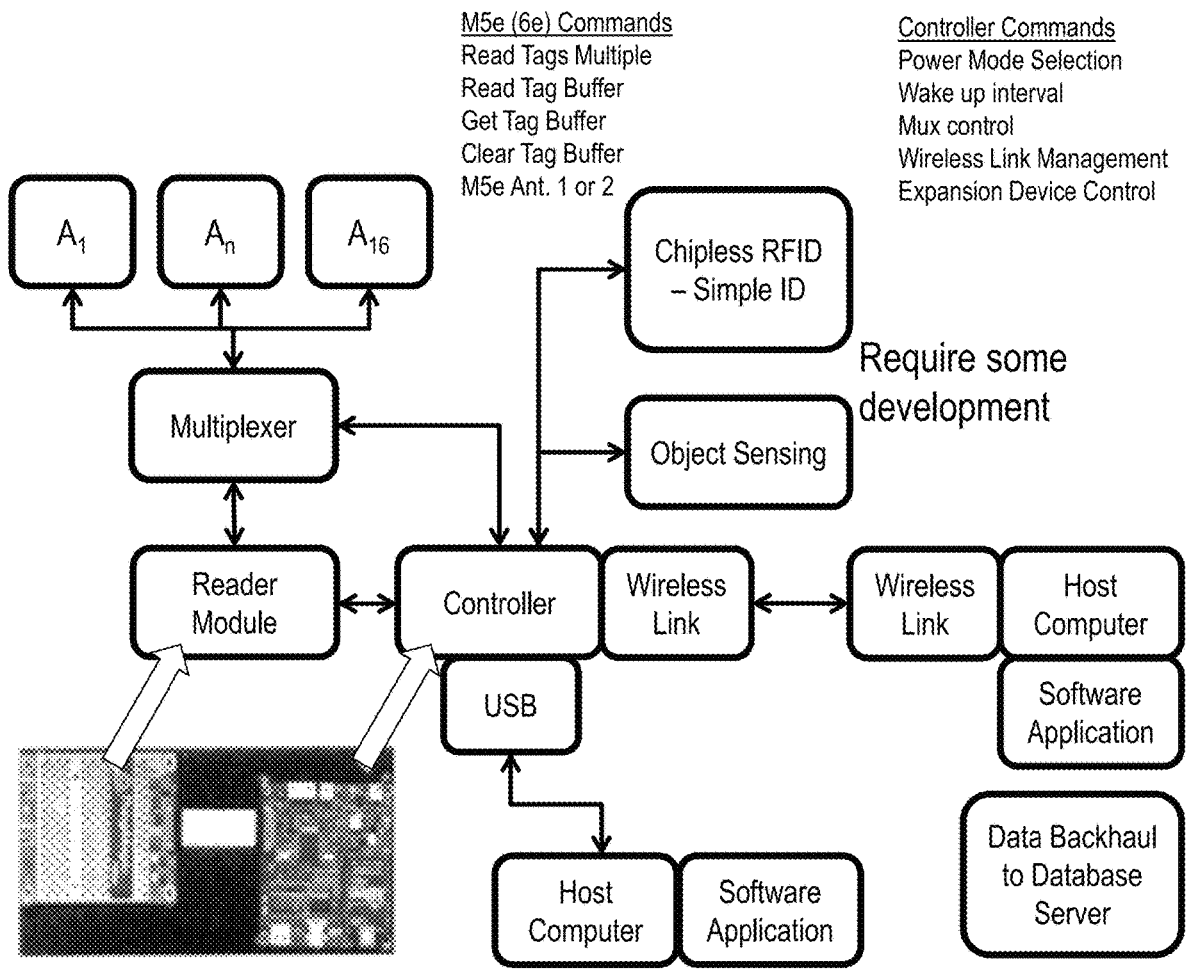
FIG. 26 is a schematic diagram illustrating the integration of a reader module into an inventory management system, according to certain embodiments.

FIG. 26 is a schematic diagram illustrating the integration of a reader module into an inventory management system.

Figure 27:
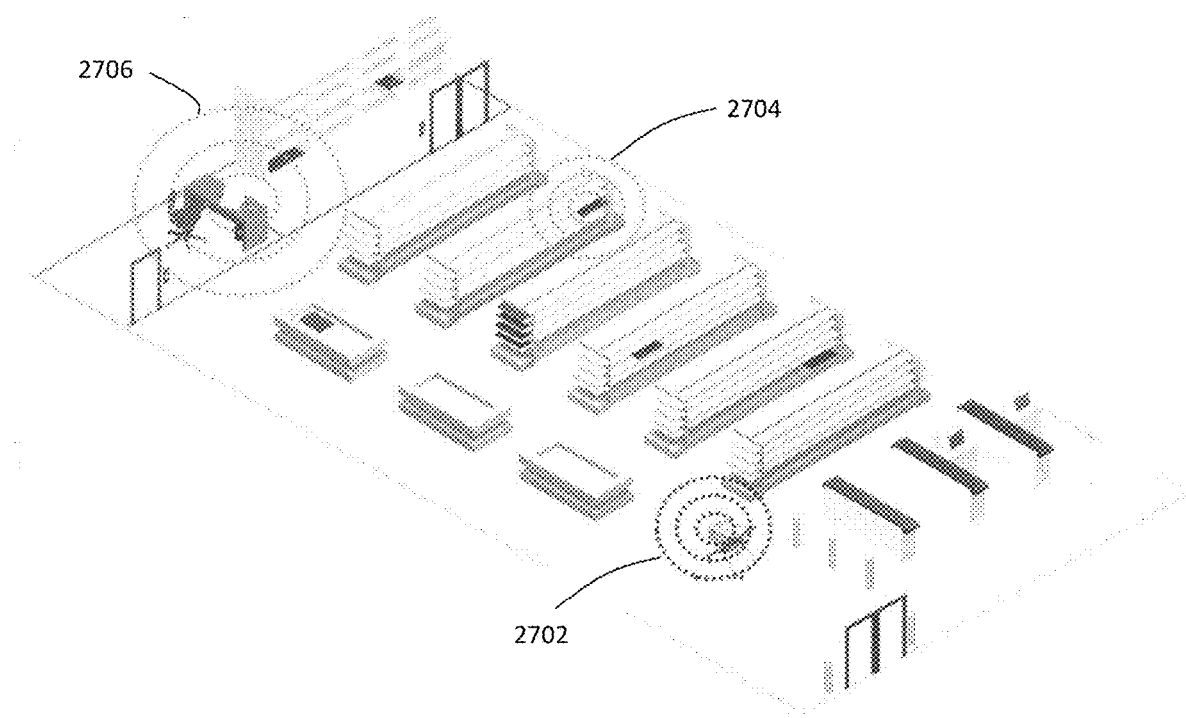
FIG. 27 is a schematic illustration of an exemplary inventory monitoring deployment scenario, according to some embodiments.

FIG. 27 is a schematic illustration of an exemplary inventory monitoring deployment scenario. In FIG. 27, shopper preference monitoring can be performed at region 2702. Distributed read areas may be positioned in region 2704. The distributed read areas may be powered, for example, via Witricity, PoE, a line drop, or any other suitable method. Information may be transmitted to back office area 2706 using a data link.

The above disclosure applies not only to support structures that are in physical contact with the object (e.g., product) but also to any support structure that is in communicative connection with the product. This may include for example, a support structure having magnets that cause the product to levitate or float, for instance due to metal traces in the packaging of the product that get caught in a magnetic field of the support structure. Such embodiments may be applicable to pegs (e.g., having magnets in the pegs), shelving units (e.g., having magnets in the shelves) or walls (e.g., having magnets in the walls) of a support structure. Because many of the above described sensors (e.g., optical sensors, capacitive sensors, RFID sensors, etc.) do not require physical connection between the sensor and the sensed object, such sensors may be utilized in a support structure that does not physically contact the product.

An International (PCT) Patent Application, filed in the U.S. receiving office on Mar. 13, 2014, under PCT/US2014/026827, and entitled "Automatic Sensing Methods and Devices for Inventory Control" is incorporated herein by reference in its entirety for all purposes.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of electronically identifying one or more objects hung on a display, the method comprising:
   providing a display peg, the display peg comprising two electrically conductive terminals laterally aligned along an upper surface of the display peg; and
   hanging an object on the display peg, the object comprising a printed resistive element having a preselected resistance,
   wherein upon hanging the object on the display peg, the resistive element contacts each of the electrically conductive terminals such that an electrical current is capable of flowing between the electrically conductive terminals via the resistive element.

2. Th method of claim 1 further comprising identifying a type of the object hanging on the display peg depending on the detected electrical current.

3. The method of claim 1, further comprising providing an electrical signal to the display peg, and interpreting an electrical signal received from the display peg.

4. The method of claim 1, further comprising determining a quantity of objects on the peg.

5. The method of claim 1, wherein the electrically conductive terminals are fashioned using conductive ink.

6. The method of claim 1, wherein the resistive element is formed using conductive ink.

* * * * *